(12) United States Patent
Cohen et al.

(10) Patent No.: US 8,438,609 B2
(45) Date of Patent: *May 7, 2013

(54) RESOURCE AUTHORIZATIONS DEPENDENT ON EMULATION ENVIRONMENT ISOLATION POLICIES

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1423 days.

This patent is subject to a terminal disclaimer.

(21) Appl. No.: 11/824,581

(22) Filed: Jun. 28, 2007

(65) Prior Publication Data
US 2008/0235756 A1 Sep. 25, 2008

Related U.S. Application Data

(63) Continuation-in-part of application No. 11/728,269, filed on Mar. 22, 2007, and a continuation-in-part of application No. 11/728,309, filed on Mar. 22, 2007, and a continuation-in-part of application No. 11/728,312, filed on Mar. 22, 2007, and a continuation-in-part of application No. 11/728,268, filed on Mar. 22, 2007, and a continuation-in-part of application No. 11/728,314, filed on Mar. 22, 2007.

(51) Int. Cl.
*G06F 21/00* (2006.01)
(52) U.S. Cl.
USPC .................... 726/1; 713/167; 726/17; 726/21
(58) Field of Classification Search .................... None
See application file for complete search history.

(56) References Cited

U.S. PATENT DOCUMENTS

| 4,400,769 A | 8/1983 | Kaneda et al. |
| 4,875,154 A | 10/1989 | Mitchell |
| 4,898,461 A | 2/1990 | Portney |
| 5,109,489 A | 4/1992 | Umeno et al. |
| 5,692,067 A | 11/1997 | Raterman et al. |
| 5,805,867 A | 9/1998 | Kodaira |
| 5,877,839 A | 3/1999 | Portney |
| 5,889,954 A | 3/1999 | Gessel et al. |
| 5,991,531 A | 11/1999 | Song et al. |
| 6,218,930 B1 | 4/2001 | Katzenberg et al. |

(Continued)

OTHER PUBLICATIONS

"A Performance Comparison of Hypervisors"; VMware; Bearing a Copyright Date of © 2007 VMware, Inc.; pp. 1-22; VMware, Inc.

(Continued)

*Primary Examiner* — Gilberto Barron, Jr.
*Assistant Examiner* — Shaun Gregory

(57) ABSTRACT

A system, method, computer program product, and carrier are described for obtaining a resource authorization dependent upon apparent compliance with a policy of causing an emulation environment to isolate a first software object type from a second software object type; and signaling a decision whether to comply with the policy of causing the emulation environment to isolate the first software object type from the second software object type.

26 Claims, 46 Drawing Sheets

U.S. PATENT DOCUMENTS

| | | | |
|---|---|---|---|
| 6,240,544 | B1 | 5/2001 | Kaneko |
| 6,253,224 | B1* | 6/2001 | Brice et al. ........................ 718/1 |
| 6,353,897 | B1 | 3/2002 | Nock et al. |
| 6,527,389 | B2 | 3/2003 | Portney |
| 6,564,179 | B1 | 5/2003 | Belhaj |
| 6,672,963 | B1 | 1/2004 | Link |
| 6,907,519 | B2 | 6/2005 | Desoli |
| 6,910,024 | B2 | 6/2005 | Krishnamurthy et al. |
| 6,920,416 | B1 | 7/2005 | Swoboda et al. |
| 6,954,790 | B2 | 10/2005 | Forslöw |
| 6,980,946 | B2 | 12/2005 | Giles et al. |
| 7,065,680 | B2 | 6/2006 | Mantyla |
| 7,073,129 | B1 | 7/2006 | Robarts et al. |
| 7,130,788 | B2 | 10/2006 | Reblewski |
| 7,475,431 | B2 | 1/2009 | Chao |
| 7,496,494 | B2 | 2/2009 | Altman et al. |
| 7,505,889 | B2 | 3/2009 | Salmonsen et al. |
| 7,647,589 | B1 | 1/2010 | Dobrovolskiy et al. |
| 7,685,597 | B1* | 3/2010 | Czajkowski et al. ......... 718/100 |
| 2002/0108107 | A1 | 8/2002 | Darnell et al. |
| 2002/0112228 | A1 | 8/2002 | Granston et al. |
| 2002/0129335 | A1 | 9/2002 | Lewis |
| 2003/0046665 | A1 | 3/2003 | Ilin |
| 2003/0056151 | A1 | 3/2003 | Makiyama |
| 2003/0065943 | A1 | 4/2003 | Geis et al. |
| 2003/0131246 | A1 | 7/2003 | Reeves et al. |
| 2003/0132853 | A1 | 7/2003 | Ebert |
| 2004/0088526 | A1 | 5/2004 | Colavin et al. |
| 2004/0103406 | A1 | 5/2004 | Patel |
| 2004/0133777 | A1 | 7/2004 | Kiriansky et al. |
| 2004/0139480 | A1* | 7/2004 | Delpuch et al. ............... 725/135 |
| 2004/0153831 | A1 | 8/2004 | Kuth |
| 2004/0167984 | A1* | 8/2004 | Herrmann .................... 709/229 |
| 2004/0168049 | A1 | 8/2004 | Lee |
| 2004/0181476 | A1* | 9/2004 | Smith et al. ...................... 705/35 |
| 2004/0230437 | A1 | 11/2004 | Havrilak, Jr. |
| 2004/0255165 | A1 | 12/2004 | Szor |
| 2005/0004863 | A1 | 1/2005 | Havrilak |
| 2005/0050389 | A1 | 3/2005 | Chaurasia |
| 2005/0055189 | A1 | 3/2005 | Nakamura |
| 2005/0055458 | A1* | 3/2005 | Mohan et al. ................. 709/238 |
| 2005/0066195 | A1 | 3/2005 | Jones |
| 2005/0071824 | A1 | 3/2005 | K. N. et al. |
| 2005/0102129 | A1 | 5/2005 | Bond et al. |
| 2005/0132054 | A1* | 6/2005 | Chang et al. .................. 709/227 |
| 2005/0132367 | A1 | 6/2005 | Tewari et al. |
| 2005/0160423 | A1* | 7/2005 | Bantz et al. ........................ 718/1 |
| 2005/0175183 | A1 | 8/2005 | Ovadia et al. |
| 2005/0212763 | A1 | 9/2005 | Okamura |
| 2005/0273850 | A1* | 12/2005 | Freund ............................ 726/14 |
| 2005/0281190 | A1 | 12/2005 | McGee et al. |
| 2006/0005185 | A1 | 1/2006 | Nguyen |
| 2006/0010492 | A9 | 1/2006 | Heintz et al. |
| 2006/0020939 | A1 | 1/2006 | Fellenstein et al. |
| 2006/0075076 | A1 | 4/2006 | Sinha |
| 2006/0130060 | A1* | 6/2006 | Anderson et al. ................. 718/1 |
| 2006/0130134 | A1 | 6/2006 | Colas |
| 2006/0136911 | A1* | 6/2006 | Robinson et al. ................. 718/1 |
| 2006/0143522 | A1 | 6/2006 | Multhaup et al. |
| 2006/0146057 | A1 | 7/2006 | Blythe |
| 2006/0155912 | A1 | 7/2006 | Singh et al. |
| 2006/0184349 | A1 | 8/2006 | Goud et al. |
| 2006/0195745 | A1 | 8/2006 | Keromytis et al. |
| 2006/0206873 | A1 | 9/2006 | Argade |
| 2006/0248390 | A1 | 11/2006 | Hori et al. |
| 2006/0253824 | A1 | 11/2006 | Iizuka |
| 2006/0256106 | A1 | 11/2006 | Scarlata et al. |
| 2006/0259947 | A1 | 11/2006 | Aarnos et al. |
| 2007/0043896 | A1 | 2/2007 | Daruwala et al. |
| 2007/0074199 | A1 | 3/2007 | Schoenberg |
| 2007/0107057 | A1* | 5/2007 | Chander et al. ................ 726/22 |
| 2007/0299906 | A1 | 12/2007 | Bose et al. |
| 2008/0133208 | A1 | 6/2008 | Stringham |
| 2008/0133214 | A1 | 6/2008 | Leventhal et al. |
| 2008/0263650 | A1* | 10/2008 | Kerschbaum ...................... 726/9 |
| 2008/0313648 | A1* | 12/2008 | Wang et al. ................... 719/315 |
| 2009/0113413 | A1 | 4/2009 | Reinz |
| 2009/0210427 | A1 | 8/2009 | Eidler et al. |
| 2010/0138208 | A1 | 6/2010 | Hattori et al. |

OTHER PUBLICATIONS

Ferrie, Peter; "Attacks on Virtual Machine Emulators"; Symantec Advanced Threat Research; Bearing a Date of Jan. 2007; pp. 149-161; USENIX Association.

Locasto, Michael E. et al.; "Quantifying Application Behavior Space for Detection And Self-Healing"; Bearing a Date of 2006; pp. 1-19; Located at: http://hdl.handle.net/10022/AC:P:29545; Repository: Academic Commons by Columbia University Libraries.

Locasto, Michael E. et al.; "Speculative Execution as an Operating System Service"; Bearing an Issue Date of May 12, 2006; pp. 1-6; Located at: http://hdl.handle.net/10022/AC:P:29461.

"Performance Tuning Best Practices for ESXServer 3"; VMware; Bearing a Copyright Date of © 1998-2006 VMware, Inc.; pp. 1-22.

Rinard, Martin et al.; "Enhancing Server Availability and Security Through Failure-Oblivious Computing"; Bearing a Date of Publication of 2004; pp. 1-14; USENIX Association; San Francisco, CA.

Adams, Keith; Agesen, Ole; "A Comparison of Software and Hardware Techniques for x86 Virtualization"; Architectural Support for Programming Languages and Operating Systems—Proceedings of the 12th International Conference on Architectural Support for Programming Languages Operating Systems; bearing a date of 2006; pp. 2-13; ACM Press; located at: http://www.vmware.com/pdf/asplos235_adams.pdf.

"Best Practices: Using VMware Infrastructure for Backup and Restore"; VMware; bearing a date of Oct. 26, 2006; pp. 1-20; VMware, Inc.; located at: http://www.vmware.com/pdf/esx3_backup_wp.pdf.

"Brochure: VMware Infrastructure 3: Data Center Management and Optimization Suite"; VMware; bearing a date of 2006; pp. 1-4; VMware, Inc.; located at: http://www.shi.com/Global/Content/Vendors/VMware/vi_brochure.pdf.

Dodge, John; "White Paper: VirtualCenter 2: Templates Usage and Best Practices"; VMware; bearing a date of Jun. 5, 2006; pp. 1-13; VMware, Inc.; located at: http://www.vmware.com/pdf/vc_2_templates_usage_best_practices_wp.pdf.

Humphreys, John; Grieser, Tim; "White Paper: Mainstreaming Server Virtualization: the Intel Approach"; IDC Analyze the Future; bearing a date of Jun. 2006; pp. 1-10; IDC; located at: http://www.intel.com/business/technologies/idc_virtualization_wp.pdf.

Locasto, Michael E.; Keromytis, Angelos D.; "Speculative Execution as an Operating System Service"; pp. 1-6; located at: http://mice.cs.columbia.edu/getTechreport.php?techreportID=407.

Locasto, Michael E.; Stavrou, Angelos; Cretu, Gabriela F.; Keromytis, Angelos D.; Stolfo, Salvatore J.; "Quantifying Application Behavior Space for Detection and Self-Healing"; pp. 1-19; located at: http://www1.cs.columbia.edu/~gcretu/papers/cucs-017-06.pdf.

Makhija, Vikram; Herndon, Bruce; Smith, Paula; Roderick, Lisa; Zamost, Eric; Anderson, Jennifer; "VMmark: A Scalable Benchmark for Virtualized Systems: Technical Report VMware-TR-2006-002"; bearing a date of Sep. 25, 2006; pp. 1-13; VmWare, Inc.; located at: http://www.vmware.com/pdf/vmmark_intro.pdf.

"Optimizing Virtualized Datacenters: Comparing the Scalability of Intel® Xeon® Processor-based Server Platforms for VMware-based Consolidation Solutions for Intel"; Edison Group, Inc.; bearing dates of Mar. 2006 and Apr. 4, 2006; pp. 1-27; Edison Group, Inc.; located at: http://www.theedison.com/index.php/articles/175.

"Performance Benchmarking Guidelines for VMware Workstation 5.5"; VMware; bearing a date of Apr. 14, 2006; pp. 1-30; VMware, Inc.; located at: http://www.vmware.com/pdf/WS55_Benchmarking_Guidelines.pdf.

"Performance Study: A Performance Comparison of Hypervisors"; VMware; pp. 1-22; VMware, Inc.; located at: http://www.vmware.com/pdf/hypervisor_performance.pdf.

Qin, Feng; Tucek, Joseph; Sundaresan, Jagadeesan; Zhou, Yuanyuan; "Rx: Treating Bugs As Allergies—A Safe Method to Survive Software Failures"; bearing a date of Oct. 2005; pp. 1-14; ACM; located at: http://opera.cs.uiuc.edu/paper/Rx-SOSP05.pdf.

"Reference Architecture: The Portable Datacenter"; VMware:SmartronIx; bearing a date of Sep. 2006; pp. 1-10; VMware, Inc.; located at: http://whitepapers.zdnet.com/whitepaper.aspx?&tags=EMC+Corp.&docid=283992.

Rinard, Martin; Cadar, Cristian; Dumitran, Daniel; Roy, Daniel M.; Leu, Tudor; Beebee, William S., Jr.; "Enhancing Server Availability and Security Through Failure-Oblivious Computing"; MIT Computer Science and Artificial Intelligence Laboratory; pp. 1-14; located at: http://web.mit.edu/droy/www/papers/osdi04.pdf.

Sidiroglou, Stelios; Locasto, Michael E.; Boyd, Stephen W.; Keromytis, Angelos D.; "Building a Reactive Immune System for Software Services"; USENIX Association; bearing a date of 2005; pp. 149-161; USENIX Annual Technical Conference; located at: http://www1.cs.columbia.edu/~locasto/papers/RISSS.pdf.

"Technical Note: VMware ESX Server: Performance Tuning Best Practices for ESX Server 3"; VMware; pp. 1-22; VMware, Inc.; located at: http://www.vmware.com/pdf/vi_performance_tuning.pdf.

"VMware Infrastructure 3: Data Center Management and Optimization Suite"; VMware; bearing a date of 2006; pp. 1-6; VMware, Inc.; located at: http://www.virtualizeasap.com/about/resources/vi_key_features_benefits.pdf.

"VMware Performance Study: Recommendations for Aligning VMFS Partitions"; VMware; bearing dates of 1998-2006; pp. 1-10; VMware, Inc.; located at: http://www.vmware.com/pdf/esx3_partition_align.pdf.

"VMware Technical Note: Replacing VirtualCenter Server Certificates" VMware; bearing a date of Dec. 19, 2006; pp. 1-12; VMware, Inc.; located at: http://www.vmware.com/pdf/vi_vcserver_certificates.pdf.

Locasto, Michael E. et al.; "Software Self-Healing Using Collaborative Application Communities"; Internet Society Symposium on Network and distributed system security; bearing a date of 2006; pp. 1-12; San Diego, CA.

Desai, Anil; "Which Servers and Applications Are Good Virtualization Candidates?"; bearing a date of Jul. 2006 and printed on Nov. 23, 2011; pp. 1-12 website: http://searchservervirtualization.techtarget.com/tip/Which-servers-and-applications-are-good-virtualization-candidates?vgnextfmt=aiog&cc=71e604d04aa7c210VgnVCM1000000d01c80aRCRD.

* cited by examiner

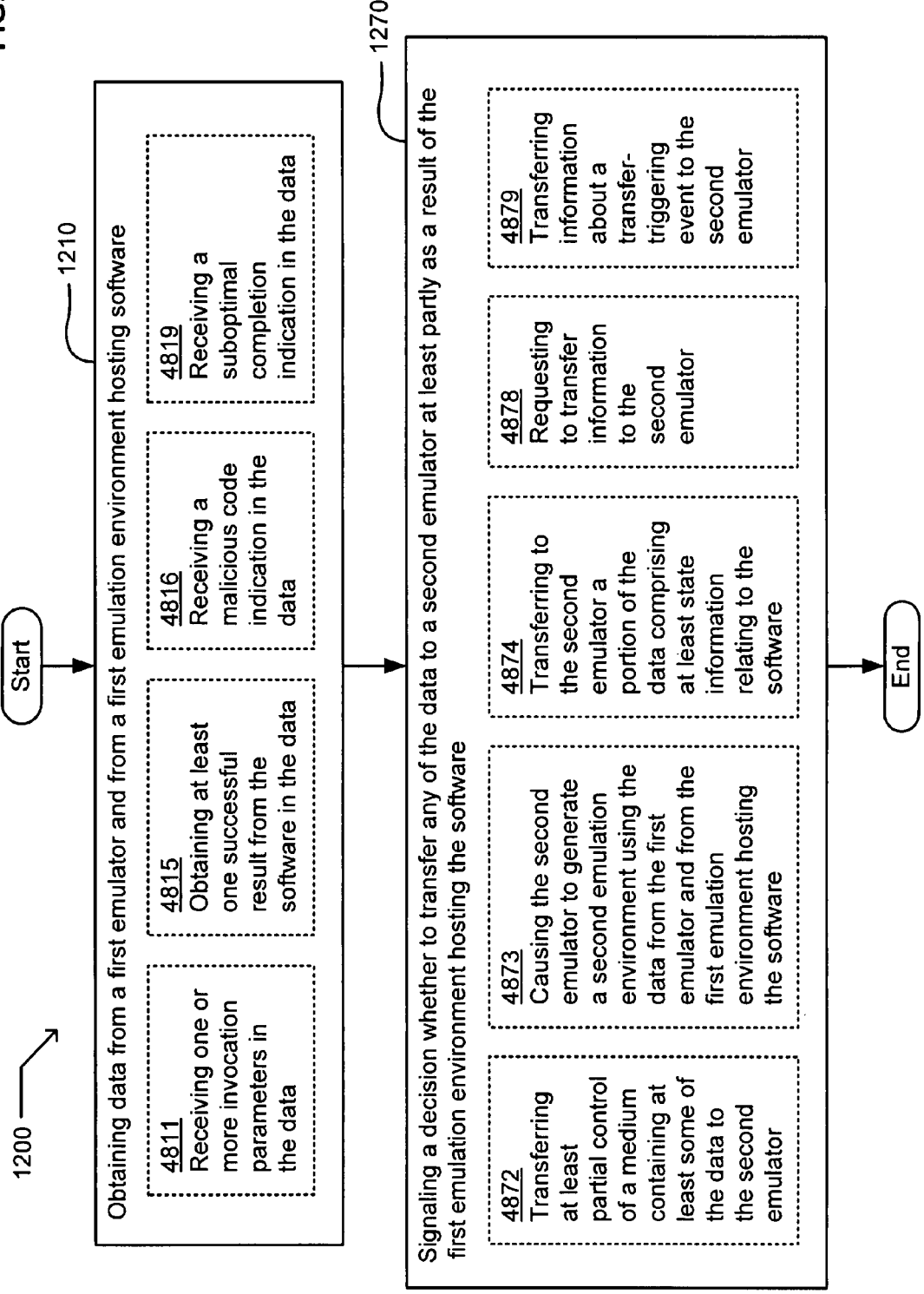

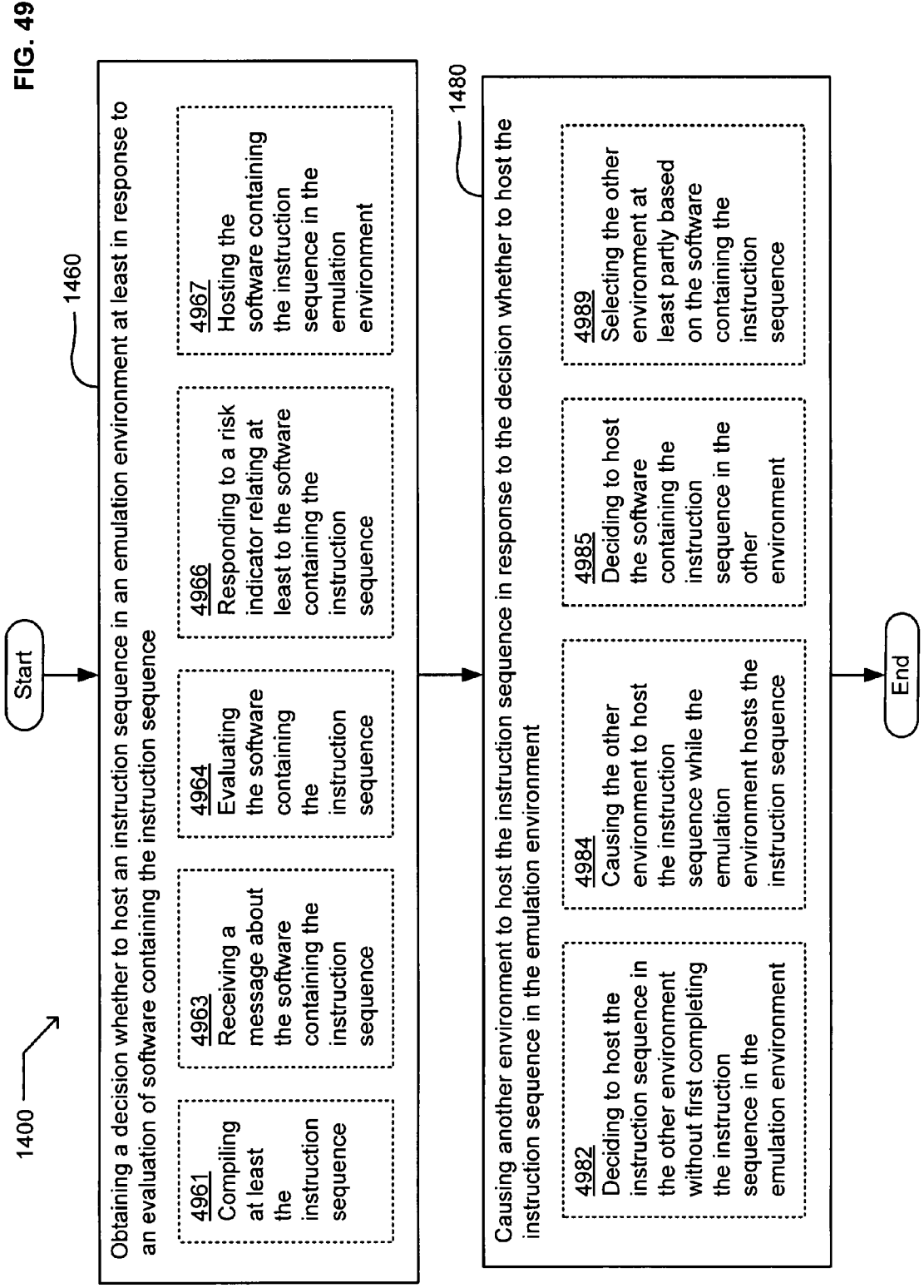

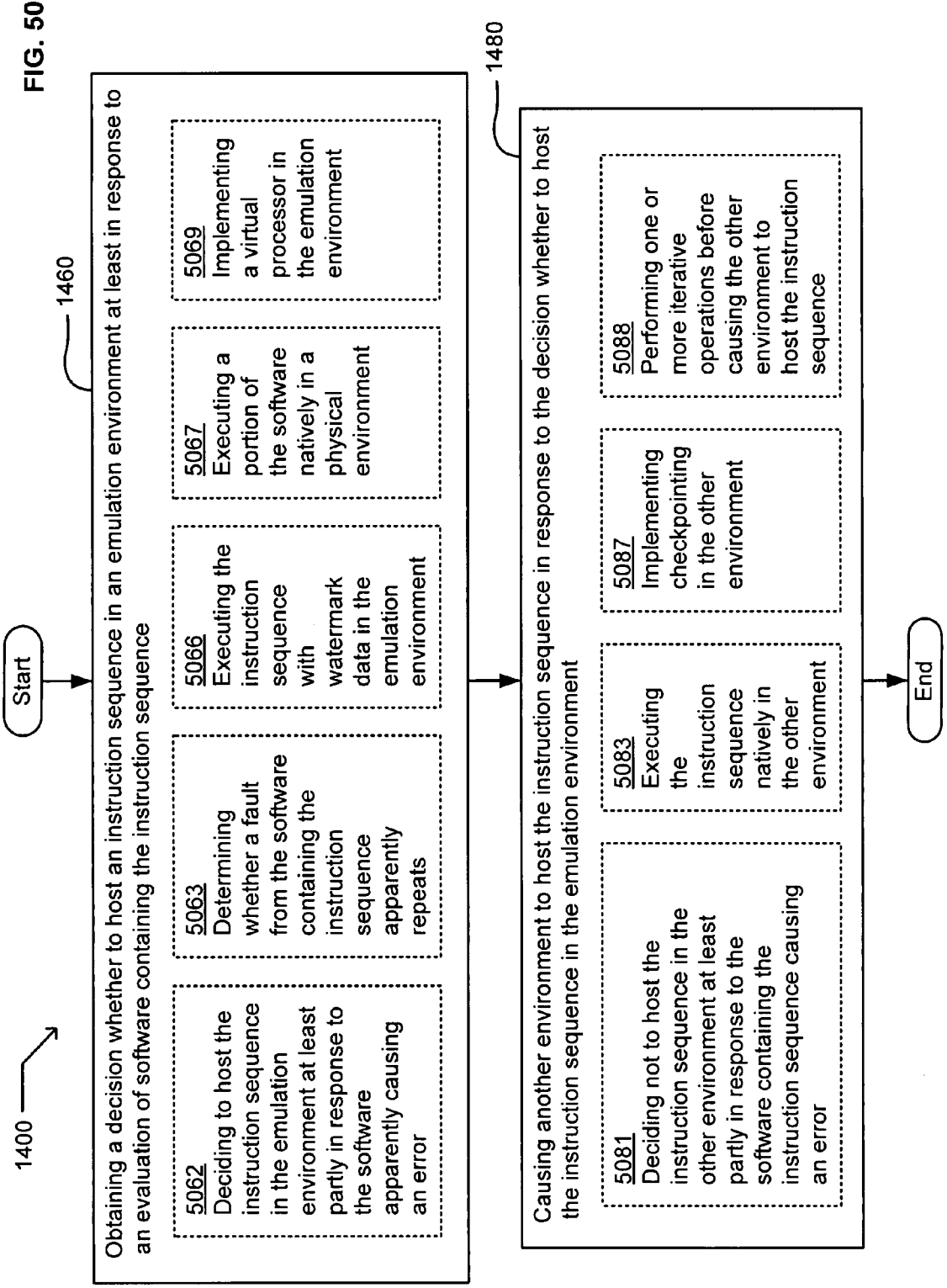

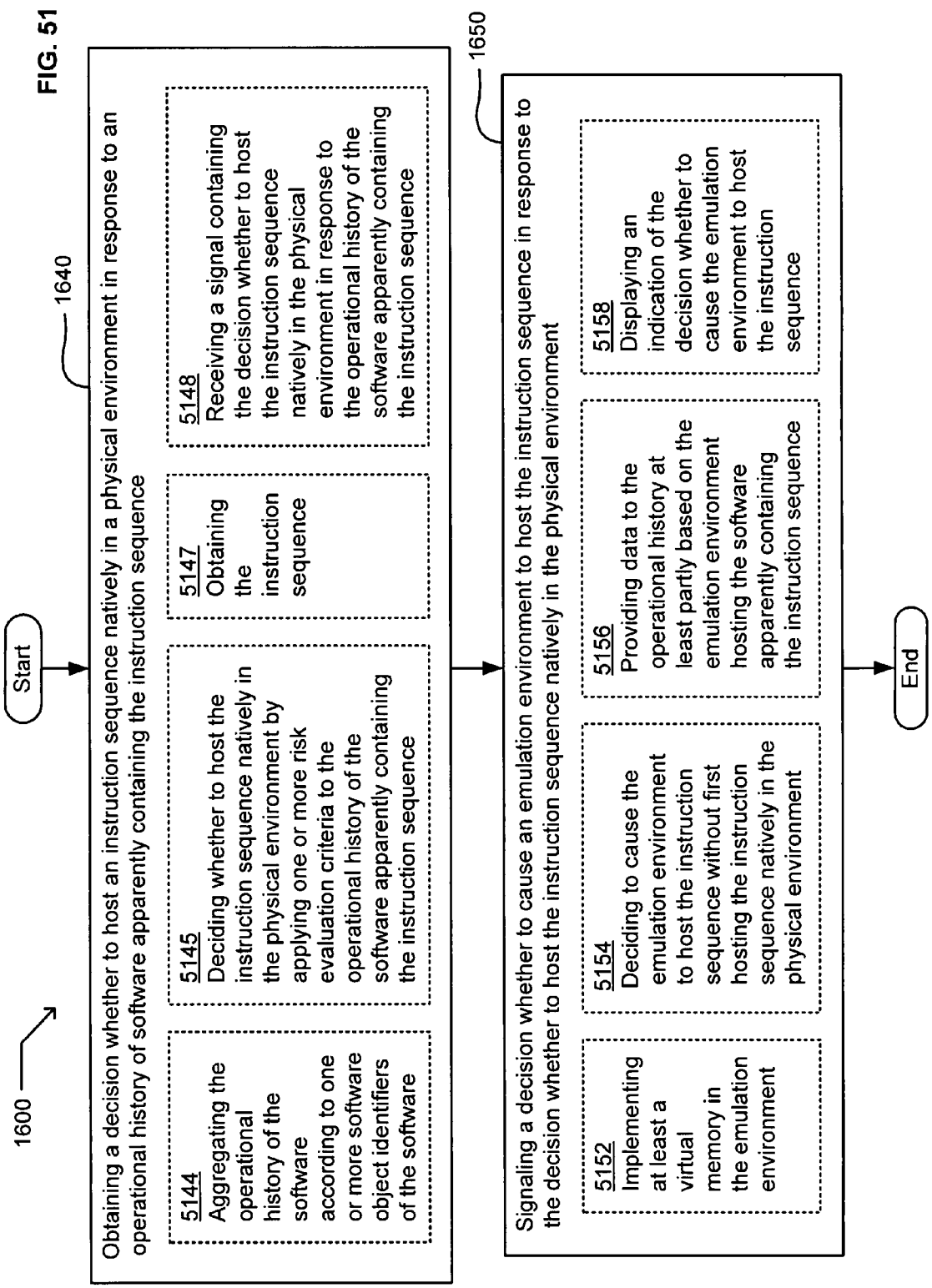

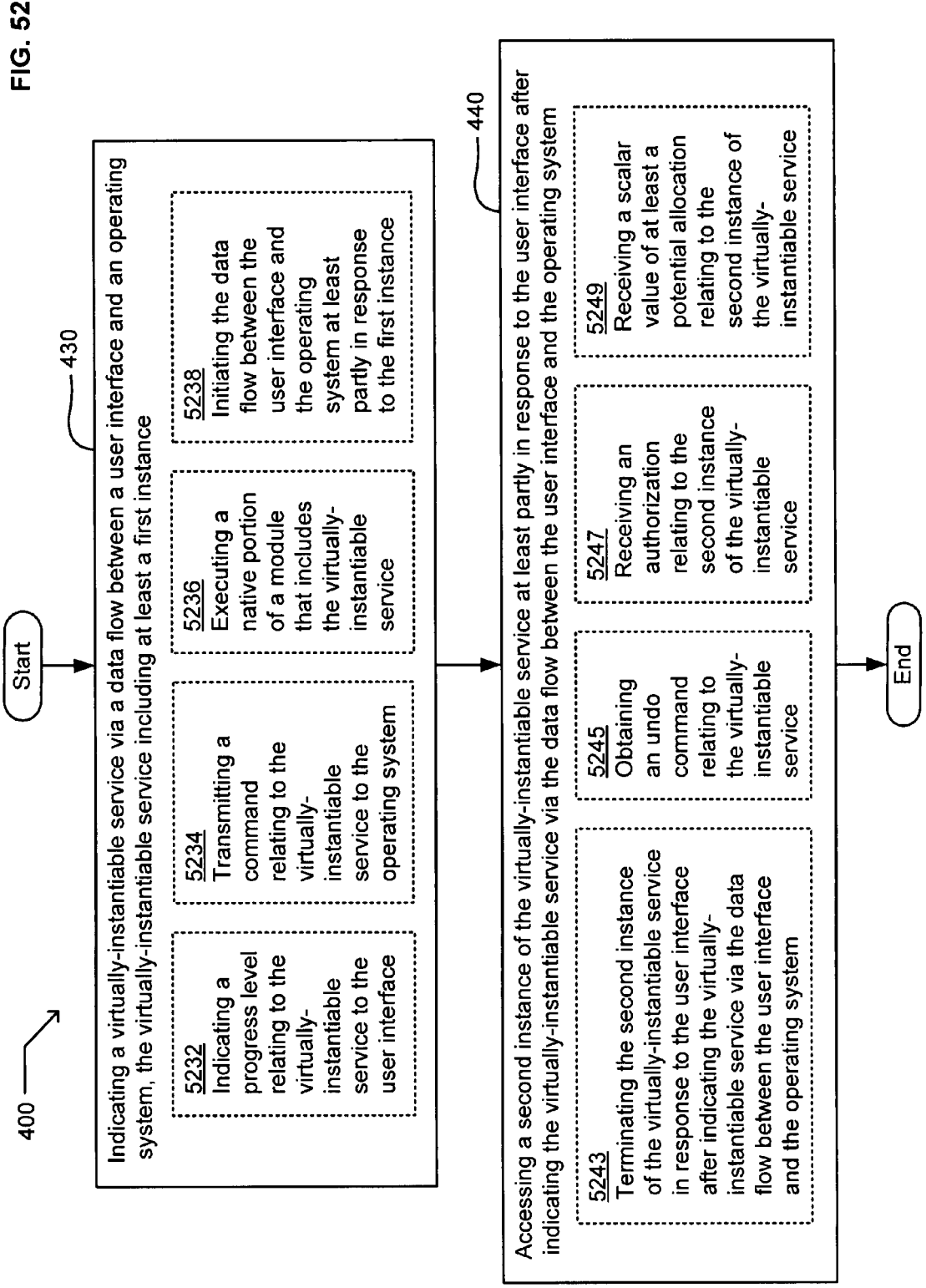

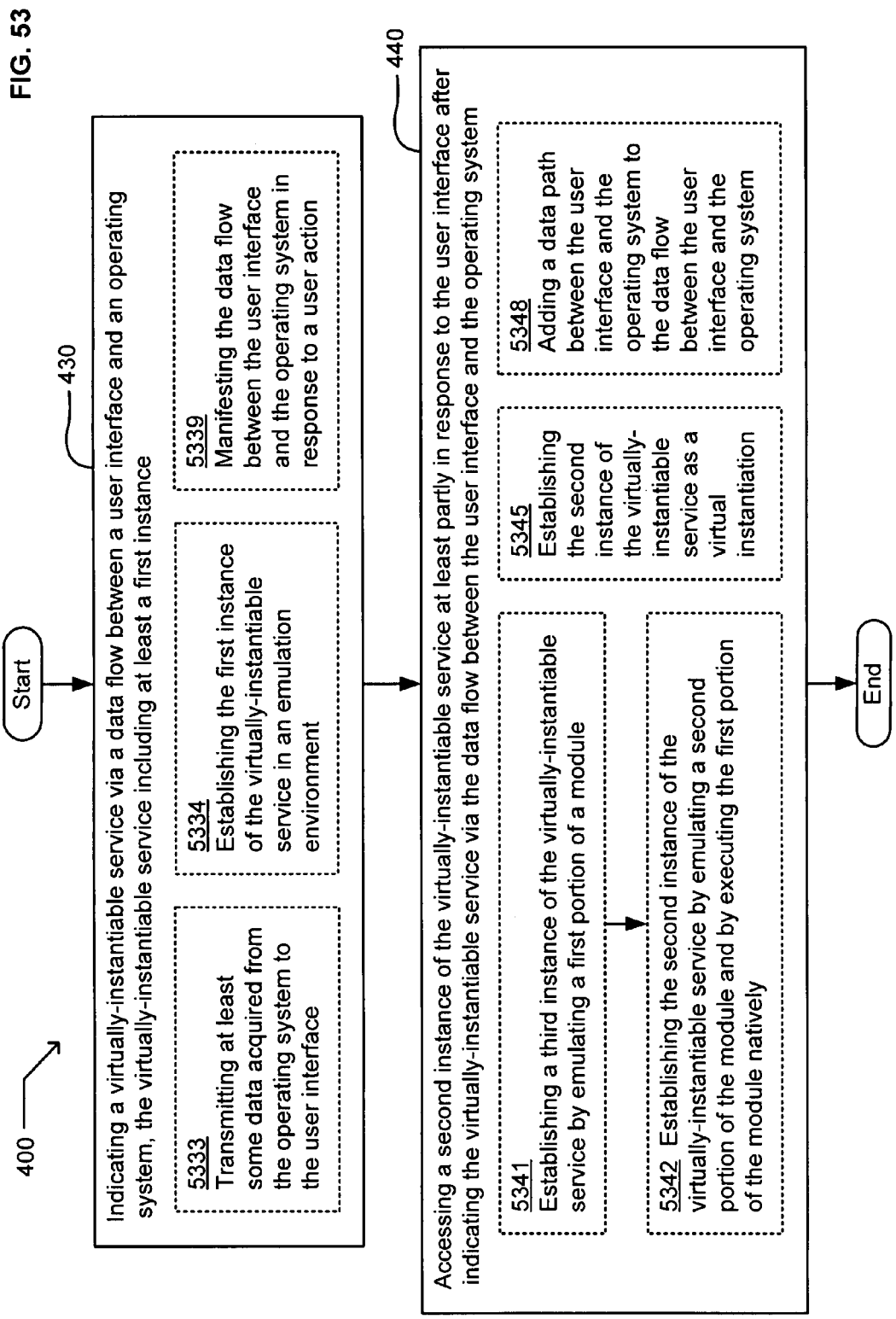

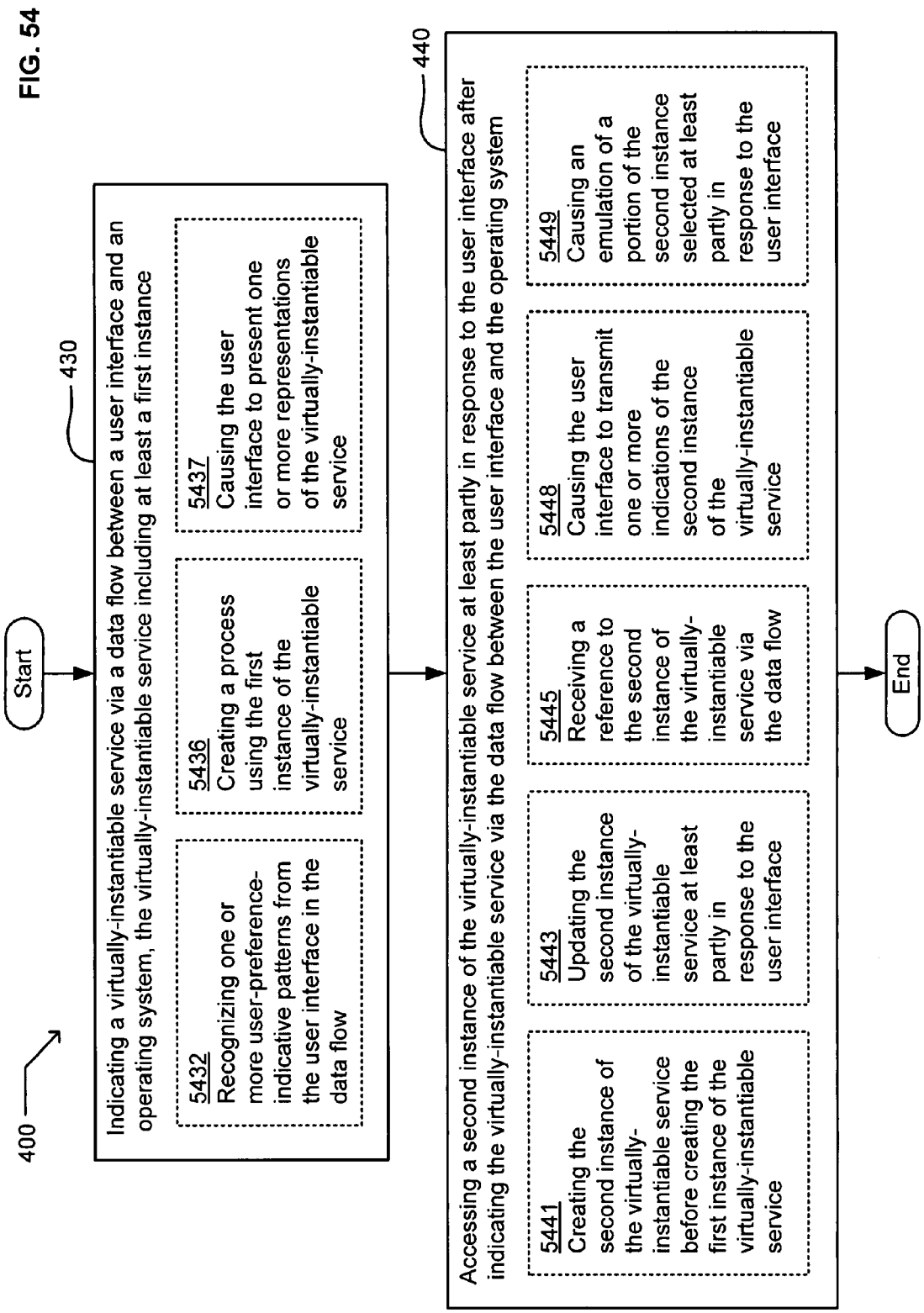

RESOURCE AUTHORIZATIONS DEPENDENT ON EMULATION ENVIRONMENT ISOLATION POLICIES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications

For purposes of the USPTO extra-statutory requirements, the present application constitutes a continuation-in-part of U.S. patent application Ser. No. 11/728,269, entitled COORDINATING INSTANCES OF A THREAD OR OTHER SERVICE IN EMULATION, naming Alexander J. Cohen, Edward K. Y. Jung, Royce A. Levien, Robert W. Lord, Mark A. Malamud, John D. Rinaldo, Jr. and Lowell L. Wood, Jr. as inventors, filed 22 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/728,309, entitled RESOURCE AUTHORIZATIONS DEPENDENT ON EMULATION ENVIRONMENT ISOLATION POLICIES, naming Alexander J. Cohen, Edward K. Y. Jung, Royce A. Levien, Robert W. Lord, Mark A. Malamud, John D. Rinaldo, Jr. and Lowell L. Wood, Jr. as inventors, filed 22 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/728,312, entitled IMPLEMENTING SECURITY CONTROL PRACTICE OMISSION DECISIONS FROM SERVICE EMULATION, naming Alexander J. Cohen, Edward K. Y. Jung, Royce A. Levien, Robert W. Lord, Mark A. Malamud, John D. Rinaldo, Jr. and Lowell L. Wood, Jr. as inventors, filed 22 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/728,268, entitled IMPLEMENTING PERFORMANCE-DEPENDENT TRANSFER OR EXECUTION DECISIONS FROM SERVICE EMULATION INDICATIONS, naming Alexander J. Cohen, Edward K. Y. Jung, Royce A. Levien, Robert W. Lord, Mark A. Malamud, John D. Rinaldo, Jr. and Lowell L. Wood, Jr. as inventors, filed 22 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/728,314, entitled IMPLEMENTING EMULATION DECISIONS IN RESPONSE TO SOFTWARE EVALUATIONS OR THE LIKE, naming Alexander J. Cohen, Edward K. Y. Jung, Royce A. Levien, Robert W. Lord, Mark A. Malamud, John D. Rinaldo, Jr. and Lowell L. Wood, Jr. as inventors, filed 22 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/728269, entitled COORDINATING INSTANCES OF A THREAD OR OTHER SERVICE IN EMULATION, naming Alexander J. Cohen, Edward K. Y. Jung, Royce A. Levien, Robert W. Lord, Mark A. Malamud, John D. Rinaldo, Jr. and Lowell L. Wood, Jr. as inventors, filed contemporaneously herewith, which is currently co-pending, or is an application of which a currently co-pending application is entitled to the benefit of the filing date Ser. No. 11/728269.

For purposes of the USPTO extra-statutory requirements, the present application constitutes a continuation-in-part of U.S. patent application Ser. No. 11/728268, entitled IMPLEMENTING PERFORMANCE-DEPENDENT TRANSFER OR EXECUTION DECISIONS FROM SERVICE EMULATION INDICATIONS, naming Alexander J. Cohen, Edward K. Y. Jung, Royce A. Levien, Robert W. Lord, Mark A. Malamud, John D. Rinaldo, Jr. and Lowell L. Wood, Jr. as inventors, filed contemporaneously herewith, which is currently co-pending, or is an application of which a currently co-pending application is entitled to the benefit of the filing date Ser. No. 11/728268.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

In one aspect, a method includes but is not limited to obtaining a software flaw indication resulting from an emulation of a first instance of a thread at least partly in response to a first input from a user interface and manipulating a second instance of the thread at least partly in response to a second input arriving from the user interface after beginning the emulation of the first instance of the thread. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining a software flaw indication resulting from an emulation of a first instance of a thread at least partly in response to a first input from a user interface and circuitry for manipulating a second instance of the thread at least partly in response to a second input arriving from the user interface after beginning the emulation of the first instance of the thread. In addition to the foregoing, other system aspects are described in the claims, drawings, and text forming a part of the present disclosure.

In one aspect, a method includes but is not limited to indicating a virtually-instantiable service via a data flow between a user interface and an operating system, the virtually-instantiable service including at least a first instance and accessing a second instance of the virtually-instantiable service at least partly in response to the user interface after indicating the virtually-instantiable service via the data flow between the user interface and the operating system. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for indicating a virtually-instantiable service via a data flow between a user interface and an operating system, the virtually-instantiable service including at least a first instance and circuitry for accessing a second instance of the virtually-instantiable service at least partly in response to the user interface after indicating the virtually-instantiable service via the data flow between the user interface and the operating system. In addition to the foregoing, other system aspects are described in the claims, drawings, and text forming a part of the present disclosure.

In one aspect, a method includes but is not limited to obtaining a resource authorization dependent upon apparent compliance with a policy of causing an emulation environment to isolate a first software object type from a second software object type and signaling a decision whether to comply with the policy of causing the emulation environment to isolate the first software object type from the second software object type. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining a resource authorization dependent upon apparent compliance with a policy of causing an emulation environment to isolate a first software object type from a second software object type and circuitry for signaling a decision whether to comply with the policy of causing the emulation environment to isolate the first software object type from the second software object type. In addition to the foregoing, other system aspects are described in the claims, drawings, and text forming a part of the present disclosure.

In one aspect, a method includes but is not limited to obtaining an indication of an mulation of a service in a first environment with a first security control practice and signaling a decision whether to use a second environment without the first security control practice in performing at least a portion of the service as a result of the indication of the emulation of the service in the first environment with the first security control practice. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining an indication of an emulation of a service in a first environment with a first security control practice and circuitry for signaling a decision whether to use a second environment without the first security control practice in performing at least a portion of the service as a result of the indication of the emulation of the service in the first environment with the first security control practice. In addition to the foregoing, other system aspects are described in the claims, drawings, and text forming a part of the present disclosure.

In one aspect, a method includes but is not limited to obtaining one or more gradational norms of software performance in an emulation environment and signaling a decision whether to allow a software object to execute in another environment at least partly as a result of whether the software object apparently performed in conformity with the one or more gradational norms of software performance in the emulation environment. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining one or more gradational norms of software performance in an emulation environment and circuitry for signaling a decision whether to allow a software object to execute in another environment at least partly as a result of whether the software object apparently performed in conformity with the one or more gradational norms of software performance in the emulation environment. In addition to the foregoing, other system aspects are described in the claims, drawings, and text forming a part of the present disclosure.

In one aspect, a method includes but is not limited to obtaining data from a first emulator and from a first emulation environment hosting software and signaling a decision whether to transfer any of the data to a second emulator at least partly as a result of the first emulation environment hosting the software. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining data from a first emulator and from a first emulation environment hosting software and circuitry for signaling a decision whether to transfer any of the data to a second emulator at least partly as a result of the first emulation environment hosting the software. In addition to the foregoing, other system aspects are described in the claims, drawings, and text forming a part of the present disclosure.

In one aspect, a method includes but is not limited to obtaining a decision whether to host an instruction sequence in an emulation environment at least in response to an evaluation of software containing the instruction sequence and causing another environment to host the instruction sequence in response to the decision whether to host the instruction sequence in the emulation environment. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining a decision whether to host an instruction sequence in an emulation environment at least in response to an evaluation of software containing the instruction sequence and circuitry for causing another environment to host the instruction sequence in response to the decision whether to host the instruction sequence in the emulation environment. In addition to the foregoing, other system aspects are described in the claims, drawings, and text forming a part of the present disclosure.

In one aspect, a method includes but is not limited to obtaining a decision whether to host an instruction sequence natively in a physical environment in response to an operational history of software apparently containing the instruction sequence and signaling a decision whether to cause an emulation environment to host the instruction sequence in response to the decision whether to host the instruction sequence natively in the physical environment. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining a decision whether to host an instruction sequence natively in a physical environment in response to an operational history of software apparently containing the instruction sequence and circuitry for signaling a decision whether to cause an emulation environment to host the instruction sequence in response to the decision whether to host the instruction sequence natively in the physical environment. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 46-48 depict variants of the flow of FIG. 12.
FIGS. 49-50 depict variants of the flow of FIG. 14.
FIG. 51 depicts variants of the flow of FIG. 16.
FIGS. 52-54 depict variants of the flow of FIG. 4.

DETAILED DESCRIPTION

Figure 2:
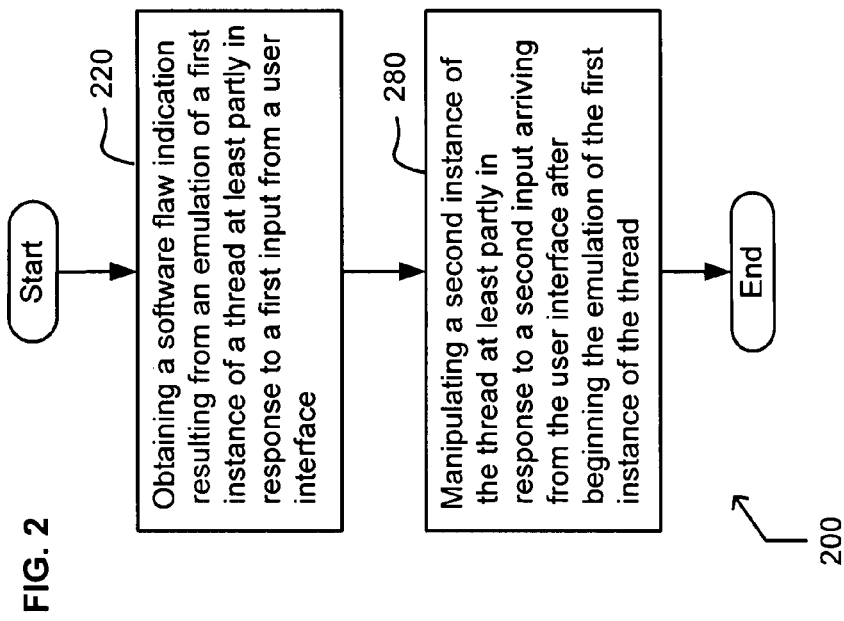
FIG. 2 depicts a high-level logic flow of an operational process.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In the following detailed description, reference is made to the accompanying drawings, which form a part hereof. The use of the same symbols in different drawings typically indicates similar or identical items. The illustrative embodiments described in the detailed description, drawings, and claims are not meant to be limiting. Other embodiments may be utilized, and other changes may be made, without departing from the spirit or scope of the subject matter presented here.

Following are a series of systems and flowcharts depicting implementations of processes. For ease of understanding, the flowcharts are organized such that the initial flowcharts present implementations via an initial "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 1:
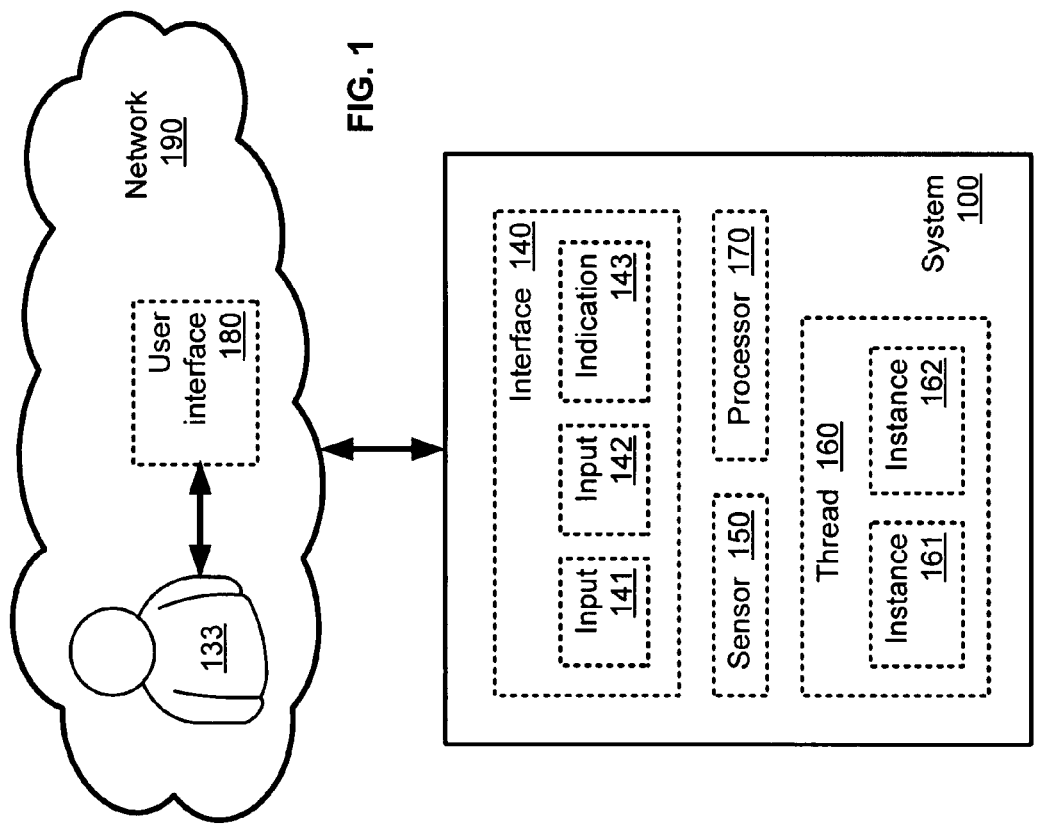
FIG. 1 depicts an exemplary environment in which one or more technologies may be implemented.

With reference now to FIG. 1, shown is an example of a system that may serve as a context for introducing one or more processes and/or devices described herein. As shown system 100 is operable to communicate with network 190, which can include user interface 180 accessible to user 133. System 100 can include one or more instances of interfaces 140, sensors 150, processors 170, or threads 160. Interface 140 can, optionally and at various times, handle one or more of input 141, input 142, or warning 143. Thread 160 can likewise include instances 161, 162 as described below. (In some embodiments, a thread, sequence, application, session, or similar object can have two or more "instances" that are functionally identical but may have differences in instance identity, progress status, location, set membership, policy context, or the like.)

With reference now to FIG. 2, there is shown a high-level logic flow 200 of an operational process. Flow 200 includes operation 220—obtaining a software flaw indication resulting from an emulation of a first instance of a thread at least partly in response to a first input from a user interface (e.g. sensor 150 generating an indication 143 of an error or the like from instance 161 of thread 160 being executed by emulation under external control). The emulation itself can be in response to received input 141 resulting, in some instances, from a task request or the like originating at user interface 180. The software flaw indication can take any of many forms, and can optionally include other information such as an event type or time.

Flow 200 further includes operation 280—manipulating a second instance of the thread at least partly in response to a second input arriving from the user interface after beginning the emulation of the first instance of the thread (e.g. processor 170 creating, switching to, deleting, or otherwise acting upon another instance 162 of thread 160 in response to input 142). In some embodiments, for example, input 142 can be received as user data that user interface 180 merely transmits to interface 140. (In some embodiments, an item selection or other decision can occur "in response to" one or more of a prior or contemporaneous measurement, decision, transition, circumstance, or other determinant. Any such decision may likewise depend upon one or more other prior, contemporaneous, or potential determinants, in various implementations as taught herein.) Further examples are provided below, particularly in descriptions relating to FIGS. 38, 39 and 52-54.

Figure 3:
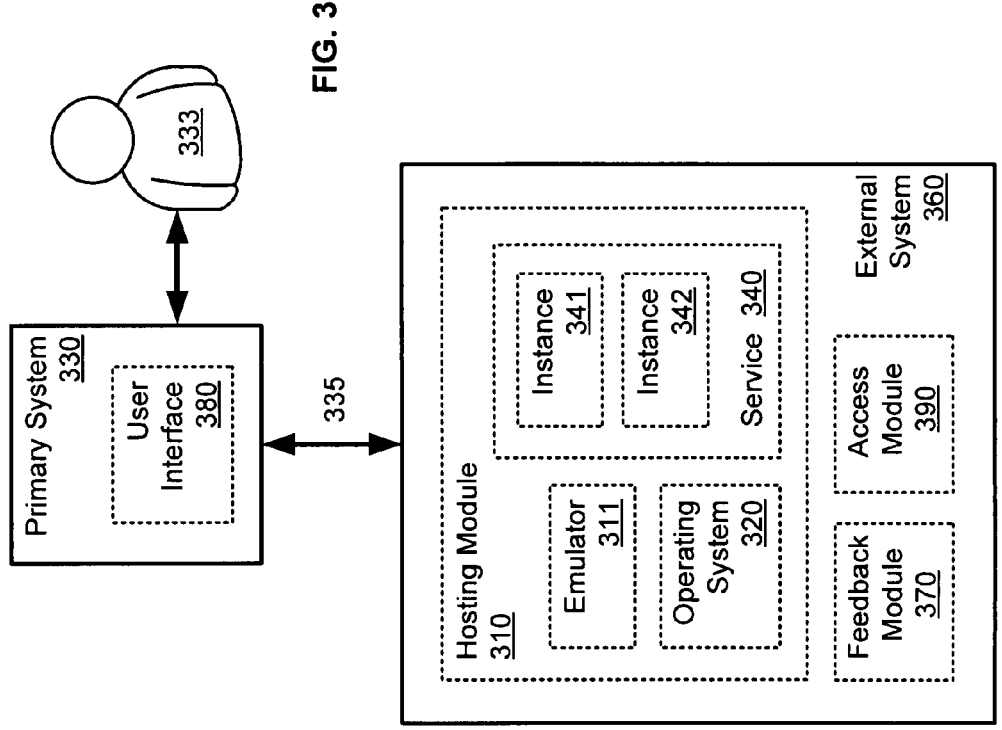
FIG. 3 depicts an exemplary environment in which one or more technologies may be implemented.

With reference now to FIG. 3, shown is an example of a system that may serve as a context for introducing one or more processes and/or devices described herein. As shown primary system 330 can be accessible to user 333 via (optional) user interface 380, and is operatively coupled with external system 360. External system 360 can include one or more of hosting module 310, feedback module 370, or access module 390. Hosting module 310 can include one or more of emulator 311, operating system 320, service 340, or instances 341, 342 thereof. Hosting module 310 can be coupled with (at least operating system 320 of) external system 360 via data flow 335 in either or both directions.

In some embodiments, a "service" may include a distinct part of a functionality provided on one side of an interface to an entity on the other side of the interface, logic that implements an interface, an executable code module, or some other useful role performed by a computerized apparatus. A special-purpose module may fulfill such a role in a native environment (in a first instance, for example) to optimize execution speed. Alternatively or additionally, some or all of each other instance of the module may be executed virtually in a pure emulation environment or in an adaptive environment for enhanced visibility or otherwise for flexibility. See, e.g., Qin, Feng; Tucek, Joseph; Sundaresan, Jagadeesan; Zhou, Yuanyuan; "Rx: Treating Bugs As Allergies—A Safe Method to Survive Software Failures"; bearing a date of October 2005; pp. 1-14; ACM (at http://opera.cs.uiuc.edu/paper/Rx-SOSP05.pdf); Sidiroglou, Stelios; Locasto, Michael E.; Boyd, Stephen W.; Keromytis, Angelos D.; "Building a Reactive Immune System for Software Services"; USENIX Association; bearing a date of 2005; pp. 149-161; USENIX Annual Technical Conference (at http://www1.cs.columbia.edu/~locasto/papers/RISSS.pdf); Locasto, Michael E.; Stavrou, Angelos; Cretu, Gabriela F.; Keromytis, Angelos D.; Stolfo, Salvatore J.; "Quantifying Application Behavior Space for Detection and Self-Healing"; pp. 1-19 (at http://www1.cs.columbia.edu/~gcretu/papers/cucs-017-06.pdf); and "VMware Infrastructure 3: Data Center Management and Optimization Suite"; VMware; bearing a date of 2006; pp. 1-6; VMware, Inc. (at http://www.virtualizeasap.com/about/resources/vi_key_features_benefits.pdf).

Figure 4:
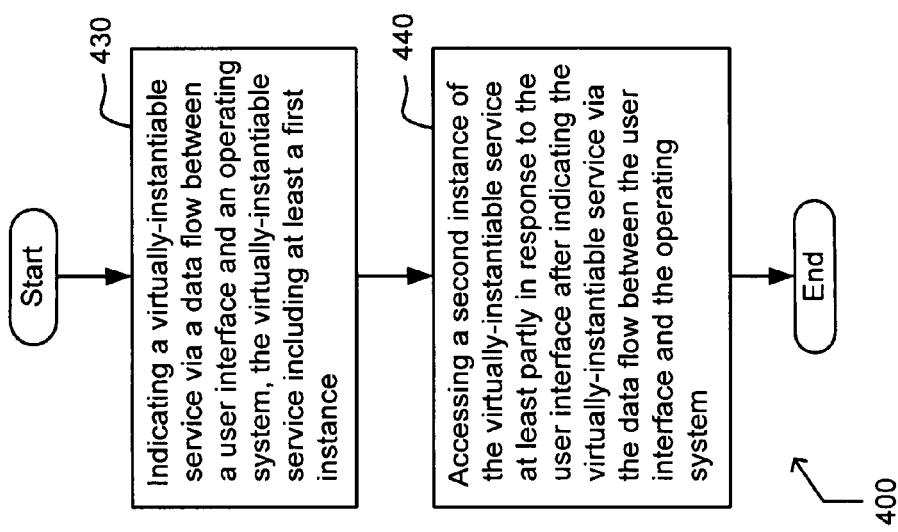
FIG. 4 depicts a high-level logic flow of an operational process.

With reference now to FIG. 4, there is shown a high-level logic flow 400 of an operational process. Flow 400 includes operation 430—indicating a virtually-instantiable service via a data flow between a user interface and an operating system, the virtually-instantiable service including at least a first instance (e.g. feedback module 370 indicating service 340 via flow 335 between operating system 320 and user interface 380). Emulator 311 can emulate (virtual) instance 341 of service 340, for example.

Flow 400 further includes operation 440—accessing a second instance of the virtually-instantiable service at least partly in response to the user interface after indicating the virtually-instantiable service via the data flow between the user interface and the operating system (e.g. access module 390 accessing another instance 342 of service 340 in response to user interface 380 after performing operation 440 at least partially, for example). Such access can occur in response to a message flow to user interface 380, for example, in response to a command flow from user 333, or in response to some later event enabled by such flow. In some variants, one or more of the instances 341, 342 can reside in primary system 330 or otherwise local to user 333, especially in a network embodiment in which the service is distributed. Further examples are provided below, particularly in descriptions relating to FIGS. 38, 39, and 52-54.

Figure 5:
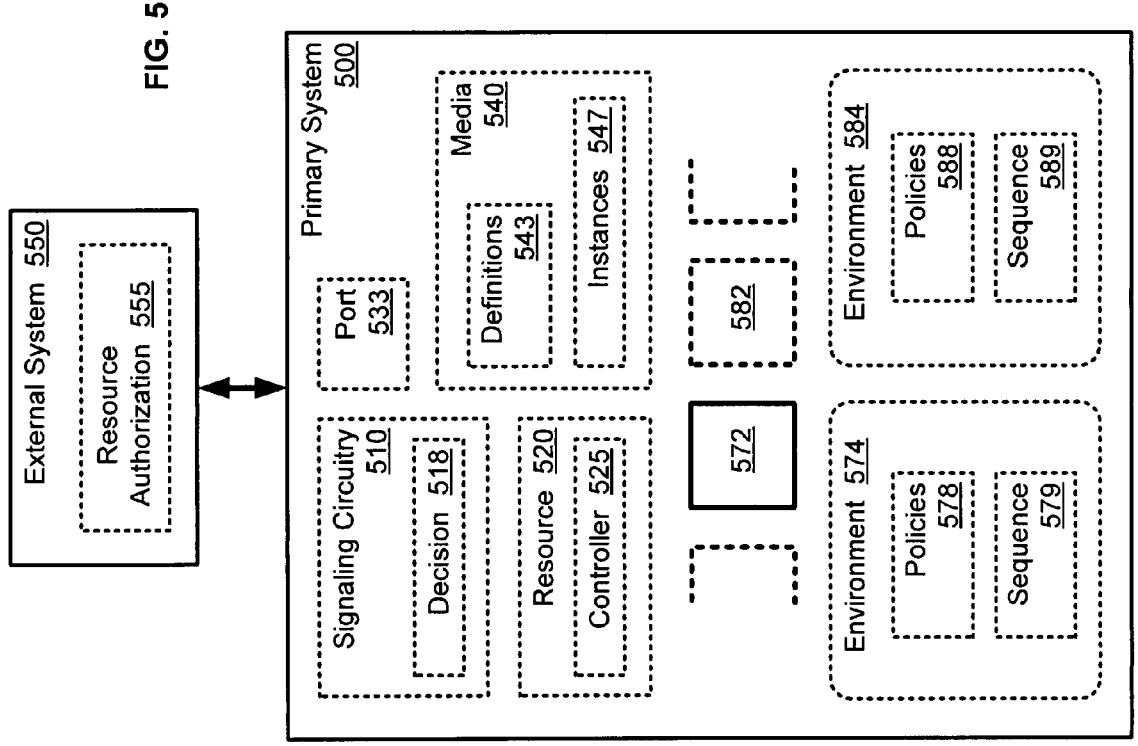
FIG. 5 depicts an exemplary environment in which one or more technologies may be implemented.

With reference now to FIG. 5, shown is an example of a system that may serve as a context for introducing one or more processes and/or devices described herein. As shown primary system 500 includes processor 572 and can include one or more of additional processor(s) 582, environments 574, 584, media 540, or port 533. Primary system 500 can likewise obtain one or more of controller 525 (e.g. within resource 520) or decision 518 (e.g. within signaling circuitry 510). Media 540 can include one or more definitions 543 or instances 547. Primary system 500 can be linked to one or more external system 550, which can be configured to obtain resource authorization 555 such as is described below. Environment 574 can include one or more of policies 578 or sequence(s) 579, and environment 584 can likewise include one or more of policies 588 or sequence(s) 589.

In some embodiments, an "environment" can include one or more primary hardware elements (e.g. a processor or its working space) and one or more primary software elements (e.g. a library module or other instruction sequences). An environment can contain other environments as components, some or all of which may be implemented virtually or physically, in some embodiments. Alternatively or additionally, some or all such components may be duplicated or otherwise adaptively spawned to implement embodiments as described herein.

Figure 6:
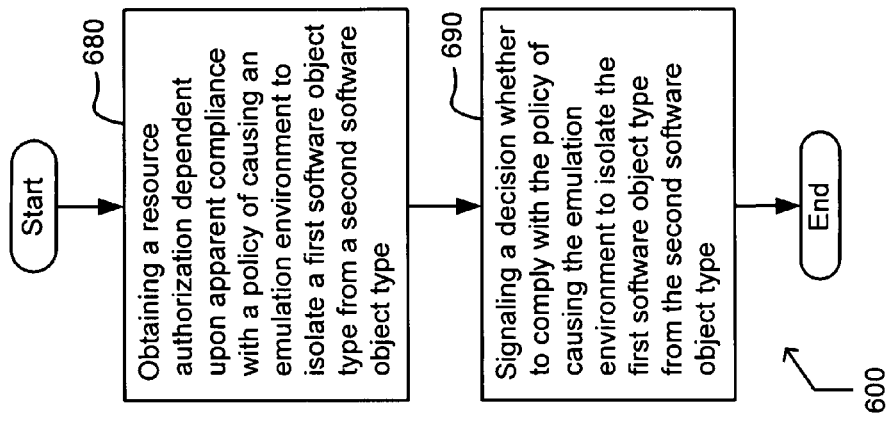
FIG. 6 depicts a high-level logic flow of an operational process.

With reference now to FIG. 6, there is shown a high-level logic flow 600 of an operational process. Flow 600 includes operation 680—obtaining a resource authorization dependent upon apparent compliance with a policy of causing an emulation environment to isolate a first software object type from a second software object type (e.g. port 533 receiving an external resource authorization 555 specifying a conditional access to a resource). Alternatively or additionally, a local access controller 525 can limit access to part or all of a local resource 520 with a similar apparent-compliance-dependent resource authorization—optionally implemented as device-executable code or other instruction sequence. Such access can depend upon one or more of a monitoring system output, a user input, a system-wide policy, or some other manifestation of apparent compliance, for example, with a policy of isolating some types of target software through emulation. The software object types can be defined by one or more definitions 543, optionally in a context in which media 540 contain one or more instances 547 of each defined type. The isolation mode(s) can function in any of several ways, mutual or otherwise, as described below.

Flow 600 further includes operation 690—signaling a decision whether to comply with the policy of causing the emulation environment to isolate the first software object type from the second software object type (e.g. signaling circuitry 510 signaling decision 518 relating to whether the isolation policy will be used by an emulation environment). In some embodiments, "isolation policies" can be associated selectively with certain resources or resource types, at least partly protecting or constraining them from harmful interactions with other items or each other. Those skilled in the art will recognize a variety of such policies exemplified in these teachings and can readily implement others without undue experimentation. Processor 572 can signal such compliance, for example, by including such a policy in policies 578 of emulation environment 574. A negative decision can likewise be signaled by noncompliance, a failure to include any such policy, by routing the policy or resource authorization to another environment, or the like. In some variants, one or more other processors 582 are configured for one or more of monitoring processor 572, implementing an isolation policy, generating the decision whether to comply with the policy, or the like. Further examples are provided below, particularly in descriptions relating to FIGS. 40-42.

Figure 7:
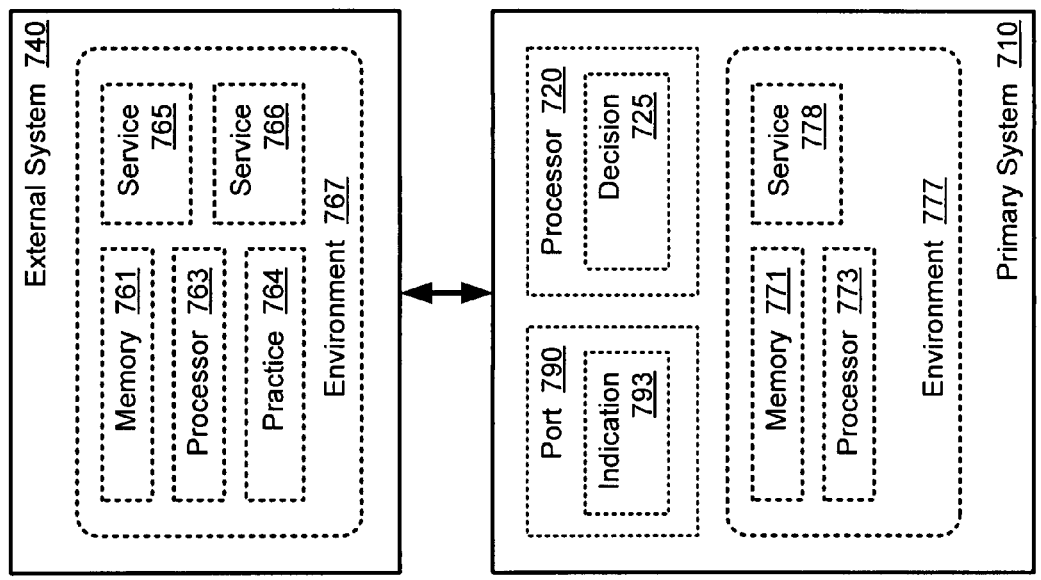
FIG. 7 depicts an exemplary environment in which one or more technologies may be implemented.

With reference now to FIG. 7, shown is an example of a system that may serve as a context for introducing one or more processes and/or devices described herein. As shown primary system 710 can include one or more instances of indications 793 (at port 790, e.g.), decisions 725 (at processor 720, e.g.), memories 771, processors 773, or services 778 (of environment 777, e.g.). As shown, primary system 710 is operatively coupled to at least external system 740, which can include environment 767 with one or more of memory 761, processor 763, practice 764, service 765, or service 766.

Figure 8:
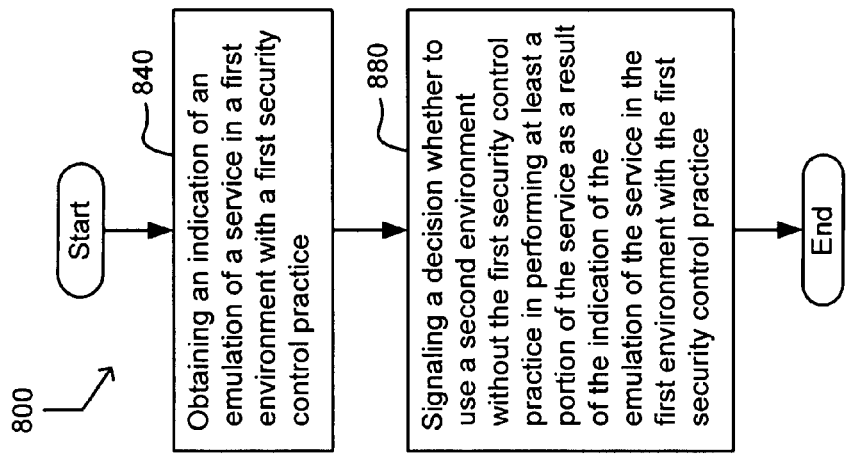
FIG. 8 depicts a high-level logic flow of an operational process.

With reference now to FIG. 8, there is shown a high-level logic flow 800 of an operational process. Flow 800 includes operation 840—obtaining an indication of an emulation of a service in a first environment with a first security control practice (e.g. port 790 receiving indication 793 of services 765, 766 executing in emulation environment 767 at least with security control practice 764). In some embodiments, a "security control practice" can include any data handling, resource control, authorization or other physical or emulated protocols of an environment that helps assure the integrity of data, instructions, or behaviors of software objects functioning normally within the environment. Practice 764 may preclude certain transactions or limit permissible activities of virtual processor 763 or with virtual memory 761, for example. (In some embodiments, a thing's "emulation" can refer to the thing emulating or being emulated as an occurrence, manner, efficiency, outcome, etc.)

Flow 800 further includes operation 880—signaling a decision whether to use a second environment without the first security control practice in performing at least a portion of the service as a result of the indication of the emulation of the service in the first environment with the first security control practice (e.g. processor 720 acting upon or transmitting decision 725 to perform one or more services 765, 766 without security control practice 764). In some embodiments, deciding whether to take an action "as a result of" one or more determinants can result in the action, or in no action, depending upon the determinant(s). Alternatively or additionally, such a decision can result in a provisional, final, or hybrid resolution for later uses: implementation, confirmation, transmission, recordation, analysis or the like.

In various embodiments, the decision can specify one or more of which service(s) to perform, which portion(s) to perform, which environment(s) to use, which practice(s) to use, whether or when to proceed with a specific configuration, what other conditions might warrant a delay, or the like. In some variants, an affirmative decision may be warranted by the emulation encountering one or more of (a) a substantial performance loss or other cost apparently resulting from implementing the practice; (b) a problem that the practice does not solve; (c) an opportunity to substitute an upgraded practice; or the like. For example, such emulations can reflect an apparent or nominal incompatibility between the practice and an element in the second environment: service 766 may be incompatible with a type of memory 771, processor 773, or service 778 in the "second" environment 777 under consideration. Further examples are provided below, particularly in descriptions relating to FIGS. 43-45.

Figure 9:
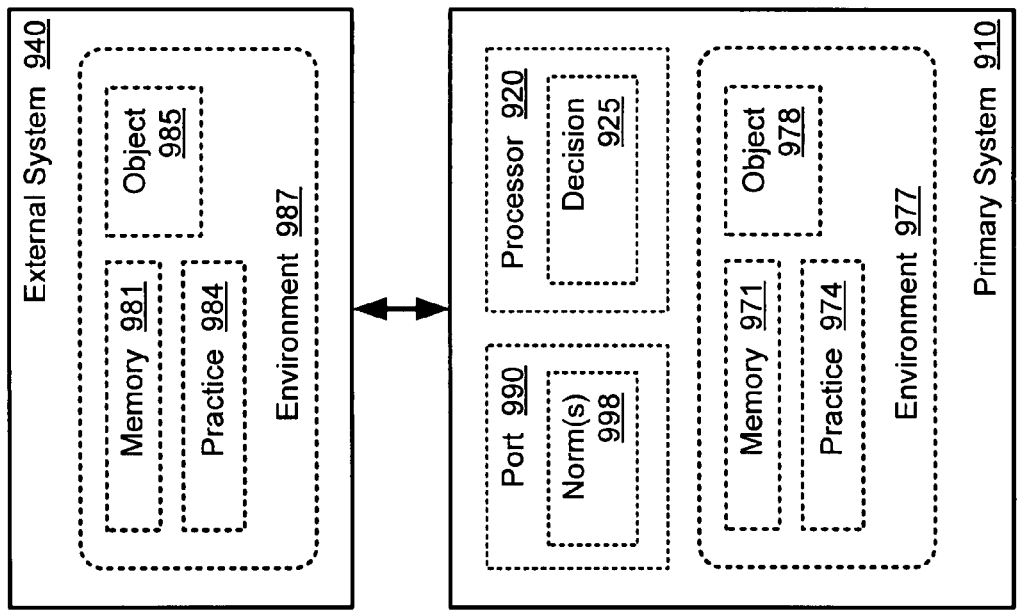
FIG. 9 depicts an exemplary environment in which one or more technologies may be implemented.

With reference now to FIG. 9, shown is an example of a system that may serve as a context for introducing one or more processes and/or devices described herein. As shown primary system 910 can include one or more instances of norm(s) 998 (at port 990, e.g.), decisions 925 (at processor 920, e.g.), memories 971, practices 974, or other objects 978 (of environment 977, e.g.). As shown, primary system 910 is operatively coupled to at least external system 940, which can include one or more environment 987 each with one or more of memory 981, practice 984, or other object(s) 985.

Figure 10:
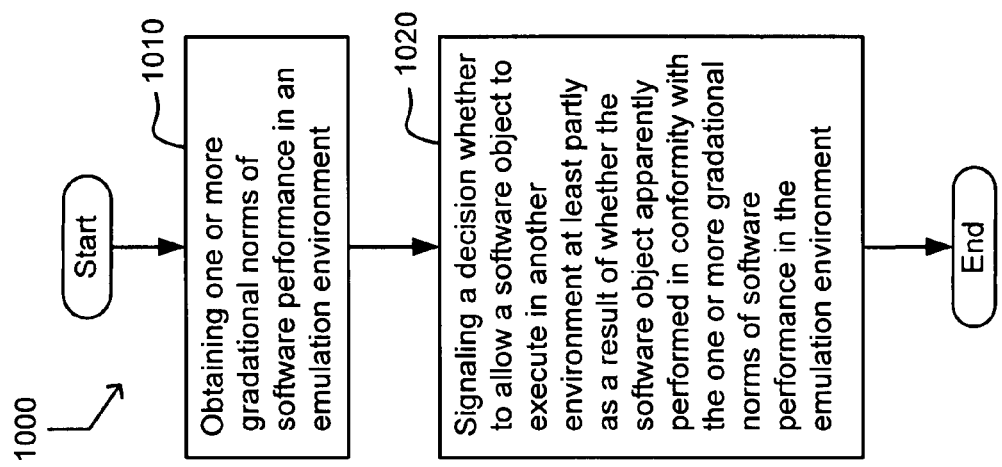
FIG. 10 depicts a high-level logic flow of an operational process.

With reference now to FIG. 10, there is shown a high-level logic flow 1000 of an operational process. Flow 1000 includes operation 1010—obtaining one or more gradational norms of software performance in an emulation environment (e.g. port 990 receiving one or more software performance range limits, physical measurements, or other norm(s) 998 from environment 987 of external system 940). In some embodiments, a "gradational norm" of performance can include one or more instances of performance metrics or other quotas, output ranges, resource usage levels, completion times, performance trends, complaints or error frequencies, success ratios, analog voltages, or the like in association with some software configuration or other object. Alternatively or additionally, gradational norms can include one or more ranges or thresholds against which an observed quantity can be compared. Such norms can be established by setting thresholds against which an emulator or evaluation module, for example, can compare a performance metric. (The results of such comparisons, or other Boolean-type outcome values, can likewise be provided at operation 1010 and can affect the decision of operation 1020, in some embodiments.)

Flow 1000 further includes operation 1020—signaling a decision whether to allow a software object to execute in another environment at least partly as a result of whether the software object apparently performed in conformity with the one or more gradational norms of software performance in the emulation environment (e.g. processor 920 signaling a decision 925 not to accept or not to execute object 985 in environment 977 of primary system 910 based on an apparent failure of object 985 to meet a minimum or maximum threshold in environment 977. This can occur, for example, in embodiments in which environment 977 is "the" emulation environment of operation 1010 and in which environment 987 comprises the "other" environment(s) of operation 1020. Alternatively or additionally, processor 920 can be configured to perform flow 1000 by deciding whether to transmit or authorize object 978 for use in environment 987 at least partly as a result of whether object 978 apparently performed in conformity with the norm(s) while emulated in environment 977. In some variants, the gradational norm(s) can likewise be derived or otherwise obtained by a validation system to ensure compliance with a performance requirement of a target system (e.g. external system 940). Further examples are provided below, particularly in descriptions relating to FIGS. 43-45.

Figure 11:
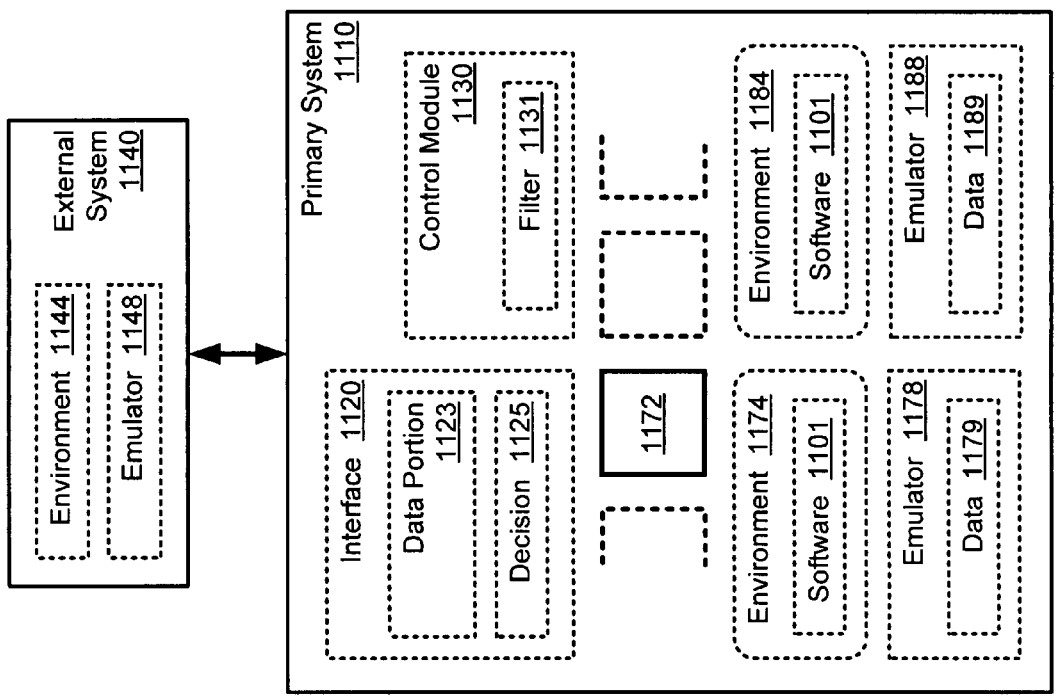
FIG. 11 depicts an exemplary environment in which one or more technologies may be implemented.

With reference now to FIG. 11, shown is an example of a system that may serve as a context for introducing one or more processes and/or devices described herein. As shown primary system 1110 includes processor 1172 and can include one or more instances of interfaces 1120, control modules 1130, environments 1174, 1184 (optionally containing respective instances of software 1101), or data 1179, 1189 (optionally of respective emulators 1178, 1188, e.g., as shown). Interface 1120 can, in some circumstances, obtain or otherwise provide for one or more of data portion 1123 or decision 1125. Control module 1130 can likewise optionally contain filter 1131. As shown primary system 1110 is (directly or indirectly) operatively coupled with external system 1140, within which one or more of environment 1144 or emulator 1148 can reside and operate as described below.

Figure 12:
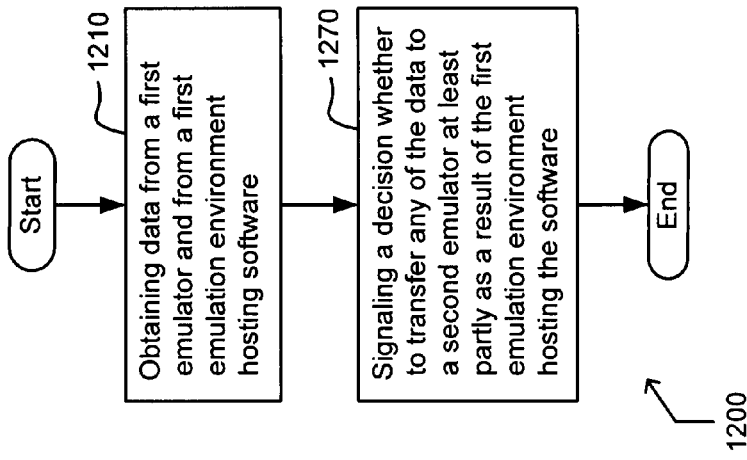
FIG. 12 depicts a high-level logic flow of an operational process.

With reference now to FIG. 12, there is shown a high-level logic flow 1200 of an operational process. Flow 1200 includes operation 1210—obtaining data from a first emulator and from a first emulation environment hosting software (e.g. filter 1131 obtaining data 1189 from emulator 1188 and from emulation environment 1184 hosting a program module or some other software 1101). Filter 1131 or other parts of control module 1130 can use this information effectively to distill data portion 1123 or decision 1125 as described herein, such as by presenting intermediate or final emulation data for a user to decide whether to proceed with a debugging effort, a process characterization, or the like.

Flow 1200 further includes operation 1270—signaling a decision whether to transfer any of the data to a second emulator at least partly as a result of the first emulation environment hosting the software (e.g. interface 1120 manifesting such a decision 1125 by sending at least some data 1189 originally from emulation environment 1184 hosting software 1101 to emulator 1148 or emulator 1178). This information can be useful, for example, in a circumstance in which the data is received by an emulator that has executed or might execute the same software: emulator 1178 executing software 1101 in environment 1174, for example. Further examples are provided below, particularly in descriptions relating to FIGS. 46-48.

Figure 13:
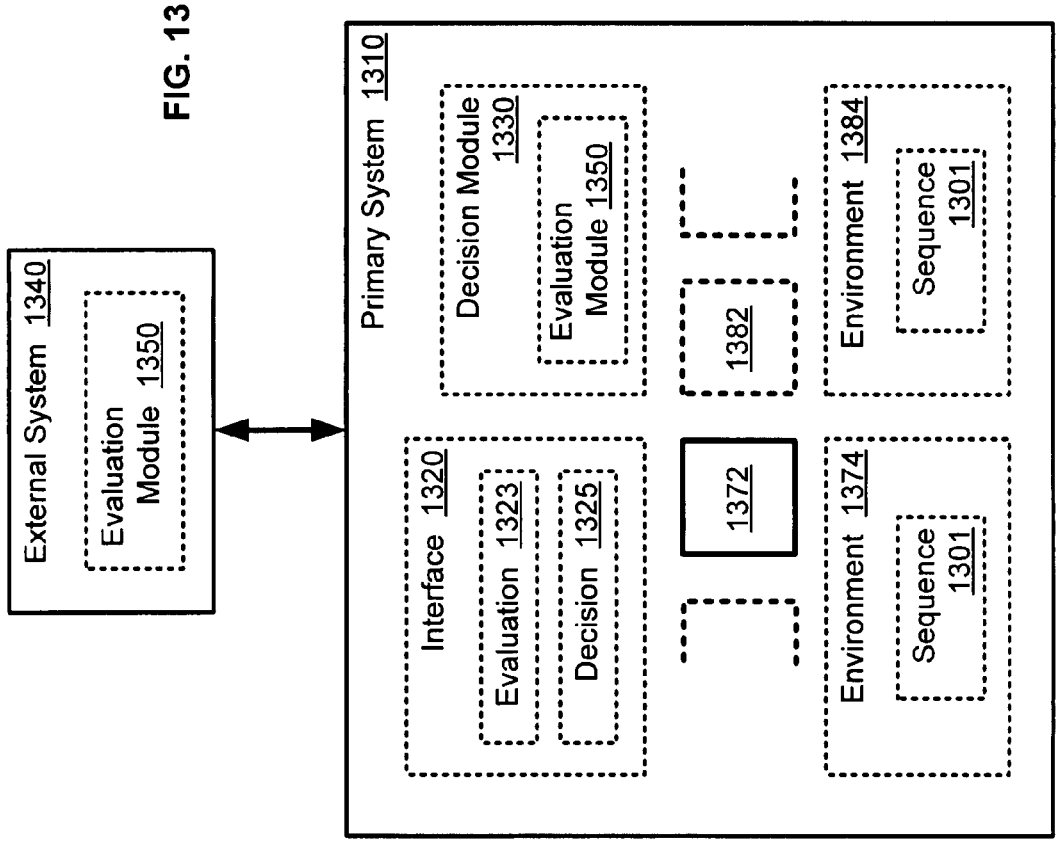
FIG. 13 depicts an exemplary environment in which one or more technologies may be implemented.

With reference now to FIG. 13, shown is an example of a system that may serve as a context for introducing one or more processes and/or devices described herein. As shown primary system 1310 is operatively coupled with external system 1340. Primary system 1310 includes processor 1372, and can include one or more of interface 1320, decision module 1330, processor 1382, environment 1374, or environment 1384. Interface 1320 can optionally handle one or more of evaluation 1323 or decision 1325 as described below. Decision module 1330 or external system 1340 can each (optionally) include one or more instances of evaluation modules 1350. Environment 1374 can include one or more instances of instruction sequence 1301, as can environment 1384.

Figure 14:
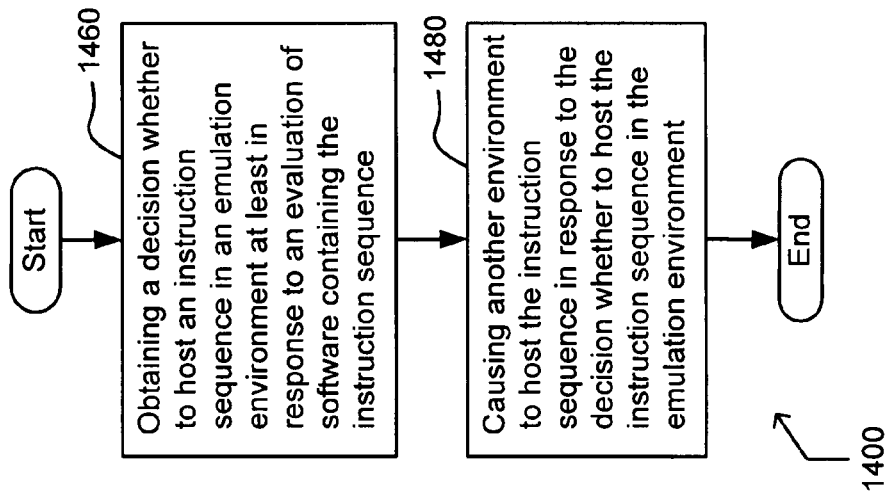
FIG. 14 depicts a high-level logic flow of an operational process.

With reference now to FIG. 14, there is shown a high-level logic flow 1400 of an operational process. Flow 1400 includes operation 1460—obtaining a decision whether to host an instruction sequence in an emulation environment at least in response to an evaluation of software containing the instruction sequence (e.g. decision module 1330 deciding that environment 1374 will host instruction sequence 1301 in response to an evaluation from evaluation module 1350 of at least sequence 1301). Alternatively, in some embodiments, interface 1320 can perform operation 1460 by receiving decision 1325 externally (e.g. from external system 1340).

In some embodiments, "evaluations" of software can include one or more of a count of the errors detected within a nominal trial period, a mean time between failures, an empirically determined probability of a specific fault type, or any other quantity substantially correlating with such fault rate indicators. (Variables correlate "substantially" if a correlation coefficient between them has a magnitude of at least about 0.4, in some embodiments herein.) Alternatively or additionally, modes of obtaining software evaluations from third parties or the like are widely available and generally suitable for use with teachings herein without undue experimentation. See, e.g., U.S. Pat. No. 7,065,680 ("Method and a System for Evaluating the Reliability of a Program in an Electronic Device, and an Electronic Device") filed 17 Jun. 2003. Those skilled in the art can recognize a great variety of workable variants of these modes using ordinary offsets, exponentiations, combinations of these, hybrid indices or the like, readily in light of these teachings.

Flow 1400 further includes operation 1480—causing another environment to host the instruction sequence in response to the decision whether to host the instruction sequence in the emulation environment (e.g. processor 1372 causing environment 1384 to host at least sequence 1301 in response to decision 1325 or decision module 1330). In various embodiments described herein, environment 1384 can include one or more contained environments any of which can optionally be configured for emulation or for partly or fully native execution of sequence 1301 (e.g. by processor 1382). Further examples are provided below, particularly in descriptions relating to FIGS. 49-51.

Figure 15:
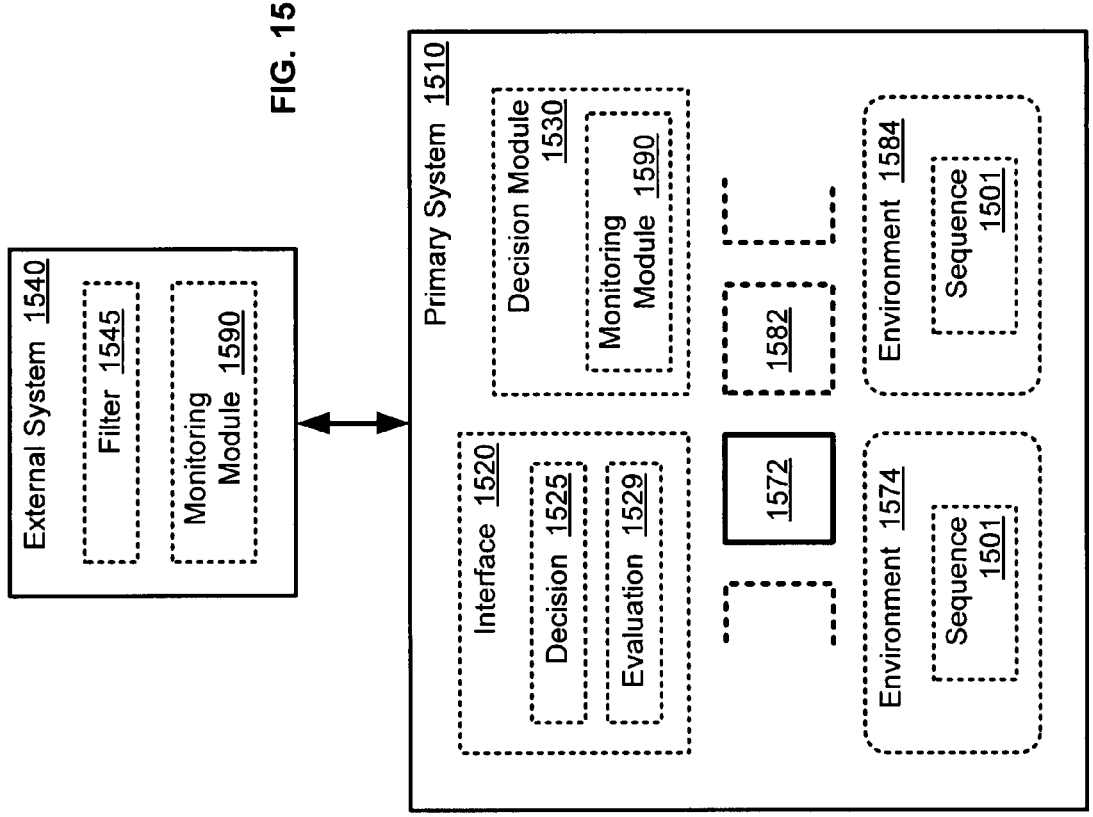
FIG. 15 depicts an exemplary environment in which one or more technologies may be implemented.

With reference now to FIG. 15, shown is an example of a system that may serve as a context for introducing one or more processes and/or devices described herein. As shown primary system 1510 is operatively coupled with external system 1540. External system 1540 can (optionally) include one or more of filter 1545 or monitoring module 1590. Primary system 1510 includes processor 1572, and can include one or more of interface 1520, decision module 1530, processor 1582, environment 1574, or environment 1584. Interface 1520 can optionally handle one or more of decision 1525 or evaluation 1529 as described below. Decision module can optionally include monitoring module 1590. Environment 1574 can likewise include one or more instances of instruction sequence 1501, as can environment 1584.

Figure 16:
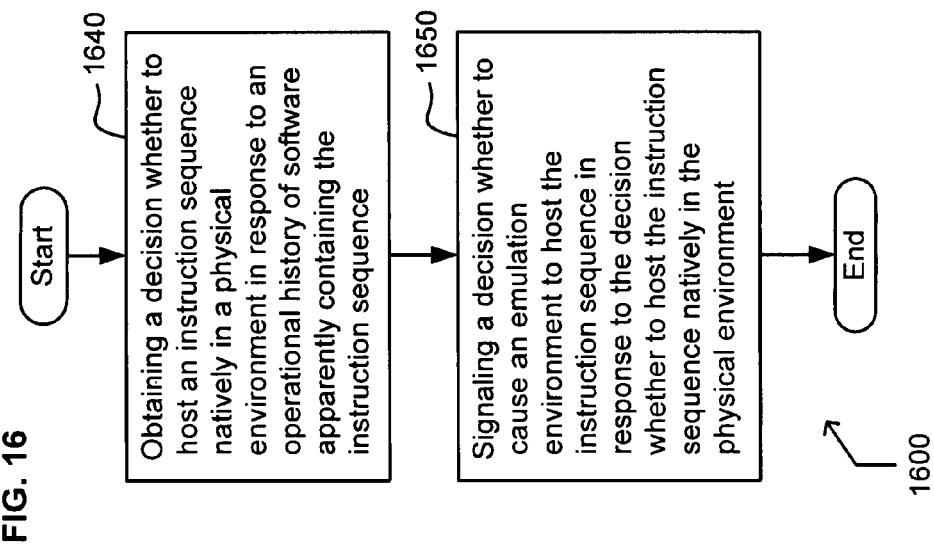
FIG. 16 depicts a high-level logic flow of an operational process.

With reference now to FIG. 16, there is shown a high-level logic flow 1600 of an operational process. Flow 1600 includes operation 1640—obtaining a decision whether to host an instruction sequence natively in a physical environment in response to an operational history of software apparently containing the instruction sequence (e.g. decision module 1530 deciding that environment 1584 will host at least instruction sequence 1501 natively in response to an event series relating at least partly to sequence 1501 signaled from a monitoring module 1590). In some variants, for example, the decision can depend on whether the operational history exists or whether any part of it pertains to the sequence or software. Alternatively or additionally, in some embodiments, interface 1520 can perform operation 1640 by receiving decision 1525 externally (e.g. from external system 1540). In some variants, absent a dispositive circumstance arising from a history, the decision can likewise depend on a reputation, a next performance, etc.

Flow 1600 further includes operation 1650—signaling a decision whether to cause an emulation environment to host the instruction sequence in response to the decision whether to host the instruction sequence natively in the physical environment (e.g. processor 1572 implementing or otherwise indicating a decision for environment 1574 to host at least sequence 1501 in response to decision 1525 or decision module 1530). In various embodiments described herein, environment 1574 can include one or more contained environments any of which can optionally be configured for emulation or for partly or fully native execution of sequence 1501 (e.g. by other processor 1582). Further examples are provided below, particularly in descriptions relating to FIGS. 49-51.

Figure 17:
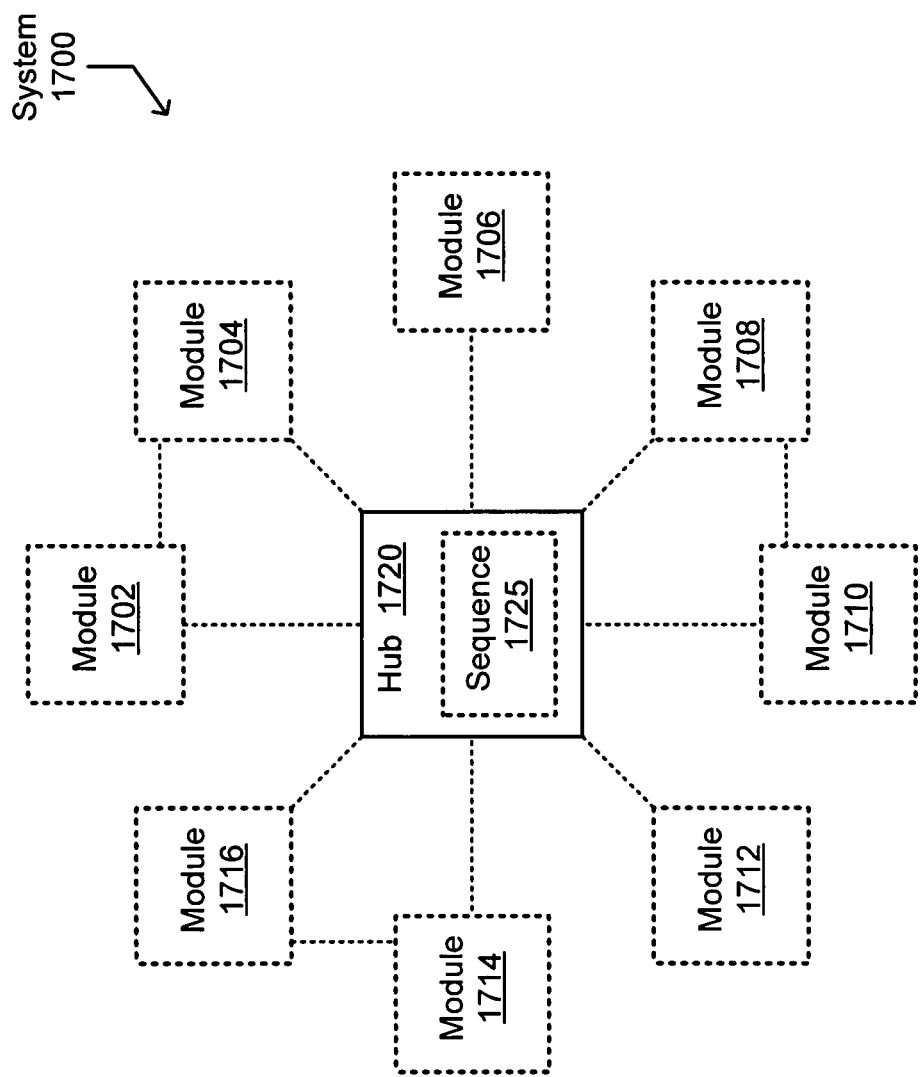
FIGS. 17-37 depict other exemplary environments in each of which one or more technologies may be implemented.

With reference now to FIG. 17, shown is an example of a system that may serve as a context for introducing one or more processes and/or devices described herein. As shown system 1700 includes hub 1720 (optionally operable to host sequence 1725 as described in one or more flows herein and) coupled with one or more instances of modules 1702, 1704, 1706, 1708, 1710, 1712, 1714, or 1716 as shown. In some variants, modules 1702, 1704 can be mutually coupled directly, as shown. Alternatively or additionally, modules 1708, 1710 can likewise be coupled directly with one another, as can modules 1714, 1716. In many contexts, system 1700 can be implemented as one or more computer networks or entirely onto a single common substrate such as a semiconductor chip. Moreover, in many combinations described below, items in hub 1720 can be configured to interact with, include, or otherwise relate to at least one single common emulation (of sequence 1725, e.g.) therein, for example. System 1700, as described below, can include configurations for combining some or all of flows 200, 400, 600, 800, 1000, 1200, 1400 above.

Figure 18:
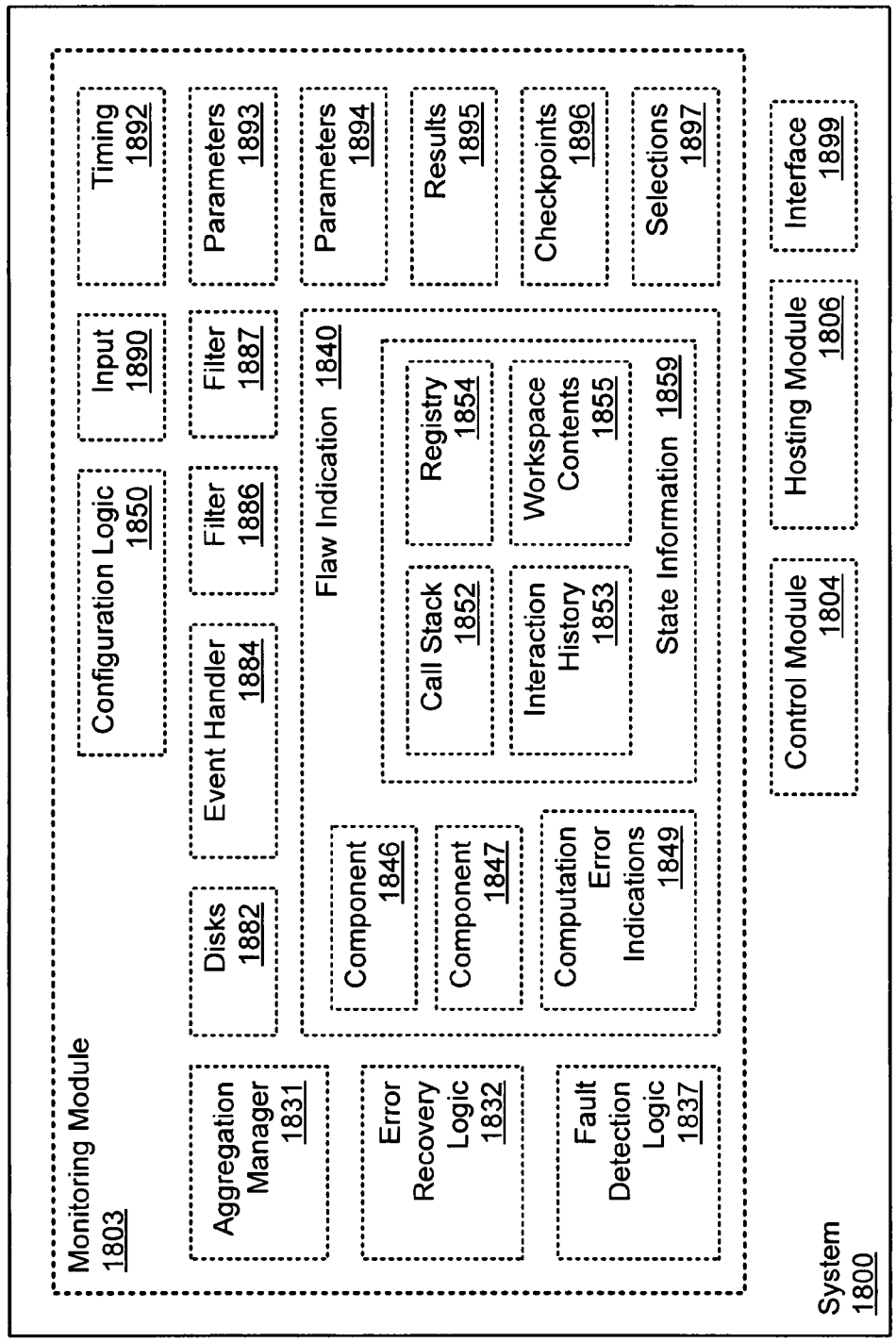

With reference now to FIG. 18, shown is an example of a system that may serve as a context for introducing one or more processes and/or devices described herein. As shown system 1800 can include one or more instances of monitoring modules 1803, control modules 1804, hosting modules 1806, or interfaces 1899. Monitoring module 1803 can include one or more of aggregation manage 1831, error recovery logic 1832, fault detection logic 1837, flaw indication 1840, configuration logic 1850, disks 1882, event handler 1884, filter 1886, filter 1887, input 1890, timing 1892, parameters 1893, 1894, results 1895, checkpoints 1896, selections 1897, or the like. Flaw indication 1840 can include one or more of components 1846, 1847, computation error indications 1849, call stack 1852, interaction history 1853, registry 1854, workspace contents 1855, other state information 1859, or the like. In some embodiments, "state information" can include action sequences, transient or stable variable values, conditional determinations, storage configurations, data aggregations, emulation environment changes, execution outcomes or the like.

Some varieties of system 1800 can be implemented, for example, in system 100 or network 190 of FIG. 1, in module 1702 or hub 1720 of FIG. 17, or as a stand-alone system. In some implementations, differently-configured instances of system 1800 can likewise operate cooperatively. If system 1700 is configured with hub 1720 and module 1702 each implementing an instance of system 1800, for example, monitoring module 1803 can optionally reside entirely within hub 1720 and operate cooperatively with an external instance of control module 1804 or hosting module 1806 resident in module 1702. In such a case the external instance(s) of system 1800 can, of course, exclude monitoring module 1803.

Figure 19:
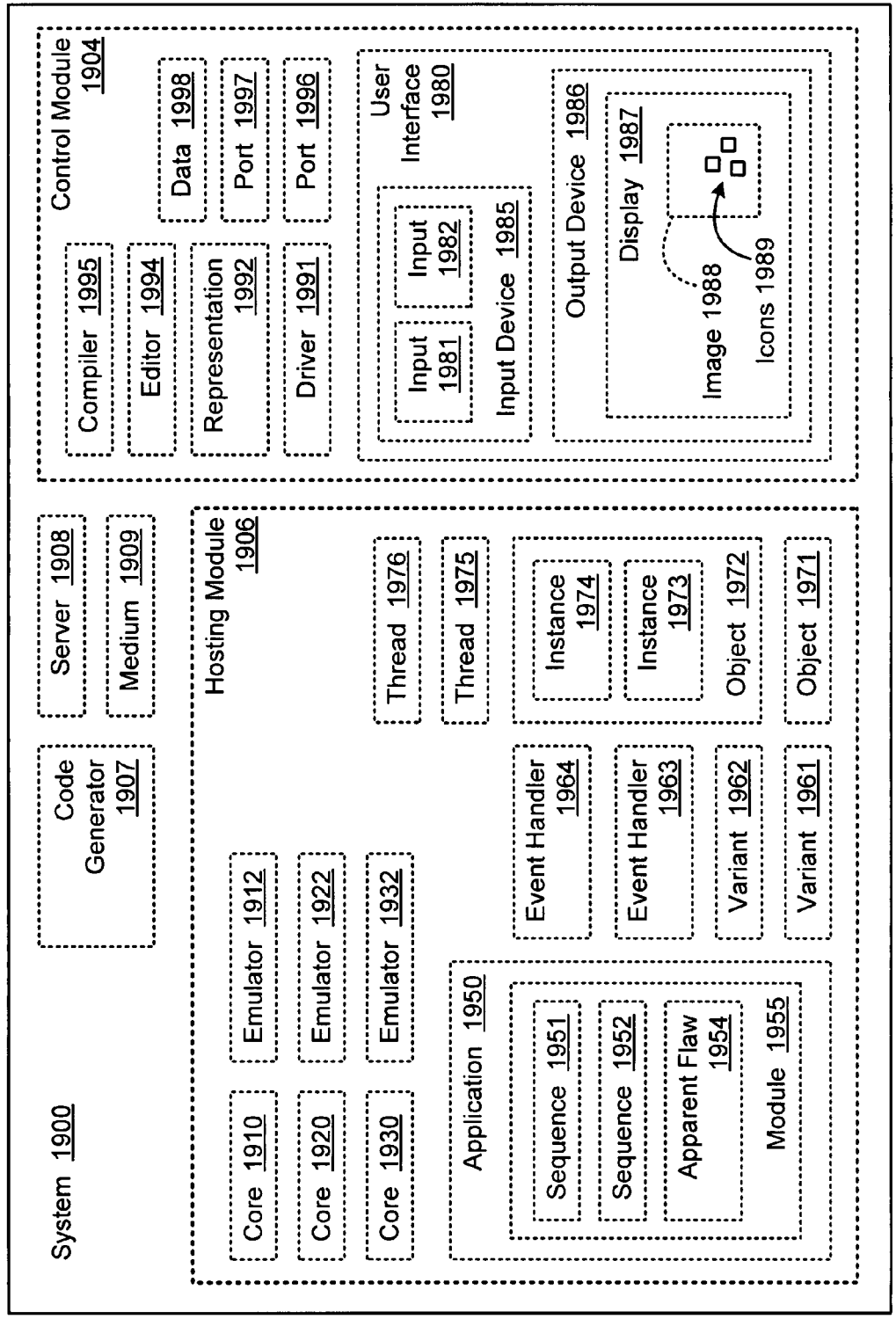

With reference now to FIG. 19, shown is an example of a system that may serve as a context for introducing one or more processes and/or devices described herein. As shown system 1900 can include one or more instances of control modules 1904, hosting modules 1906, code generators 1907, servers 1908, or data-handling media 1909. Code module 1904 can include one or more instances of user interfaces 1980, drivers 1991, representations 1992, editors 1994, compilers 1995, ports 1996, 1997, or data 1998. User interface 1980 can optionally handle inputs 1981, 1982 at input device 1985 or have an output device 1986 in some instances with a display 1987 operable to show at least one image 1988 with one or more icons 1989 as described herein. Hosting module 1906 can include one or more instances of cores 1910, 1920, 1930, emulators 1912, 1922, 1932, module(s) 1955, variants 1961, 1962, event handlers 1963, 1964, objects 1971, 1972, or threads 1975, 1976. Module(s) 1955 can each optionally form a part of application(s) 1950 or can include one or more instruction sequences 1951, 1952 or apparent flaw(s) 1954. In general each object 1972 can have one or more instances 1973, 1974. One or more instances of system 1900 can be implemented, for example, in system 100 or network 190 of FIG. 1, in module 1702 or hub 1720 of FIG. 17, in system 1800 of FIG. 18, or as a stand-alone system.

Figure 20:
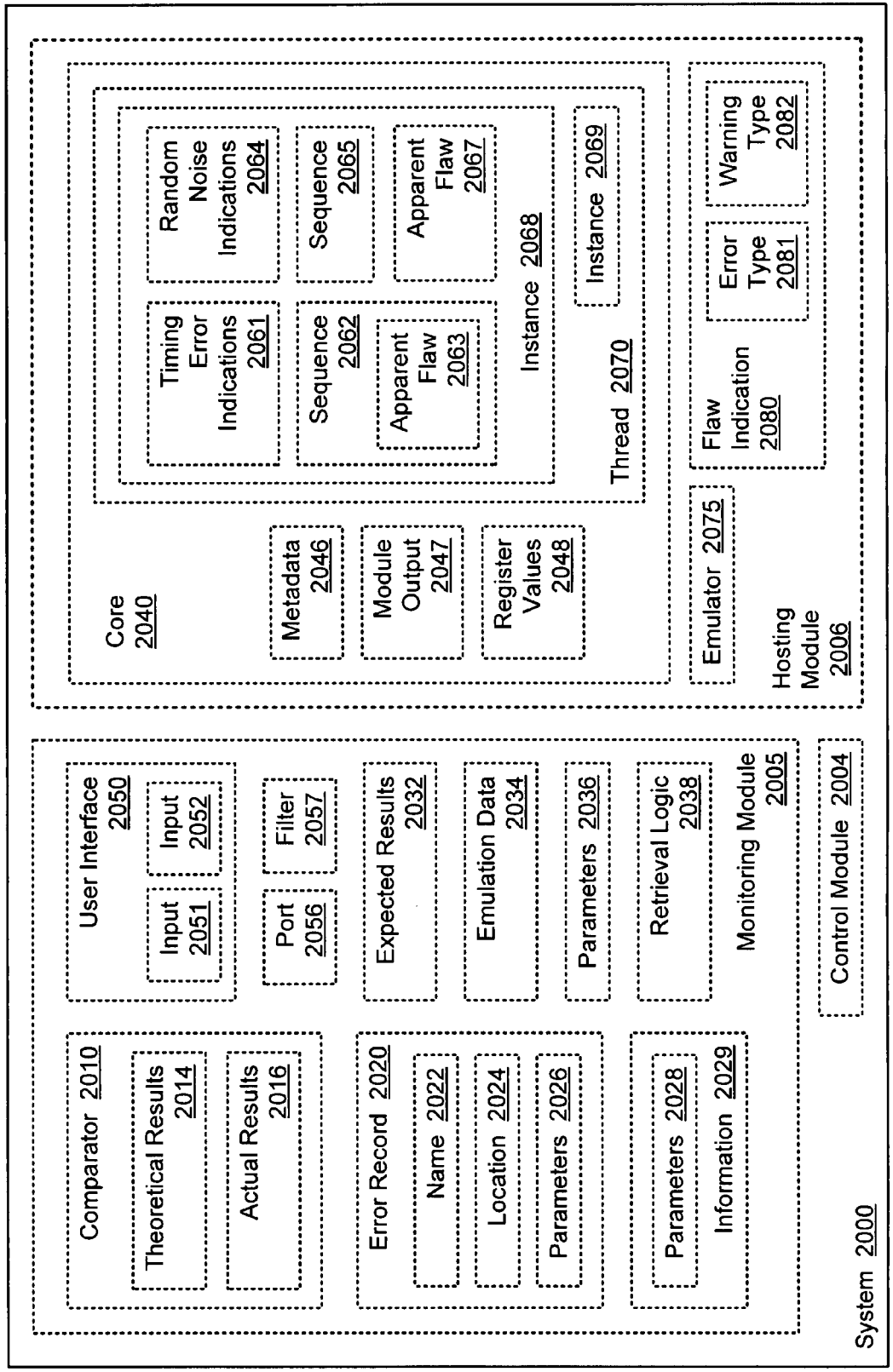

With reference now to FIG. 20, shown is an example of a system that may serve as a context for introducing one or more processes and/or devices described herein. As shown system 2000 can (optionally) include one or more instances of control modules 2004, monitoring modules 2005, or hosting modules 2006. Monitoring module 2005 can include one or more instances of comparators 2010, error records 2020, parameters 2028 and other information 2029, expected results 2032, emulation data 2034, parameters 2036, retrieval logic 2038, inputs 2051, 2052 at user interface 2050 or the like, ports 2056, or filters 2057. Comparator 2010 can include one or more instance of theoretical results 2014, actual results 2016, or the like. Error record 2020 can include one or more instances of names 2022, locations 2024, or other parameters 2026 such as are described herein relating an error type or behavior to an event or service. Hosting module 2006 can include one or more instances of core(s) 2040, emulator(s) 2075, or flaw indication(s) 2080 such as error types 2081, warning types 2082, or the like. Core 2040 can likewise include (at various times as described herein) one or more instances of metadata 2046, module output 2047, register values 2048, or thread(s) 2070. Each such thread can (optionally) include one or more instances of timing error indication 2061, code sequence 2062 (containing apparent flaw 2063 related to error type 2081 or other flaw indication 2080 in some instances), random noise indications 2064, instruction sequence 2065, apparent flaw 2067 (causing warning type 2082 or other flaw indication 2080 in some instances), or the like. Some configurations of system 2000 can be implemented, for example, in system 100 or network 190 of FIG. 1, in module 1702 or hub 1720 of FIG. 17, in system 1900 of FIG. 19, or as a stand-alone system.

Figure 21:
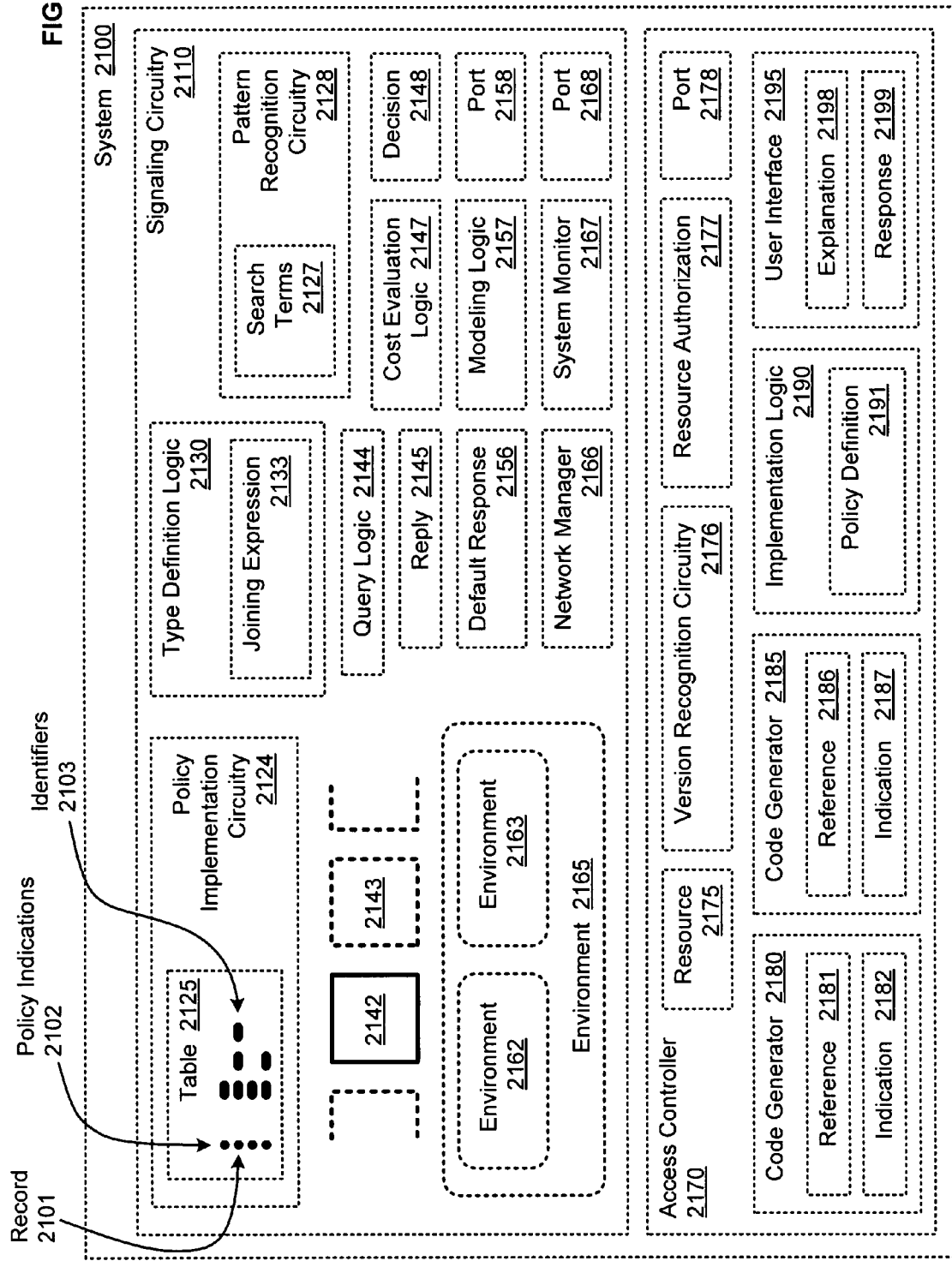

With reference now to FIG. 21, shown is an example of a system that may serve as a context for introducing one or more processes and/or devices described herein. As shown system 2100 can include one or more instances of signaling circuitry 2110 or access controllers 2170. Signaling circuitry 2110 can (optionally) handle or otherwise include one or more instances of tables 2125 or other policy implementation circuitry 2124, search terms 2127 or other pattern recognition circuitry 2128, joining expressions 2133 or other type definition logic 2130, processor(s) 2142, 2143, query logic 2144, replies 2145, cost evaluation logic 2147, decisions 2148, default responses 2156, modeling logic 2157, port(s) 2158, 2168, environments 2162, 2163, 2165, network managers 2166, system monitors 2167, or the like. Table 2125 can include one or more record(s) 2101 each associating one or more policy indications 2102 with one or more identifiers 2103 of variables, sequences, resources, or other objects.

Access controller 2170 can likewise include, at various times in some instances, one or more of resource(s) 2175, version recognition circuitry 2176, resource authorization(s) 2177, port(s) 2178, code generator(s) 2180 (optionally with reference(s) 2181 or indication(s) 2182), code generator(s) 2180 (optionally with reference(s) 2181 or indication(s) 2182), code generator(s) 2185 (optionally with reference(s) 2186 or indication(s) 2187), policy definition(s) 2191 or other implementation logic 2190, user interface 2195, or the like. As exemplified below, user interface 2195 can include one or more of explanation 2198 or response 2199. Some configurations of system 2100 can be implemented, for example, in primary system 500 or external system 550 of FIG. 5, in module 1706 or hub 1720 of FIG. 17, or as a stand-alone system.

Figure 22:
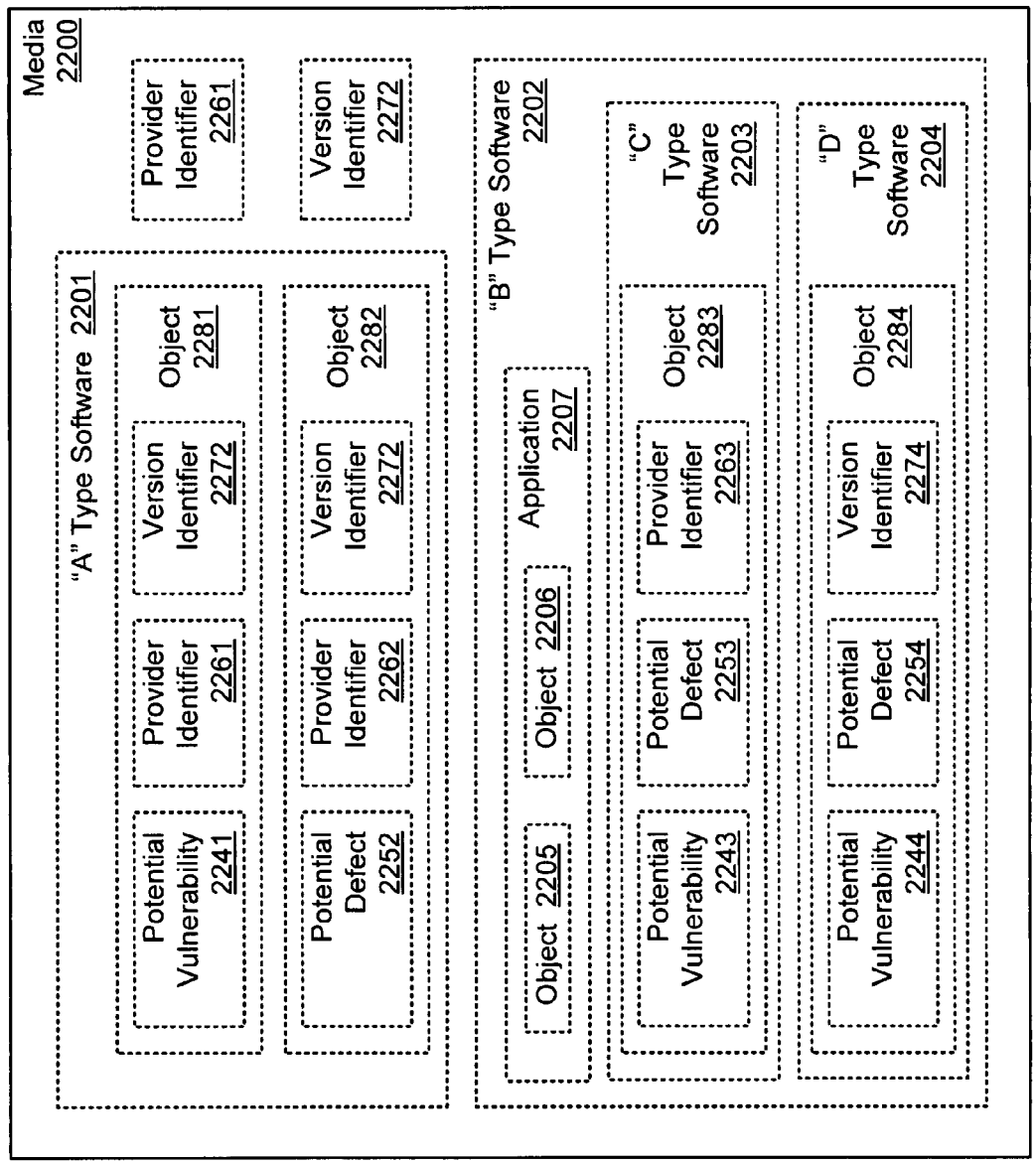

With reference now to FIG. 22, shown is an example of a system that may serve as a context for introducing one or more processes and/or devices described herein. As shown transmission or other media 2200 can bear or otherwise include one or more instances of "A" type software 2201, "B" type software 2202, provider identifier(s) 2261, or version identifier(s) 2272. Object 2281 of "A" type software 2201 can include one or more instances of potential vulnerability 2241, provider identifier(s) 2261, version identifier 2272, or the like. Object 2282 of "A" type software 2201 can likewise (optionally) include one or more instances of potential defect (s) 2252, provider identifier(s) 2262, version identifier(s) 2272 or the like. Optionally, objects 2281, 2282 can likewise both (or all) include a common edition or other version identifier(s) 2272.

"B" type software 2202 can optionally include object(s) 2205, 2206 of application 2207 as well as "C" type software 2203 or "D" type software 2204. For example, object 2283 of "C" type software 2203 can include one or more instances of potential vulnerabilities 2243, potential defects 2253, provider identifiers 2263, or the like. Object 2284 of "D" type software 2204 can likewise include one or more instances of potential vulnerabilities 2244, potential defects 2254, version identifiers 2274, or the like. Some configurations of media 2200 can be implemented, for example, as an element of primary system 500 or external system 550 of FIG. 5, in module 1706 or hub 1720 of FIG. 17, in system 2100 of FIG. 21, or as a storage disc or other article of manufacture.

Figure 23:
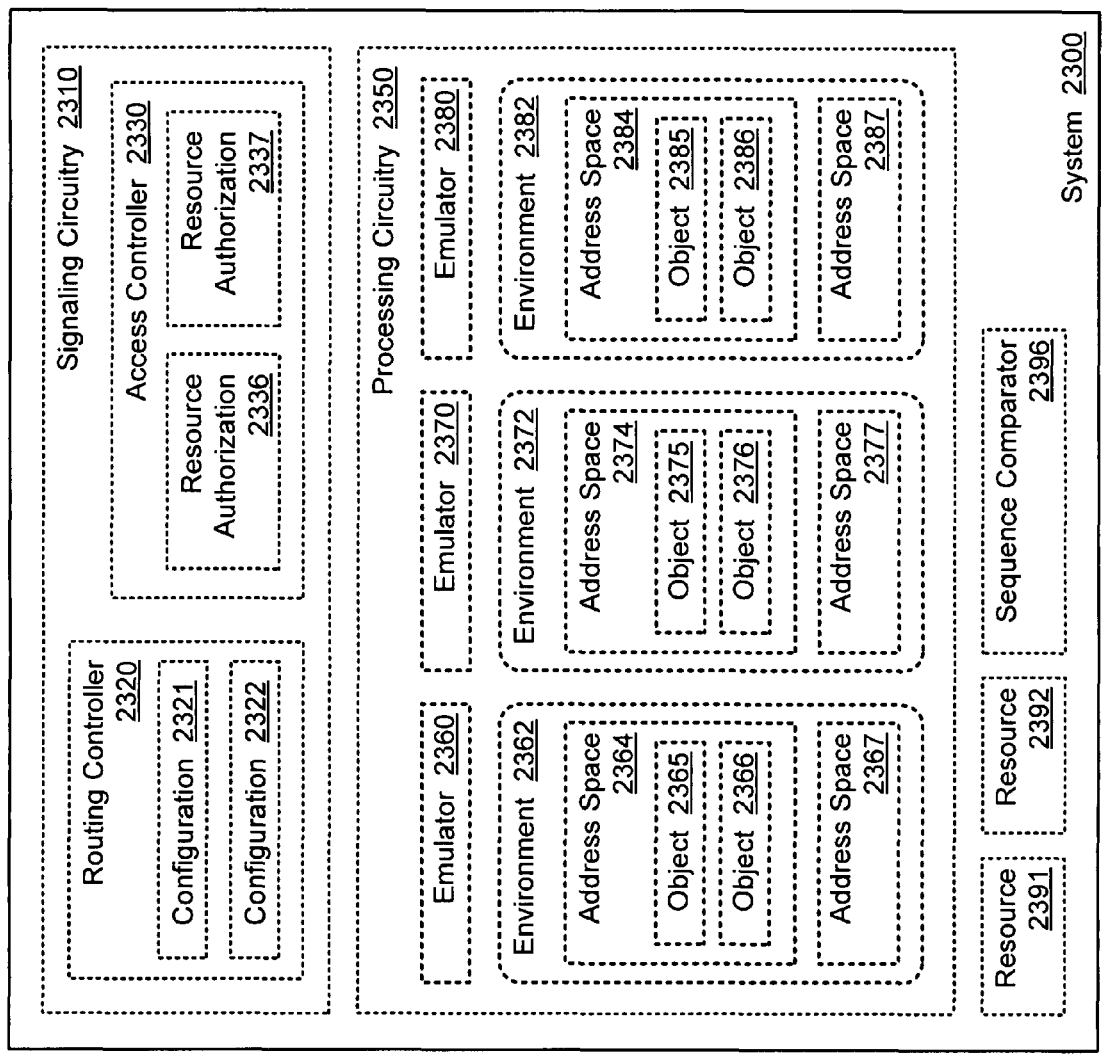

With reference now to FIG. 23, shown is an example of a system that may serve as a context for introducing one or more processes and/or devices described herein. As shown system 2300 can include one or more instances of signaling circuitry 2310, processing circuitry 2350, resources 2391, 2392, or sequence comparators 2396. Signaling circuitry 2310 can (optionally) include one or more instances of routing controllers 2320 (optionally operable for handling configurations 2321, 2322) or access controllers 2330 (optionally operable for handling resource authorizations 2336, 2337).

Processing circuitry 2350 can (optionally) include one or more instances of emulators 2360, 2370, 2380 or environments 2362, 2372, 2382. Environment 2362 can include one or more instances of software objects 2365, 2366 in address spaces 2364, 2367 as shown. (In some embodiments, an "address space" can refer to an allocated portion of a memory or other storage medium, for example.) Environment 2372 can likewise include one or more instances of objects 2375, 2376 in address spaces 2374, 2377 as shown. Further, environment 2382 can likewise include one or more instances of address spaces 2384, 2387, one or more of which can contain code sequences or like objects 2385, 2386 such as are described below, and especially those which are referred to with reference to FIGS. 40-42. Some variants of system 2300 can be implemented, for example, in primary system 500 or external system 550 of FIG. 5, in module 1706 or hub 1720 of FIG. 17, in system 2100 of FIG. 21, or as a stand-alone system.

Figure 24:
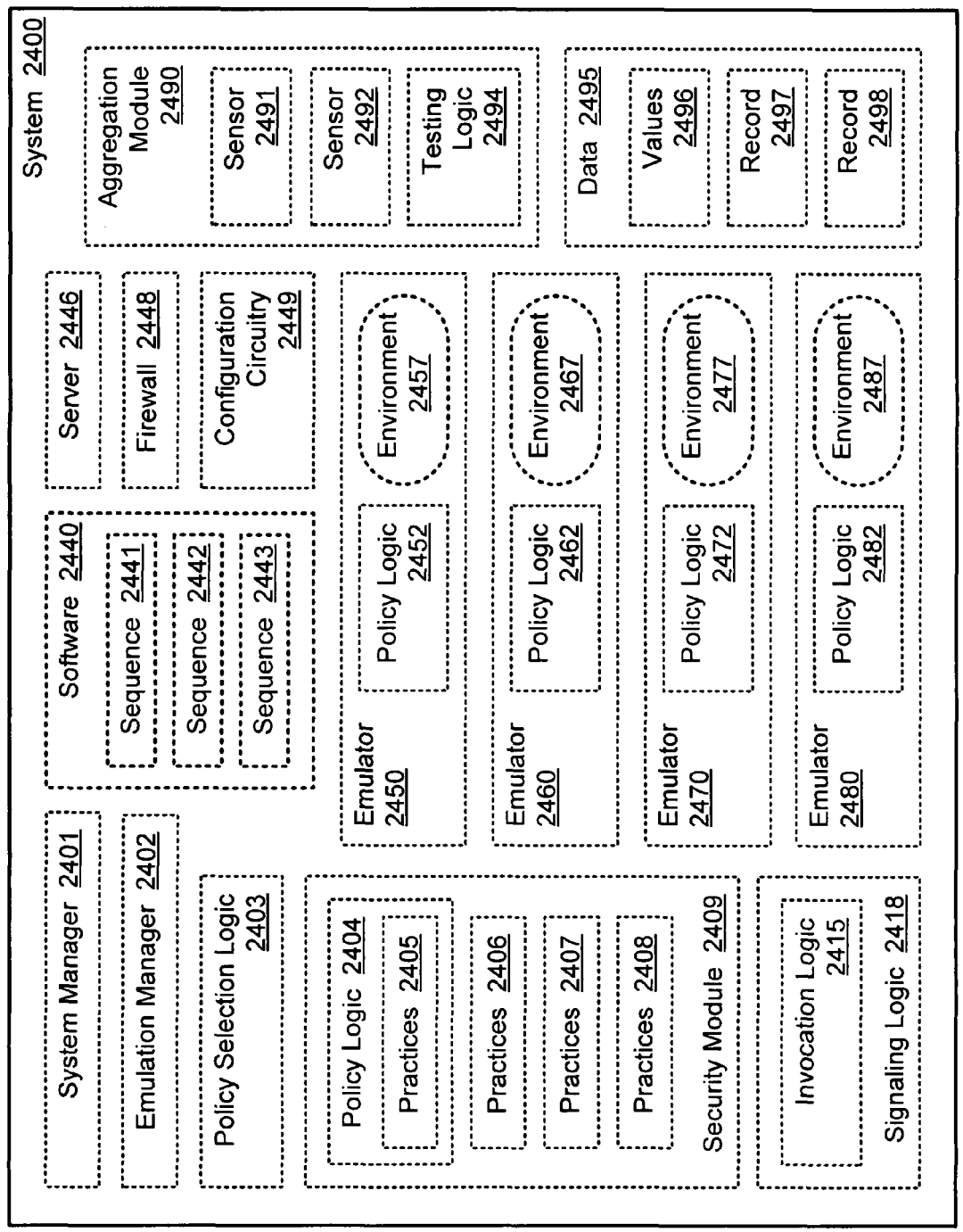

With reference now to FIG. 24, shown is an example of a system that may serve as a context for introducing one or more processes and/or devices described herein. As shown system 2400 can include one or more instances of system managers 2401, emulation managers 2402, policy selection logic 2403, security modules 2409, invocation logic 2415 or other signaling logic 2418, software 2440, servers 2446, firewalls 2448, configuration circuitry 2449, emulators 2450, 2460, 2470, 2480, aggregation modules 2490, or data 2495. Security module 2409 can likewise include, define, or implement one or more instances of practices 2405, 2406, 2407, 2408 or other policy logic 2404. Software 2440 can include one or more instances of instruction sequences 2441, 2442, 2443. Aggregation module 2490 can (optionally) include one or more instances of sensors 2491, 2492 or testing logic 2494. Data 2495 can include one or more instances of values 2496 or record(s) 2497, 2498 as described herein. Emulator 2450 can include one or more instances of policy logic 2452 or environments 2457. Emulator 2460 can include one or more instances of policy logic 2462 or environments 2467. Emulator 2470 can include one or more instances of policy logic 2472 or environments 2477. Emulator 2480 can include one or more instances of policy logic 2482 or environments 2487. Some implementations of system 2400 can be implemented, for example, in primary system 710 or external system 740 of FIG. 7, in module 1708 or hub 1720 of FIG. 17, or as a stand-alone system.

Figure 25:
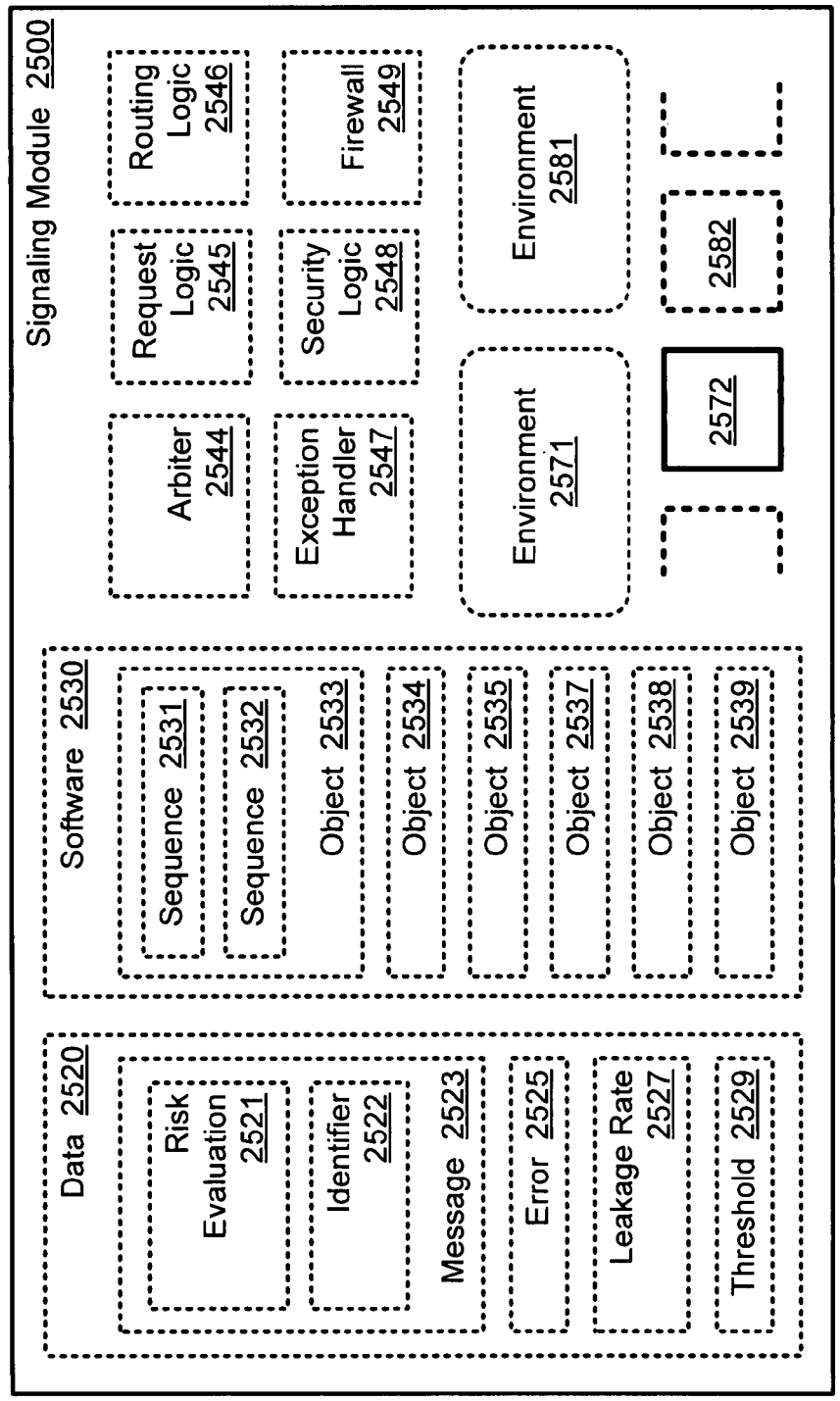

With reference now to FIG. 25, shown is an example of a system that may serve as a context for introducing one or more processes and/or devices described herein. As shown signaling module 2500 can (optionally) include one or more instances of data 2520, software 2530, arbiters 2544, request logic 2545, routing logic 2546, exception handlers 2547, security logic 2548, firewalls 2549, environments 2571, 2581, or processors 2572, 2582. Data 2520 can likewise include one or more instances of risk evaluations 2521 or identifiers 2522 in messages 2523, errors 2525, leakage rates 2527, thresholds 2529, or the like. Software 2530 can (optionally) include instances of sequences 2531, 2532 or objects 2533, 2534, 2535, 2537, 2538, 2539 or the like. One or more instances of signaling module 2500 can be implemented, for example, in primary system 910 of FIG. 9, in module 1710 or hub 1720 of FIG. 17, in system 2100 of FIG. 21, in system 2400 of FIG. 24, or as a stand-alone system.

Figure 26:
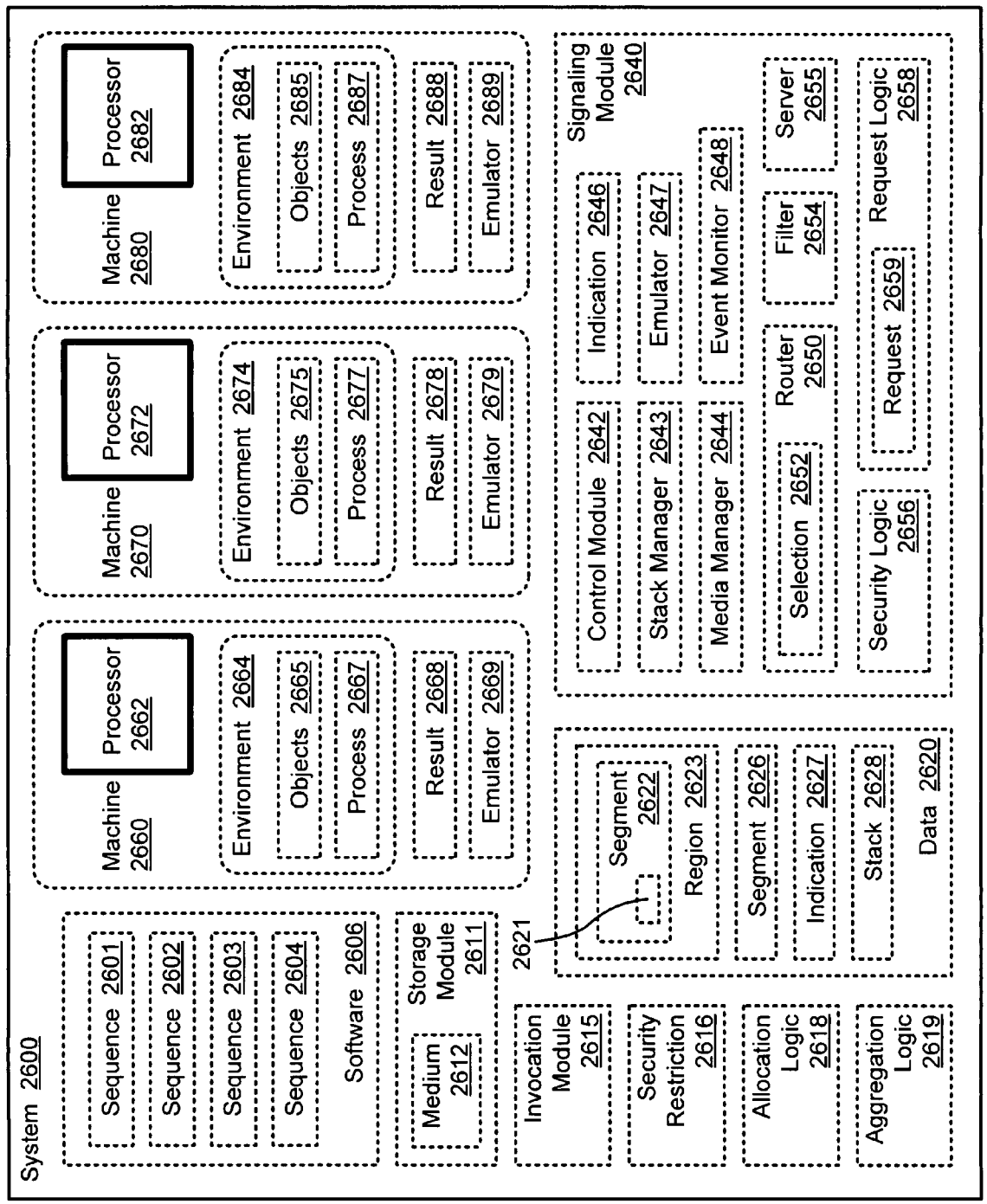

With reference now to FIG. 26, shown is an example of a system that may serve as a context for introducing one or more processes and/or devices described herein. As shown system 2600 can include one or more instances of software 2606, media 2612 or other storage modules 2611, invocation modules 2615, security restrictions 2616, allocation logic 2618, aggregation logic 2619, data 2620, signaling module 2640, or machines 2660, 2670, 2680. Each instance of software 2606 can (optionally) include one or more instruction sequences 2601, 2602, 2603, 2604. Data 2620 can include one or more instances of segments 2622 (optionally with parameter value(s) 2621) in regions 2623, segments 2626, indications 2627, stacks 2628, or the like. Signaling module 2640 can include one or more instances of control module(s) 2642, stack managers 2643, media managers 2644, indications 2646, emulators 2647, event monitors 2648, routers 2650 operable for acting on selections 2652, filters 2654, servers 2655, security logic 2656 or request logic 2658 operable for handling requests 2659. Machine 2660 can include processor 2662 and one or more instances of object 2665 or processes 2667 of environment 2664, results 2668, or emulators 2669. Machine 2670 can likewise include physical or virtual processor 2672 and one or more instances of object 2675 or processes 2677 of environment 2674, results 2678, or emulators 2679. Further, machine 2680 can include processor 2682 and one or more instances of object 2685 or processes 2687 (active or otherwise) of environment 2684 (or others), results 2688, or emulators 2689 as described further below. Some configurations of system 2600 can be implemented, for example, in primary system 1110 or external system 1140 of FIG. 11, in module 1712 or hub 1720 of FIG. 17, or as a stand-alone system.

Figure 27:
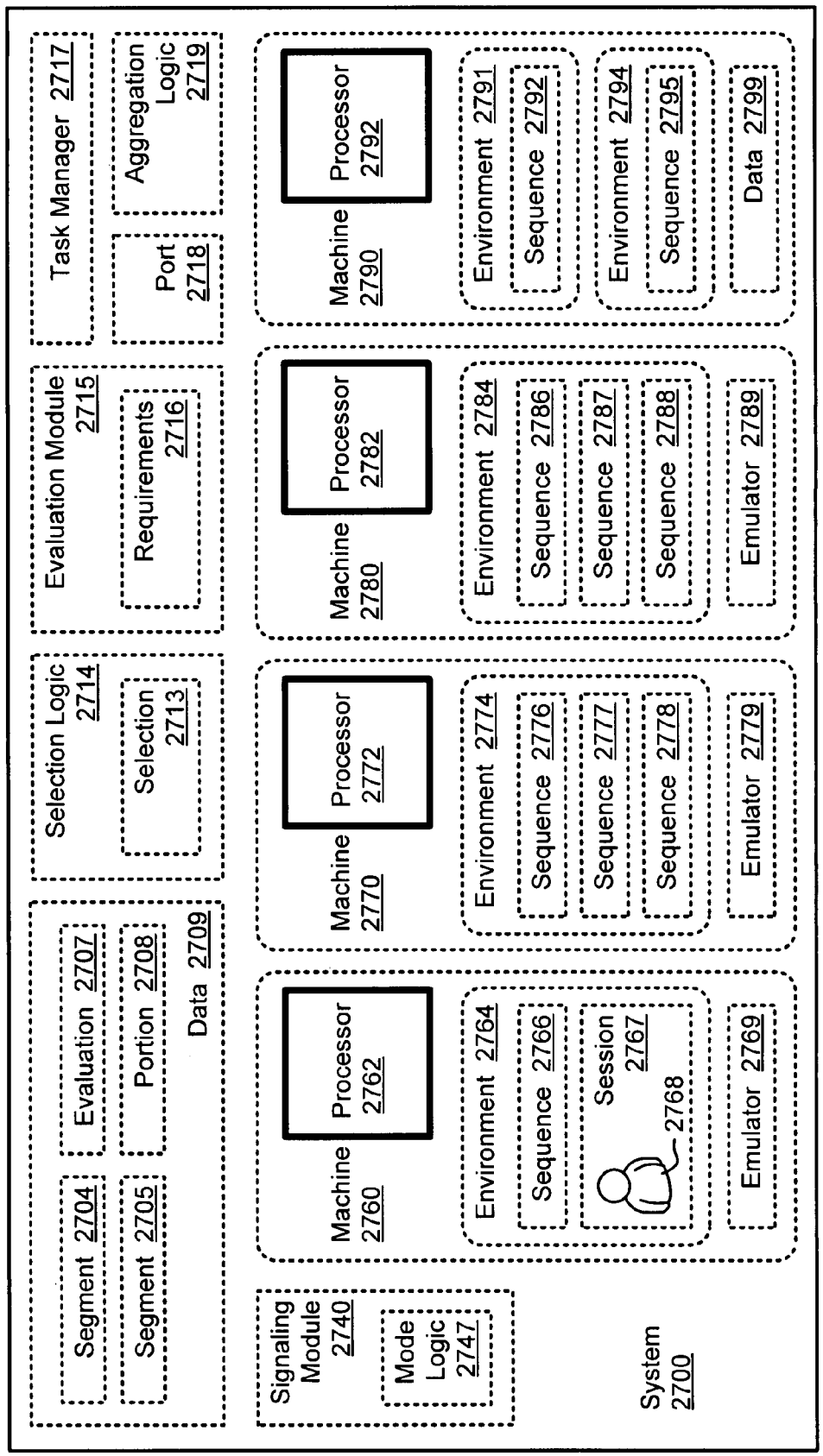

With reference now to FIG. 27, shown is an example of a system that may serve as a context for introducing one or more processes and/or devices described herein. As shown system 2700 can include one or more instances of data 2709, selection logic 2714 operable to handle one or more selections 2713, evaluation modules 2715 operable to apply or otherwise handle one or more performance-indicative requirements 2716, task managers 2717, ports 2718, aggregation logic 2719, signaling modules 2740 (optionally including mode logic 2747), and machines 2760, 2770, 2780, 2790. Data 2709 can include one or more instances of segments 2704, 2705, evaluations 2707, or other portions 2708 of data. Machine 2760 can include one or more instances of (physical or virtual) processors 2762, environments 2764, or emulators 2769. Environment 2764 can (optionally) include one or more instances of sequence(s) 2766 or sessions 2767 associated with user 2768. In machine 2770, processor 2772 can optionally host one or more sequences 2776, 2777, 2778 in environment(s) 2774, such as by emulator 2779. In machine 2780, processor 2782 can optionally host one or more sequences 2786, 2787, 2788 in environment(s) 2784, such as by emulator 2789. In machine 2790, processor 2792 can optionally host one or more of sequence(s) 2792 in environment 2791 or sequence(s) 2795 in environment 2794 so as to generate data 2799 as described herein. Some configurations of system 2700 can be implemented, for example, in primary system 1110 or external system 1140 of FIG. 11, in module 1712 or hub 1720 of FIG. 17, in system 2600 of FIG. 26, or as a stand-alone system.

Figure 28:
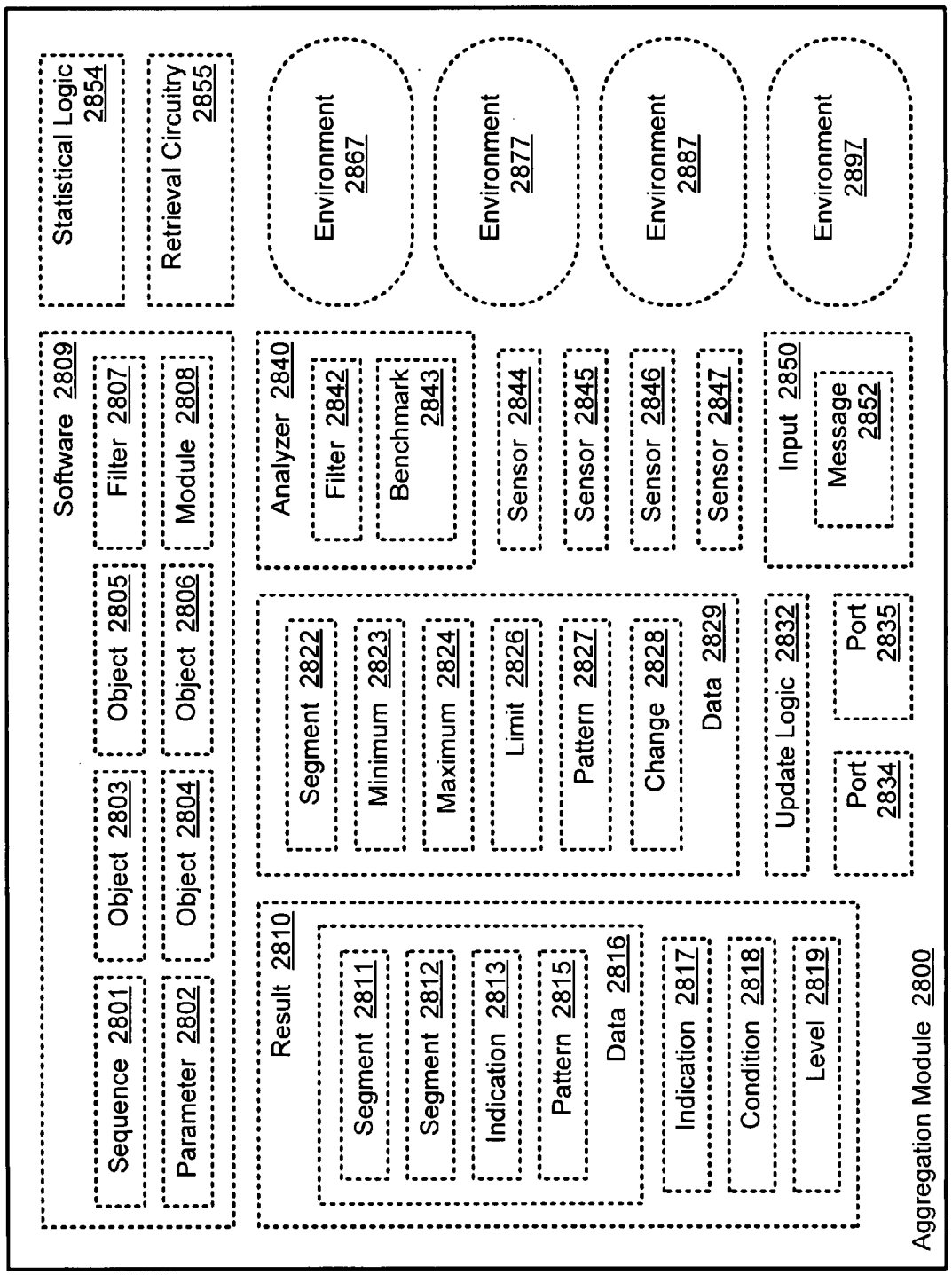

With reference now to FIG. 28, shown is an example of a system that may serve as a context for introducing one or more processes and/or devices described herein. As shown aggregation module 2800 can include one or more instances of sequences 2801, parameters 2802, objects 2803, 2804, 2805, 2806, filters 2807, modules 2808, or other software 2809. Aggregation module 2800 can likewise include one or more instances of results 2810, data 2829, update logic 2832, ports 2834, 2835, analyzers 2840, sensors 2844, 2845, 2846, 2847, inputs 2850 (such as one or more messages 2852, e.g.), statistical logic 2854, retrieval circuitry 2855, or environment 2867, 2877, 2887, 2897. For example, result 2810 can include one or more instances of segments 2811, 2812, indications 2813, pattern 2815, other data 2816, indications 2817, conditions 2818, levels 2819, or the like. Data 2829 can include one or more instances of segments 2822, minima 2823, maxima 2824, limits 2826, patterns 2827, changes 2828, or the like. Analyzer 2840 can be operable to apply one or more instances of filters 2842 or benchmarks 2843. Some configurations of aggregation module 2800 can be implemented, for example, in primary system 1110 or external system 1140 of FIG. 11, as module 1712 of FIG. 17, in system 2700 of FIG. 27, or as a stand-alone system.

Figure 29:
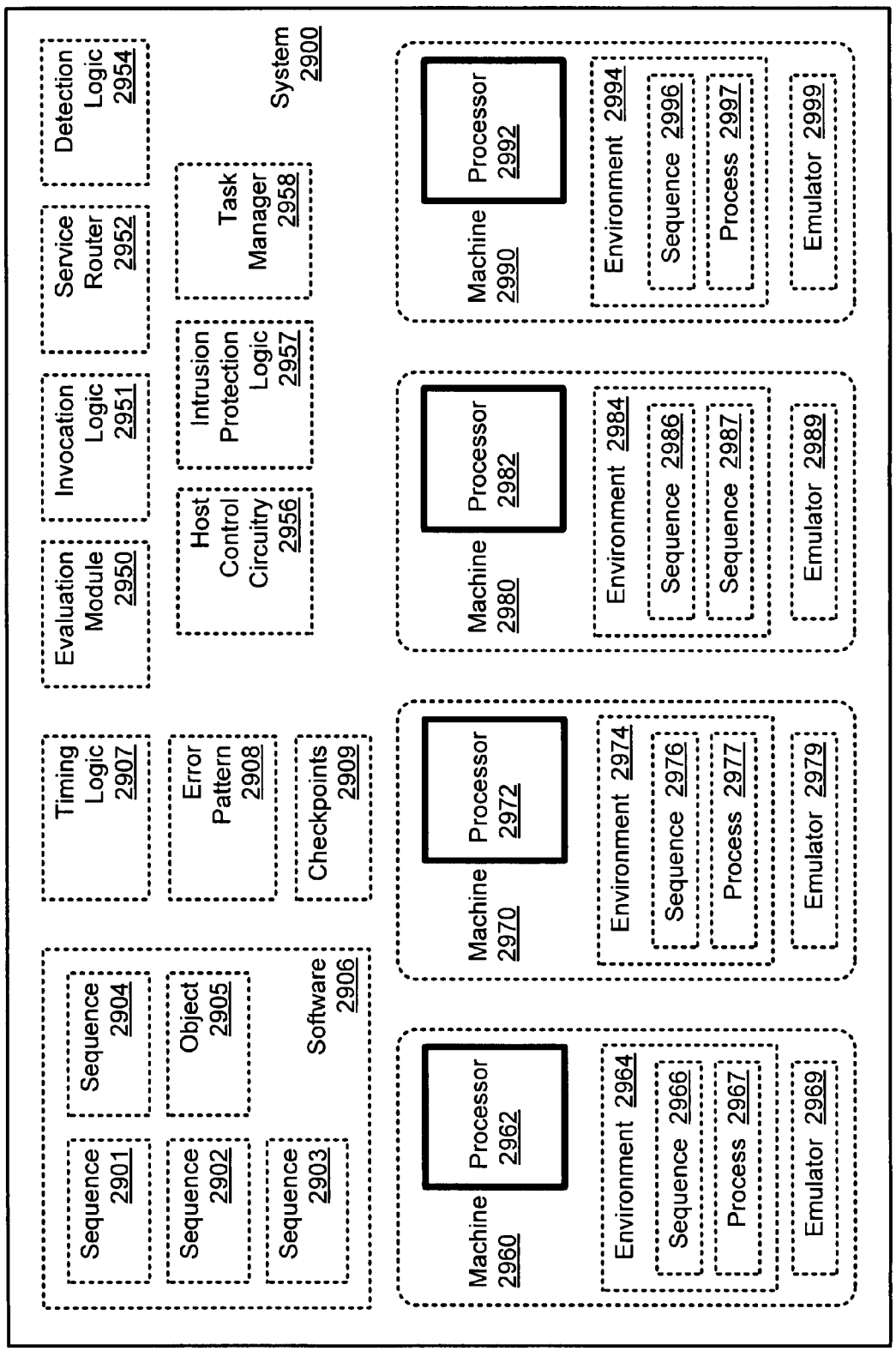

With reference now to FIG. 29, shown is an example of a system that may serve as a context for introducing one or more processes and/or devices described herein. As shown system 2900 can include one or more of instances of software 2906, timing logic 2907, error patterns 2908, one or more checkpoints 2909, evaluation modules 2950, invocation logic 2951, service routers 2952, detection logic 2954, host control circuitry 2956, intrusion protection logic 2957, or task managers 2958. Software 2906 can include one or more instances of instruction sequences 2901, 2902, 2903, 2904, or other software objects 2905. In some embodiments, an "object" of software can include an executable sequence, source code, a data object, a function or other service, or the like, implemented primarily in software. In some contexts, such a "service" can include one or more of an application, a process, a resource, a function, a queue, an operating mode, an emulation environment, or the like.

In some implementations, system 2900 can likewise contain machine 2960 with processor 2962, machine 2970 with processor 2972, machine 2980 with processor 2982, or machine 2990 with processor 2992. Where included, machines 2960, 2970, 2980, 2990 can optionally implement virtual machines in various configurations. In some embodiments, a "machine" for partial or full emulation can include an operating system or other software using generally common resources that are actually available to other software but which usually appear within an emulation environment of the machine to be dedicated resources. These resources can include one or more of an instruction set, a set of registers, a stack, a heap, a peripheral device, a communication bus, a processor, or the like. Processors 2962, 2972, 2982, 2992 can each optionally be physical, emulated, or hybrid, as will be understood by those skilled in the art.

Machine 2960 can include one or more of environment 2964 (with access to one or more of instruction sequence 2966 or process 2967, e.g.) or emulator 2969 as described below. Machine 2970 can likewise include one or more of environment 2974 (with access to one or more of instruction sequence 2976 or process 2977, e.g.) or emulator 2979. Machine 2980 can likewise include one or more of environment 2984 (with access to one or more of instruction sequence 2986 or sequence 2987, e.g.) or emulator 2989. Machine 2990 can likewise include one or more of environment 2994 (with access to one or more of instruction sequence 2996 or process 2997, e.g.) or emulator 2999. Those skilled in the art will recognize a variety of particular configurations and operational relations that can exist among these various components in various instances of system 2900 in light of the following operational descriptions. It will be understood, for example, that one or more of processors 2962, 2972, 2982, 2992 can optionally be implemented in software, for example. Some configurations of system 2900 can be implemented, for example, in primary system 1310 or external system 1340 of FIG. 13, in module 1714 or hub 1720 of FIG. 17, or as a stand-alone system.

Figure 30:
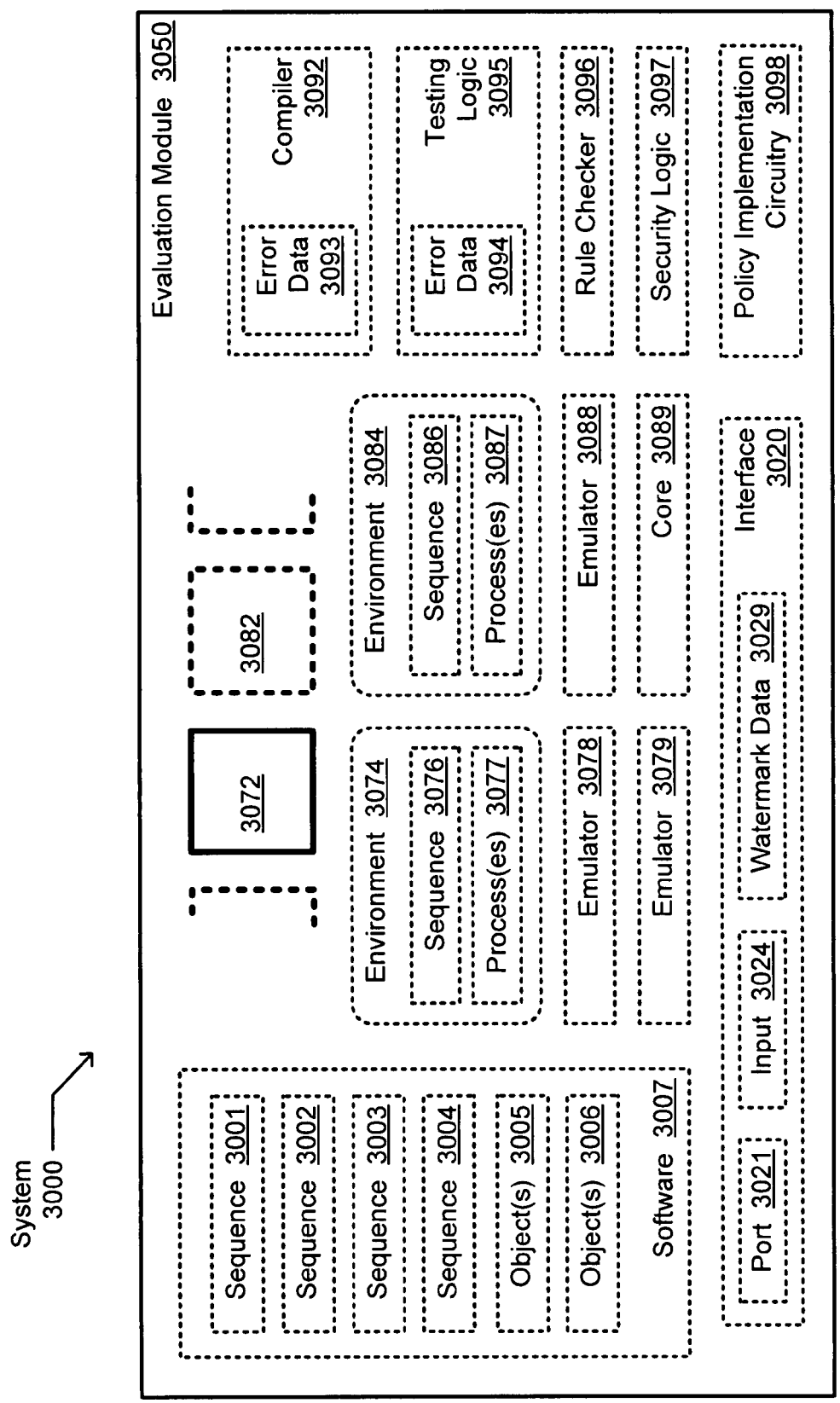

With reference now to FIG. 30, shown is an example of a system that may serve as a context for introducing one or more processes and/or devices described herein. As shown system 3000 includes one or more instances of evaluation modules 3050 with one or more instances of processors 3072. Evaluation module 3050 can further include one or more instances of software 3007, interfaces 3020, environment 3074, emulators 3078, 3079, processors 3082, environments 3084, emulators 3088, cores 3089, compilers 3092 (optionally handling error data 3093), other error data 3094 optionally generated by testing logic 3095, rule checkers 3096, security logic 3097, policy implementation circuitry 3098, or the like. Software 3007 can include one or more of (instruction) sequence 3001, sequence 3002, sequence 3003, sequence 3004, one or more software objects 3005, or one or more software objects 3006. Interface 3020 can include one or more of port 3021, input 3024, or watermark data 3029. Environment 3074 can include one or more of instruction sequence 3076 or process(es) 3077. Environment 3084 can include one or more of instruction sequence 3086 or process(es) 3087. Those skilled in the art will recognize a variety of particular configurations and operational relations that can exist among these various components in various instances of evaluation modules 3050 in light of operational descriptions herein. Some configurations of system 3000 can be implemented, for example, in primary system 1310 or external system 1340 of FIG. 13, in module 1714 or hub 1720 of FIG. 17, in system 2900 of FIG. 29, or as a stand-alone system.

Figure 31:
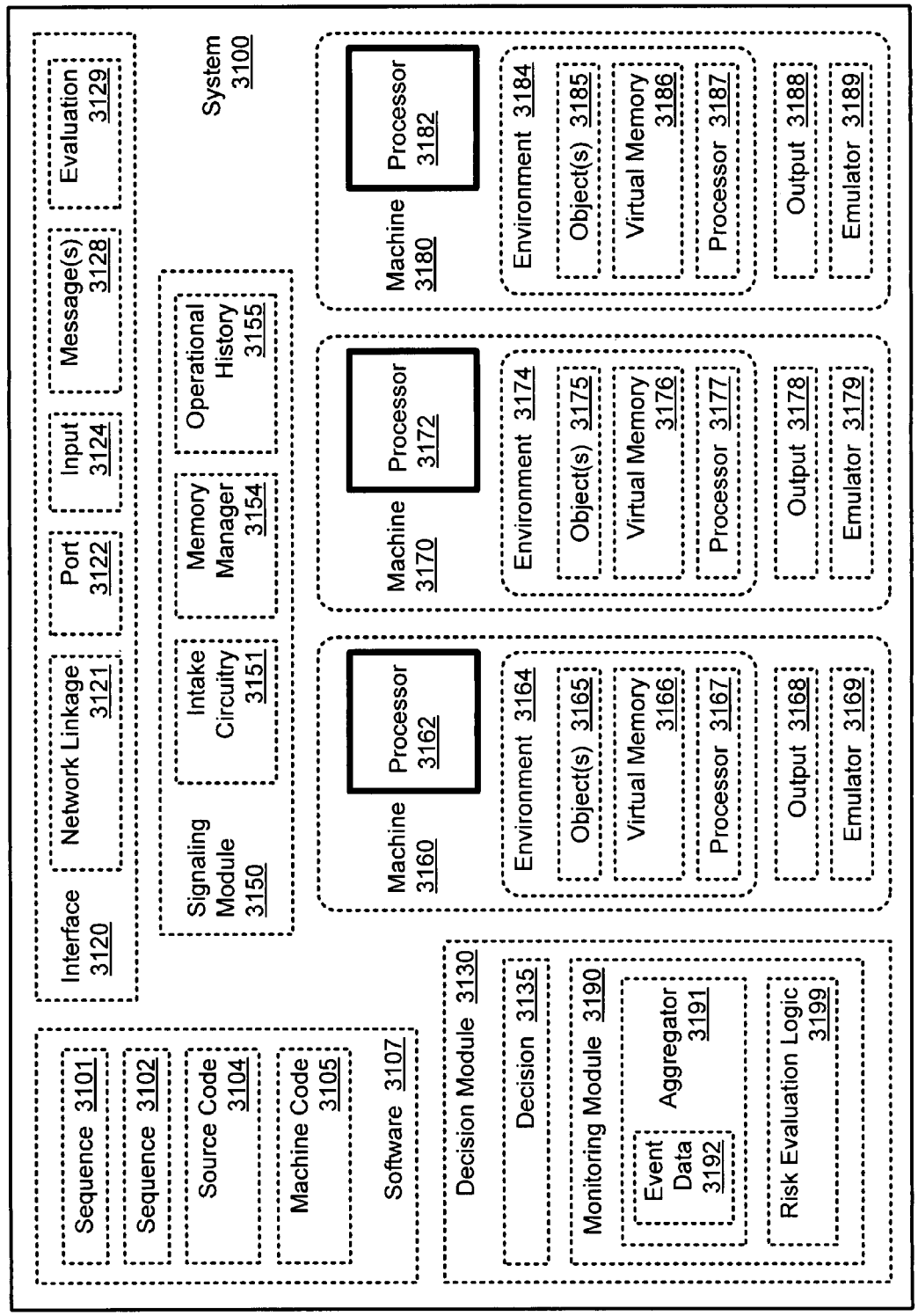

With reference now to FIG. 31, shown is an example of a system that may serve as a context for introducing one or more processes and/or devices described herein. As shown system 3100 can include one or more of software 3107, interface 3120, decision module 3130, signaling module 3150, machine 3160 with processor 3162, machine 3170 with processor 3172, or machine 3180 with processor 3182. Software 3107 can (optionally) include one or more of instruction sequence 3101, instruction sequence 3102, source code 3104, or machine code 3105. Interface 3120 can include one or more of network linkage 3121, port 3122, input 3124, message(s) 3128, or evaluation 3129. Decision module 3130 can include one or more of decision 3135 or monitoring module 3190. Monitoring module 3190 can include one or more of aggregator 3191 (optionally having event data 3192) or risk evaluation logic 3199. Signaling module can include one or more of intake circuitry 3151, memory manager 3154, or operational history 3155. Machine 3160 can include one or more instances of environment 3164, output 3168, or emulator 3169 as described below. Environment 3164 can access or otherwise "contain" one or more of object(s) 3165, virtual memory 3166, or processor 3167. Environment 3164 can be physical, in some embodiments, emulated (e.g. by emulator 3169 or the like), or some hybrid of the two. Machine 3170 can include one or more instances of environment 3174, output 3178, or emulator 3179. Environment 3174 can likewise contain one or more of object(s) 3175, virtual memory 3176, or processor 3177. Machine 3180 can include one or more instances of environment 3184, output 3188, or emulator 3189. Environment 3184 can likewise contain one or more of object(s) 3185, virtual memory 3186, or processor 3187. Those skilled in the art will recognize a variety of particular configurations and operational relations that can exist among these various components in various instances of systems 3100 in light of the following operational descriptions. It will be understood, for example, that one or more of processors 3162, 3172, 3182 can optionally be implemented in software, for example. Some configurations of system 3100 can be implemented, for example, in primary system 1510 or external system 1540 of FIG. 15, in module 1716 or hub 1720 of FIG. 17, or as a stand-alone system.

Figure 32:
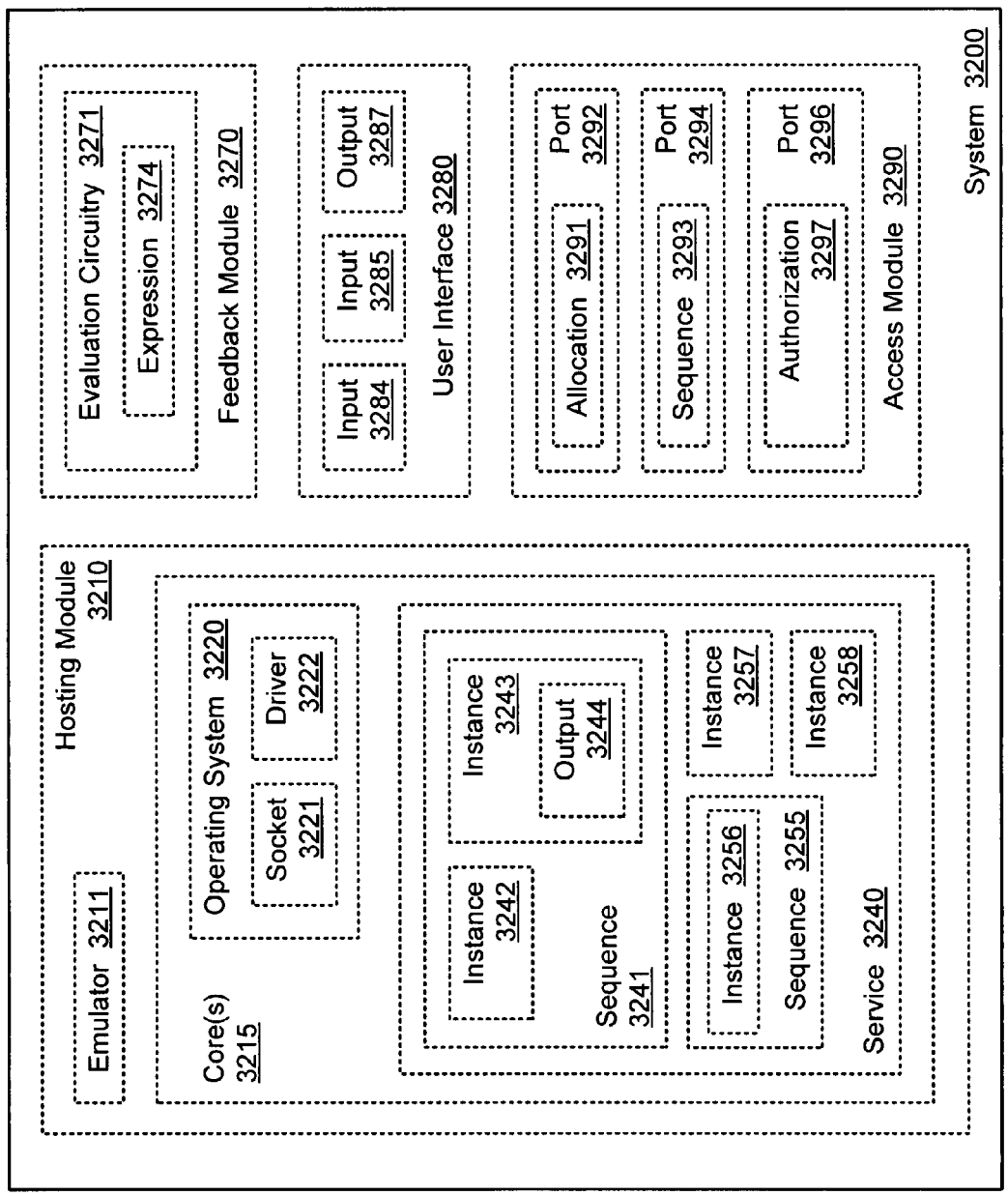

With reference now to FIG. 32, shown is an example of a system that may serve as a context for introducing one or more processes and/or devices described herein. As shown system 3200 can include one or more instances of hosting modules 3210, feedback modules 3270, user interfaces 3280, or access modules 3290. Hosting module 3210 can include one or more instances of emulators 3211 or core(s) 3215, the latter optionally including operating systems 3220 or services 3240. Operating system 3220 can (optionally) include one or more of sockets 3221 or drivers 3222. Service 3240 can likewise include one or more sequences 3241, 3255 or service instances 3256, 3257, 3258. Sequence 3241 can include one or more of instances 3242, 3243, which can optionally obtain instance output 3244 or the like as described below. Feedback module 3270 can include evaluation circuitry 3271, which can optionally generate or otherwise handle expression 3274 as described below. User interface 3280 can handle one or more of inputs 3284, 3285 or output 3287. Access module 3290 can (optionally) include one or more of allocation(s) 3291 at port 3292, sequence(s) 3293 at port 3294, or authorization 3297 at port 3296. Some configurations of system 3200 can be implemented, for example, in primary system 330 or external system 360 of FIG. 3, in module 1704 or hub 1720 of FIG. 17 (optionally linked directly, through passive media, with module 1702 as described herein), or as a stand-alone system.

Figure 33:
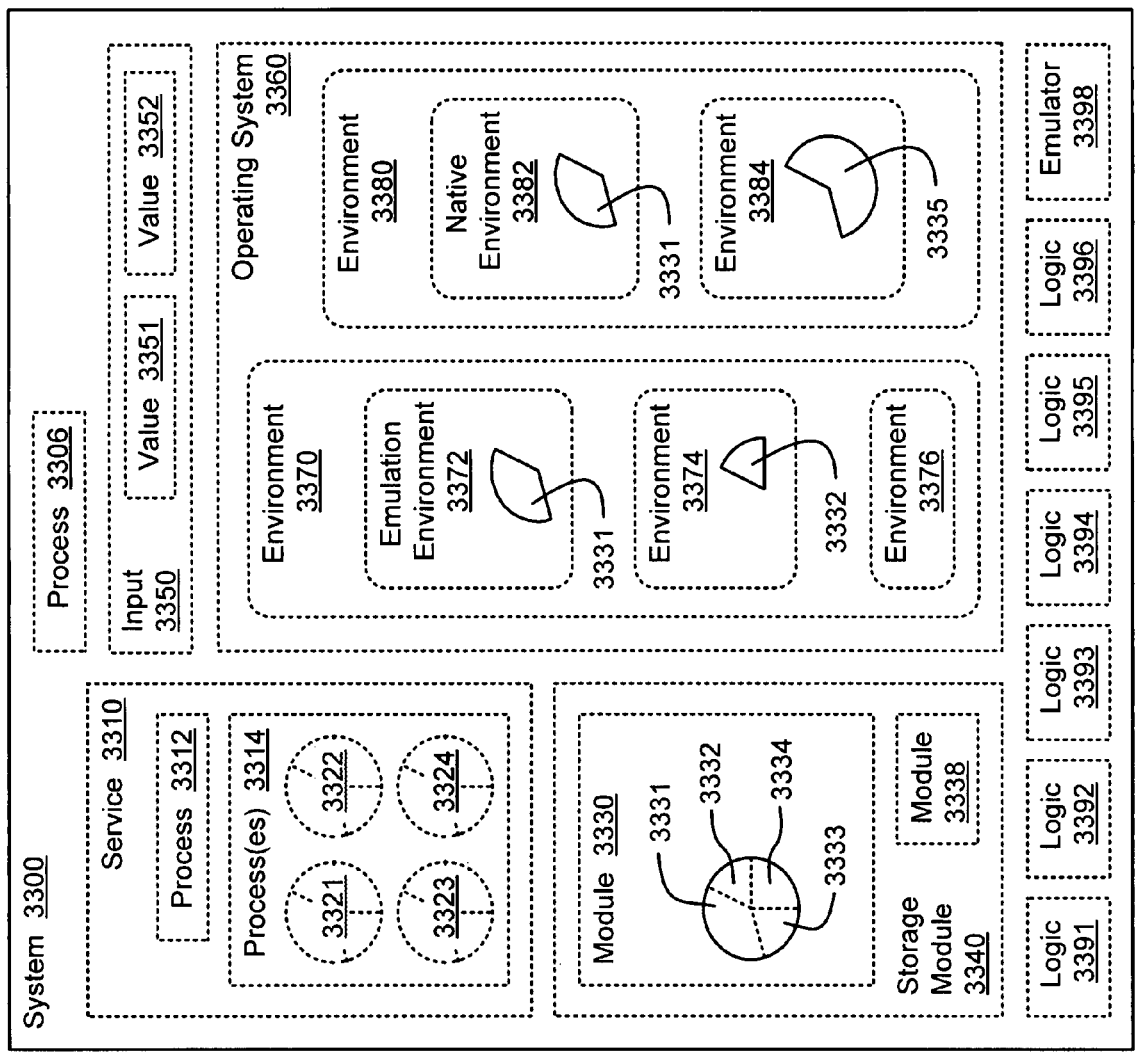

With reference now to FIG. 33, shown is an example of a system that may serve as a context for introducing one or more processes, systems or other articles described herein. System 3300 may include one or more instances of processes 3306 or other services 3310 of one or more processes 3312, 3314 or other programming objects; storage modules 3340; inputs 3350 of one or more values 3351, 3352; operating systems 3360; logic 3391, 3392, 3393, 3394, 3395, 3396; or emulators 3398. Each storage module 3340 may include modules 3330, 3338, one or more of which may include portions 3331, 3332, 3333, 3334. Process 3314 may, for example, include one or more instances 3321, 3322, 3323, 3324 of (one or more portions 3331-3334 of) module 3330 executing. Operating system 3360 may include one or more environments 3370, 3380. Emulation environment 3372 may host an instance of one or more portions 3331 of module 3330 executing, for example. Environment 3374 may likewise include one or more other portions 3332 of module 3330 executing within environment 3370. Alternatively or additionally, environment 3376 may likewise exist within environment 3370. The same one or more portions 3331 of module 3330 may execute within native environment 3382, with environment 3384 likewise executing one or more portions 3335 of module 3330 as described below. Some configurations of system 3300 can be implemented, for example, in primary system 330 or external system 360 of FIG. 3, in module 1704 or hub 1720 of FIG. 17 (optionally linked directly, through passive media, with module 1702 as described herein), in system 3200 of FIG. 32, or as a stand-alone system.

Figure 34:
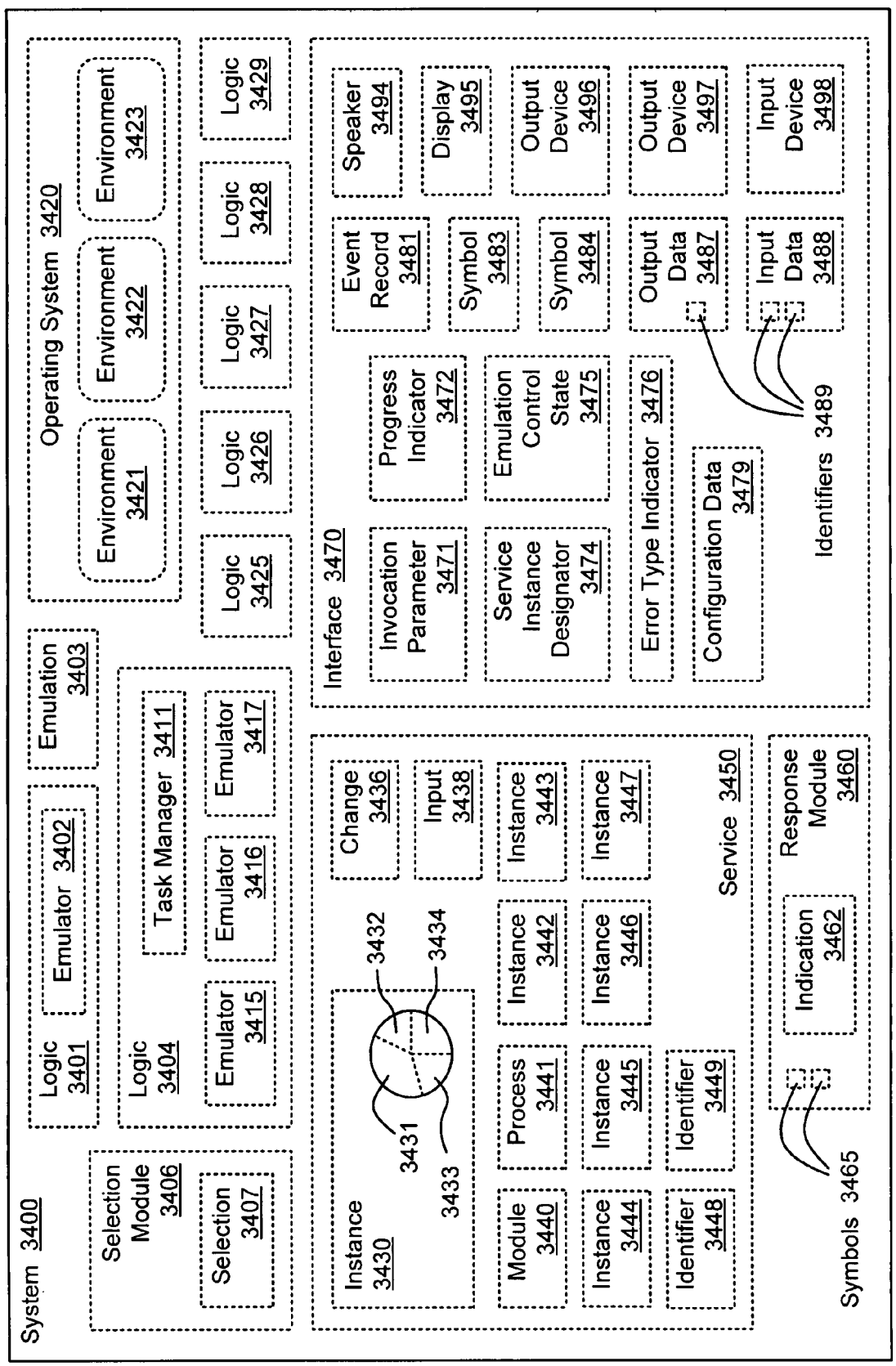

With reference now to FIG. 34, shown is an example of a system that may serve as a context for introducing one or more processes, systems or other articles described herein. System 3400 may include one or more instances of logic 3401 (optionally including one or more emulators 3402); emulation 3403; logic 3404; selection module 3406 (optionally including one or more selections 3407); operating system 3420 (optionally including one or more environments 3421, 3422, 3423); logic 3425, 3426, 3427, 3428, 3429; services 3450; response modules 3460; or interfaces 3470. Each logic 3404 may include one or more instances of task managers 3411 or emulators 3415, 3416, 3417. Operating system 3420 may include one or more (partial- or full-) emulation environments (as environments 3421, 3422 for example) as well as one or more native environments. Each service 3450 may include one or more service instances 3430 of one or more portions 3431, 3432, 3433, 3434; changes 3436; inputs 3438; modules 3440; processes 3441; or other service instances 3442, 3443, 3444, 3445, 3446, 3447 or identifiers 3448, 3449. Each such response module 3460 may include one or more instances of indications 3462 or symbols 3465 as described below. Each such interface 3470 may include one or more instances of invocation parameters 3471, progress indicators 3472, service instance designator 3474, emulation control states 3475, error type indicators 3476, configuration data 3479, event records 3481, symbols 3483-3484, output data 3487 such as one or more identifiers 3489, input data 3488 such as one or more identifiers 3489, speakers 3494, displays 3495, output devices 3496-3497, or input devices 3498. Some configurations of system 3400 can be implemented, for example, in primary system 330 or external system 360 of FIG. 3, in module 1704 or hub 1720 of FIG. 17 (optionally linked directly, through passive media, with module 1702 as described herein), in system 3200 of FIG. 32 or system 3300 of FIG. 33, or as a stand-alone system.

Figure 35:
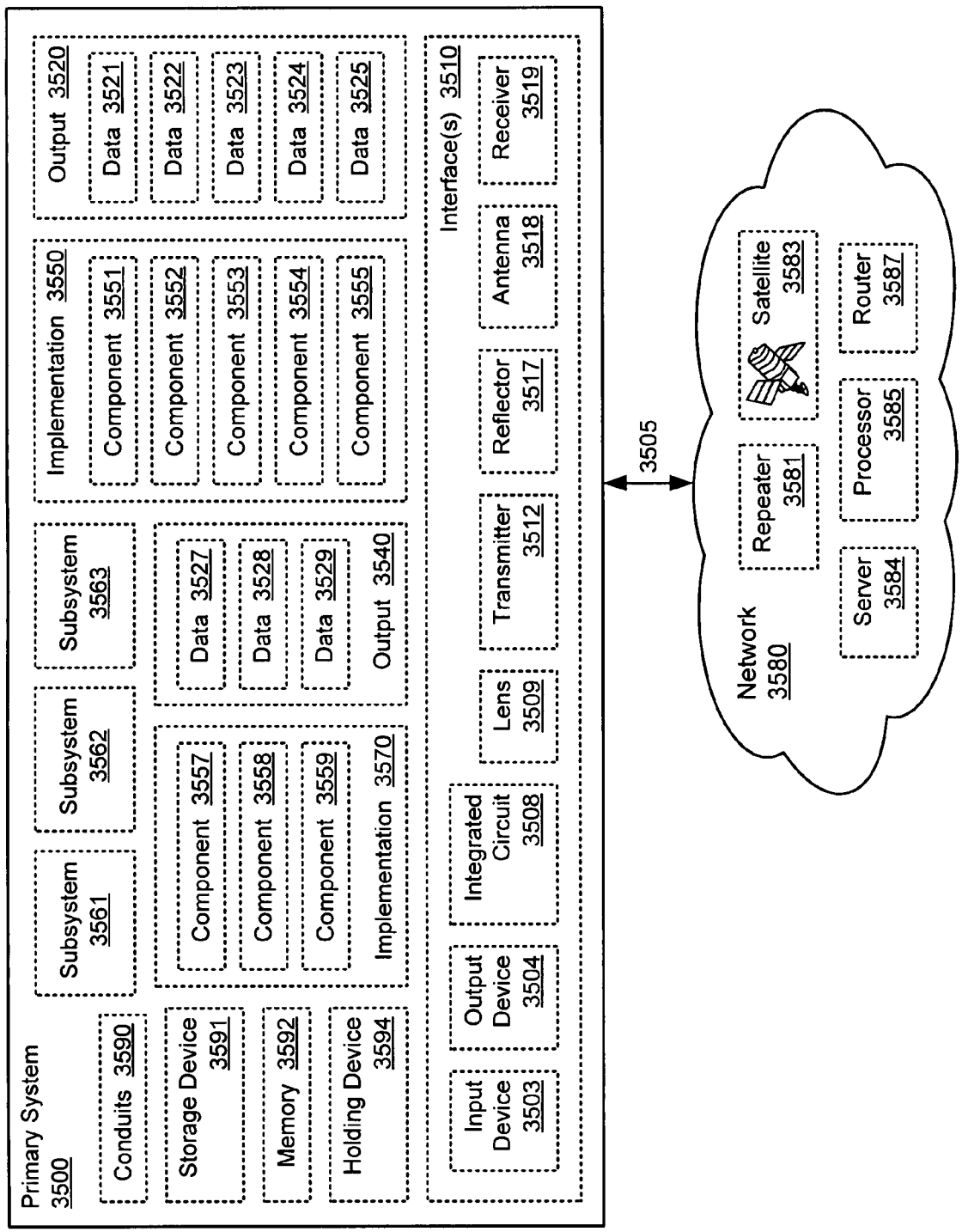

With reference now to FIG. 35, shown is an example of a system that may serve as a context for introducing one or more processes, systems or other articles described herein. Primary system 3500 may include one or more instances of outputs 3520, 3540 or implementations 3550, 3570 that may be held or transmitted by interfaces 3510, conduits 3590, storage devices 3591, memories 3592, holding devices 3594, or the like. In various embodiments as described herein, for example, one or more instances of implementation output data 3521, 3522, 3523, 3524, 3525, 3527, 3528, 3529 or implementation components 3551, 3552, 3553, 3554, 3555, 3557, 3558, 3559 may each be expressed in any aspect or combination of software, firmware, or hardware as signals, data, designs, logic, instructions, or the like. The interface(s) 3510 may include one or more instances of input devices 3503, output devices 3504, integrated circuits 3508, lenses 3509, transmitters 3512, reflectors 3517, antennas 3518, receivers 3519, or the like for handling data or communicating with local users or with network 3580 via linkage 3505, for example. Several variants of primary system 3500 are described below with reference to one or more instances of repeaters 3581, communication satellites 3583, servers 3584, processors 3585, routers 3587, or other elements of network 3580.

Those skilled in the art will recognize that some list items may also function as other list items. In the above-listed types of media, for example, some instances of interface(s) 3510 may include conduits 3590, or may also function as storage devices that are also holding devices 3594. Transmitters 3512 may likewise include input devices or bidirectional user interfaces, in many implementations of interface(s) 3510. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Referring again to FIG. 6, flow 600 may be performed by one or more instances of server 3584 remote from primary system 3500, for example, but operable to cause output device(s) 3504 to receive and present results via linkage 3505. Alternatively or additionally, device-detectable data 3532 may be borne by one or more instances of signal-bearing conduits 3590, holding devices 3594, integrated circuits 3508, or the like as described herein. Such data may optionally be configured for transmission by a semiconductor chip or other embodiment of integrated circuit 3508 that contains or is otherwise operatively coupled with antenna 3518 (in a radio-frequency identification tag, for example).

In some variants, some instances of flow 600 may be implemented entirely within primary system 3500, optionally as a stand-alone system. Operation 680 may be implemented by configuring component 3558 as circuitry or other logic for obtaining a resource authorization dependent upon apparent compliance with a policy of causing an emulation environment to isolate a first software object type from a second software object type, for example. This can be accomplished by including special-purpose instruction sequences or special-purpose-circuit designs for this function, for example, in optical or other known circuit fabrication operations, in programming by various known voltage modulation techniques, or otherwise as described herein or known by those skilled in the art. Component 3558 may include one or more instances of access controller 2170 as described above, for example. Output data 3528 from such a component in primary system 3500 or network 3580 may be recorded by writing to or otherwise configuring available portions of storage device(s) 3591.

Alternatively or additionally, such specific output data may be transmitted by configuring transistors, relays, or other drivers or conduits 3590 of primary system 3500 to transfer it to component 3559, for example. Component 3559 may perform operation 690 via implementation as circuitry or other logic for signaling a decision whether to comply with the policy of causing the emulation environment to isolate the first software object type from the second software object type, for example. Component 3559 may include one or more instances of signaling circuitry 2110, 2310 as described above, for example. Implementation output data 3529 from such a component in primary system 3500 or network 3580 may be recorded into available portions of storage device(s) 3591 or sent to subsystem 3561, for example. Subsystem 3561 may perform other operations via implementation as signaling circuitry 2310, sequence comparator 2396, or other logic as described herein. Output 3540 from flow 600 may likewise include other data 3527 as described herein. Each portion of implementation 3570 may likewise include one or more instances of software, hardware, or the like implementing logic that may be expressed in several respective forms as described herein or otherwise understood by those skilled in the art.

Referring again to FIG. 12, some instance of flow 1200 may be implemented entirely within primary system 3500. Operation 1210 may be implemented by configuring component 3551 as circuitry or other logic for obtaining data from a first emulator and from a first emulation environment hosting software, for example, such as by including special-purpose instruction sequences or special-purpose-circuit designs for this function. Component 3551 may include one or more portions of system 2700 as described above, for example. Output data 3521 from such a component in primary system 3500 or network 3580 may be recorded into available portions of storage device(s) 3591 or sent to component 3552, for example. Component 3552 may perform operation 1220 via implementation as circuitry or other logic for signaling a decision whether to transfer any of the data to a second emulator at least partly as a result of the first emulation environment hosting the software, for example. Component 3552 may include one or more instances of signaling modules 2640, 2740 as described above, for example. Decision data or other implementation output data 3522 from such a component in primary system 3500 or network 3580 may be recorded into available portions of storage device(s) 3591 or sent to component 3553, for example. Subsystem 3562 may perform other operations via implementation as one or more instances of other portions of system 2600, selection logic 2714, machines 2770, 2780, 2790, or other logic as described herein. Output 3520 from flow 1200 may likewise include other data 3525 as described herein. Each portion of implementation 3550 may likewise include one or more instances of software, hardware, or the like implementing logic that may be expressed in several respective forms as described herein or otherwise understood by those skilled in the art.

Referring again to FIG. 4, some instance of flow 400 may be implemented entirely within primary system 3500. Operation 430 may be implemented by configuring component 3553 as circuitry or other logic for indicating a virtually-instantiable service via a data flow between a user interface and an operating system, the virtually-instantiable service including at least a first instance, for example, such as by including special-purpose instruction sequences or special-purpose-circuit designs for this function. Component 3553 may include one or more portions of FIGS. 32-37 as described herein, for example. Output data 3523 from such a component in primary system 3500 or network 3580 may be recorded into available portions of storage device(s) 3591 or sent to component 3554, for example. Component 3554 may perform operation 440 via implementation as circuitry or other logic for accessing a second instance of the virtually-instantiable service at least partly in response to the user interface after indicating the virtually-instantiable service via the data flow between the user interface and the operating system, for example. Component 3554 may include one or more other portions of FIGS. 32-37 as described herein, for example. Implementation output data 3524 from such a component in primary system 3500 or network 3580 may be recorded into available portions of storage device(s) 3591 or sent to component 3555, for example. Component 3555 may perform other operations via implementation as circuitry or other logic as described herein. In some embodiments, subsystem 3563 may include other portions of FIGS. 32-37 including logic for performing variants of flow 400 as described herein. Output 3520 from flow 400 may likewise include other data 3521, 3522, 3525 as described herein. Each portion of implementation 3550 may likewise include one or more instances of software, hardware, or the like implementing logic that may be expressed in several respective forms as described herein or otherwise understood by those skilled in the art.

In some embodiments, output device 3504 may indicate an occurrence of flow 600 concisely as a decision, an evaluation, an effect, an hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also provide one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 3521-3529 do not matter, or in which a recipient may understand or access portions of data 3521-3529 without receiving a preemptive explanation of how it was obtained. By distilling output 3520 or output 3540 at an "upstream" stage (which may comprise integrated circuit 3508, for example, in some arrangements), downstream-stage media (such as other elements of network 3580, for example) may indicate occurrences of various methods described herein more effectively. Variants of flow 600, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 3510 may interact with one or more primary system users via input and output devices 3503, 3504 so as to manifest an implementation in primary system 3500 via an interaction with server 3584, for example, running a secondary implementation of flow 600. Such local implementations may comprise a visual display supporting a local internet service to the remote server, for example. Such a remote server may control or otherwise enable one or more instances of hardware or software operating the secondary implementation outside a system, network, or physical proximity of primary system 3500. For a building implementing primary system 3500, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 3500 running an implementation of flow 600 may be a remote activation of a special-purpose computer program resident on server 3584 via an internet browser session interaction through linkage 3505, mediated by input device 3503 and output device 3504.

In some variants, some or all of components 3551-3559 may be borne in various data-handling elements—e.g., in one or more instances of storage devices 3591, in memories 3592 or volatile media, passing through linkage 3505 with network 3580 or other conduits 3590, in one or more registers or data-holding devices 3594, or the like. For example, such processing or configuration may occur in response to user data or the like received at input device 3503 or may be presented at output device 3504. Instances of input devices 3503 may (optionally) include one or more instances of cameras or other optical devices, hand-held systems or other portable systems, keypads, sensors, or the like as described herein. Output device(s) 3504 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 3503, or the like.

A device-detectable implementation of variants described herein with reference to flows 400, 600, 1200, for example, may be divided into several components 3551-3559 carried by one or more instances of active modules such as signal repeaters 3581, communication satellites 3583, servers 3584, processors 3585, routers 3587, or the like. For example, in some embodiments, some or all of components 3552, 3554, 3559 may be borne by an "upstream" module (e.g., repeater 3581 or the like) while or after some or all of components 3551, 3553, 3558 is borne in a "downstream" module (e.g., another instance of repeater 3581, communication satellite 3583, server 3584, or the like). Such downstream modules may "accept" such bits or other portions of implementation 3550 or implementation 3570 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events may occur "in response" to both preparatory (earlier) events and triggering (contemporaneous) events in some contexts. Output 3540 may result from more than one component of implementations 3550, 3570 or more than one operation of flow 600, for example.

In some embodiments, such integrated circuits 3508 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 35, for example, instances of the one or more input devices 3503 may include a microphone or the like operable to provide auditory samples in data 3521-3529. Some form or portion of such output may be provided remotely, for example, to one or more instances of neural networks or other configurations of remote processors 3585 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 35, for example, instances of lenses 3509 or other input devices 3503 may include optical sensors or the like operable to provide one or more of geometric, hue, or optical intensity information in data 3521-3529. Some form or portion of such output may be provided locally, for example, to one or more instances of optical character recognition software, pattern recognition processing resources, or other configurations of integrated circuits 3508 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

In some embodiments, one or more instances of integrated circuits or other processors may be configured to perform linguistic pattern recognition. In FIG. 35, for example, instances of input devices 3503 may include keys, pointing devices, microphones, sensors, reference data, or the like operable to provide spoken, written, or other symbolic expressions in data 3521-3529. Some form or portion of such output may be provided locally, for example, to one or more instances of translation utilities, compilers, or other configurations of integrated circuits 3508 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein.

In some embodiments, one or more antennas 3518 or receivers 3519 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 3521-3529 may be sent from server 3584 through respective channels at various times, one portion passing through repeater 3581 and another through router 3587. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or another output 3520, 3540 of interest. Such distributed media may be implemented as an expedient or efficient mode of bearing such portions of output data to a common destination such as interface 3510 or holding device 3594. Alternatively or additionally, some such data may be transported by moving a medium (carried on storage device 3591, for example) so that only a small portion (a purchase or other access authorization, for example, or a contingent or supplemental module) is transferred via linkage 3505.

In some embodiments, one or more instances of signal repeaters 3581 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 3583 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

In some variants, processor 3585 or any components 3551-3559 of implementations 3550, 3570 may (optionally) be configured to perform flow variants as described herein with reference to one or more of FIGS. 40-42 (or FIG. 6), FIGS. 46-48 (or FIG. 12), or FIGS. 52-54 (or FIG. 4). An occurrence of such a variant can be expressed as a computation, a transition, or as one or more other items of data 3521-3529 described herein. Such output 3520, 3540 can be generated, for example, by depicted components of primary system 3500 or network 3580 including one or more features as described with reference to one or more of FIGS. 3, 5, 11, or 17-37.

Figure 36:
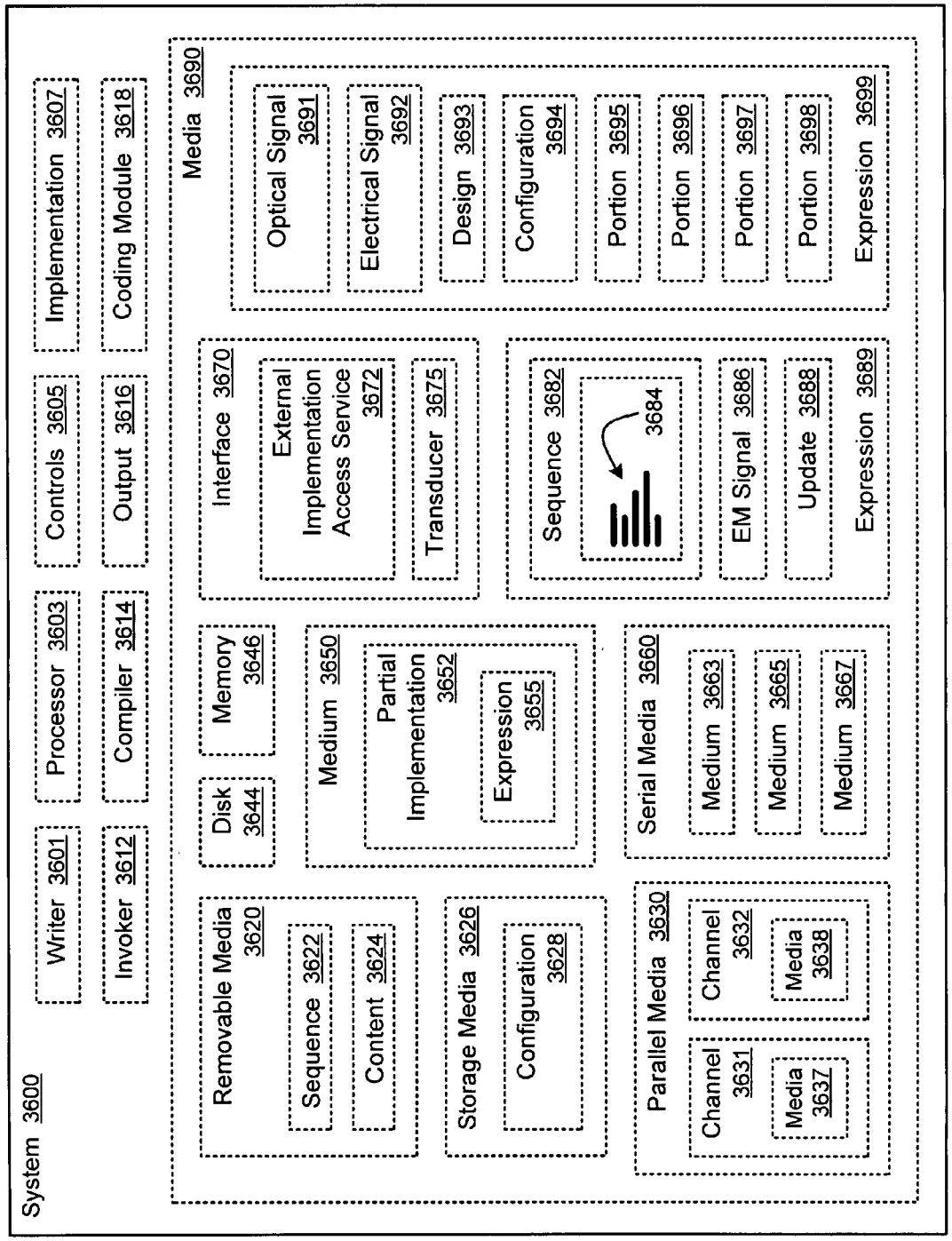

With reference now to FIG. 36, shown is an example of another system that may serve as a context for introducing one or more processes, systems or other articles described herein. As shown system 3600 comprises one or more instances of writers 3601, processors 3603, controls 3605, software or other implementations 3607, invokers 3612, compilers 3614, outputs 3616, coding modules 3618, or the like with one or more media 3690 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations can include software or other control structures operable to guide device operation. Electronic circuitry, for example, can manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 3618 may be configured with circuitry for applying, imposing, or otherwise using a syntactic or other encoding constraint in forming, extracting, or otherwise handling respective portions of the device-detectable implementation or output. In encoding a software module or other message content, for example, compiler 3614 or coding module 3618 may implement one or more such constraints pursuant to public key or other encryption, applying error correction modes, certifying or otherwise annotating the message content, or implementing other security practices described herein or known by those skilled in the art. Alternatively or additionally, another instance of coding module 3618 may be configured to receive data (via receiver 3519, e.g.) and decode or otherwise distill the received data using one or more such encoding constraints. Compiler 3614 may, in some variants, convert one or more of components 3551-3559 from a corresponding source code form before the component(s) are transmitted across linkage 3505.

System 3600 may be implemented, for example, as one or more instances of stand-alone workstations, servers, vehicles, portable devices, removable media 3620, as components of primary system 3500 or network 3580 (of FIG. 35), or the like. Alternatively or additionally, media 3690 may include one or more instances of signal repeaters 3581, communication satellites 3583, servers 3584, processors 3585, routers 3587, portions of primary system 3500 as shown, or the like.

Media 3690 may include one or more instances of removable media 3620, tapes or other storage media 3626; parallel (transmission) media 3630; disks 3644; memories 3646; other data-handling media 3650; serial media 3660; interfaces 3670; or expressions 3689, 3699. Removable media 3620 can bear one or more device-detectable instances of instruction sequences 3622 or other implementations of flow 600 or flow 1200, for example. Alternatively or additionally, in some embodiments, removable media 3620 can bear alphanumeric data, audio data, image data, structure-descriptive values, or other content 3624 in a context that indicates an occurrence of one or more flows 400, 600, 1200. In some circumstances, transmission media may bear respective portions of implementations as described herein serially or otherwise non-simultaneously. In some variants in which two portions 3697, 3698 constitute a partial or complete software implementation or product of a novel method described herein, portion 3697 may follow portion 3698 successively through serial media 3663, 3665, 3667 (with transmission of portion 3697 partly overlapping in time with transmission of portion 3698 passing through medium 3663, for example). As shown, parallel channels 3631, 3632 are respectively implemented at least in media 3637, 3638 of a bus or otherwise effectively in isolation from one another. In some embodiments, a bus may be a system of two or more signal paths—not unified by a nominally ideal conduction path between them—configured to transfer data between or among internal or external computer components. For example, one data channel may include a power line (e.g., as medium 3665) operable for transmitting content of the device-detectable implementation as described herein between two taps or other terminals (e.g., as media 3663, 3667 comprising a source and destination).

In another such configuration, one or more media 3637 of channel 3631 may bear portion 3697 before, while or after one or more other media 3638 of parallel channel 3632 bear portion 3698. In some embodiments, such a process may occur "while" another process occurs if they coincide or otherwise overlap in time substantially (by several clock cycles, for example). In some embodiments, such a process may occur "after" an event if any instance of the process begins after any instance of the event concludes, irrespective of other instances overlapping or the like. In a variant in which a channel through medium 3650 bears an expression 3655 partially implementing an operational flow described herein, the remainder of the implementation may be borne (earlier or later, in some instances) by the same medium 3650 or by one or more other portions of media 3690 as shown. In some embodiments, moreover, one or more controls 3605 may configure at least some media 3690 by triggering transmissions as described above or transmissions of one or more outputs 3616 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 3690 constructed and arranged to receive a special-purpose sequence 3682 of two or more device-detectable instructions 3684 for implementing a flow as described herein or to receive an output of executing such instructions. Physical media 3690 may (optionally) be configured by writer 3601, transmitter 3512, or the like.

In some embodiments, such a "special-purpose" instruction sequence may include any ordered set of two or more instructions directly or indirectly operable for causing multi-purpose hardware or software to perform one or more methods or functions described herein: source code, macro code, controller or other machine code, or the like. In some embodiments, an implementation may include one or more instances of special-purpose sequences 3682 of instructions 3684, patches or other implementation updates 3688, configurations 3694, special-purpose circuit designs 3693, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium. Segments of such implementations or their outputs may likewise be manifested in electromagnetic signals 3686, laser or other optical signals 3691, electrical signals 3692, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 3628 of non-volatile storage media 3626 or as external implementation access services 3672.

In some embodiments, physical media can be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

Referring now to FIG. 35 and also to FIG. 4 or 52-54, in some configurations, one or more output devices 3504 may present one or more results of indicating a virtually-instantiable service via a data flow between a user interface and an operating system, the virtually-instantiable service including at least a first instance (by some variant of operation 430, for example) in response to interface(s) 3510 receiving one or more invocations or outputs of an implementation of this function via linkage 3505. Such an "invocation" may, in some embodiments, comprise one or more instances of requests, hardware or software activations, user actions, or other determinants as described herein. Alternatively or additionally, in some embodiments, one or more input devices 3503 may later receive one or more invocations or results of accessing a second instance of the virtually-instantiable service at least partly in response to the user interface after indicating the virtually-instantiable service via the data flow between the user interface and the operating system. In contexts like these, processor 3585 or other components of network 3580 may likewise constitute a secondary implementation having access to a primary instance of interface 3510 implementing methods like flow 400 as described herein.

Referring now to FIG. 35 and also to FIG. 6 or 40-42, in some configurations, one or more output devices 3504 may present one or more results of obtaining a resource authorization dependent upon apparent compliance with a policy of causing an emulation environment to isolate a first software object type from a second software object type (by some variant of operation 680, for example) in response to interface(s) 3510 receiving one or more invocations or outputs of an implementation of this function via linkage 3505. Such an "invocation" may, in some embodiments, comprise one or more instances of requests, hardware or software activations, user actions, or other determinants as described herein. Alternatively or additionally, in some embodiments, one or more input devices 3503 may later receive one or more invocations or results of signaling a decision whether to comply with the policy of causing the emulation environment to isolate the first software object type from the second software object type. In contexts like these, processor 3585 or other components of network 3580 may likewise constitute a secondary implementation having access to a primary instance of interface 3510 implementing methods like flow 600 as described herein.

Referring now to FIG. 35 and also to FIG. 12 or 46-48, in some configurations, one or more output devices 3504 may present one or more results of obtaining data from a first emulator and from a first emulation environment hosting software (by some variant of operation 1210, for example) in response to interface(s) 3510 receiving one or more invocations or outputs of an implementation of this function via linkage 3505. Such an "invocation" may, in some embodiments, comprise one or more instances of requests, hardware or software activations, user actions, or other determinants as described herein. Alternatively or additionally, in some embodiments, one or more input devices 3503 may later receive one or more invocations or results of signaling a decision whether to transfer any of the data to a second emulator at least partly as a result of the first emulation environment hosting the software. In contexts like these, processor 3585 or other components of network 3580 may likewise constitute a secondary implementation having access to a primary instance of interface 3510 implementing methods like flow 1200 as described herein.

Referring again now to FIG. 36, serial media 3660 may include a communication channel of two or more media configured to bear a transition or other output increment successively. In some embodiments, for example, serial media 3660 may include a communication line or wireless medium (e.g., as medium 3665) between two signal-bearing conduits (e.g., terminals or antennas as media 3663, 3667). Alternatively or additionally, one or more lenses 3509 or other light-transmissive media may comprise a serial medium between a light-transmissive medium and a sensor or other light receiver 3519 or transmitter 3512. In some embodiments, such "light-transmissive" media may (optionally) comprise metamaterials or other media operable for bearing one or more instances of microwave signals, radiowave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 3600 may likewise include one or more instances of media for handling implementations or their outputs: satellite dishes or other reflectors 3517, antennas 3518 or other transducers 3675, arrays of two or more such devices configured to detect or redirect one or more incoming signals, caching elements or other data-holding elements (e.g., disks 3644, memories 3646, or other media 3690), integrated circuits 3508, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 3695, 3696 of an expression 3699 of implementation 3607 may be sent through respective channels at various times. Invoker 3612 may request or otherwise attempt to activate a computer program or streaming media overseas via a telephone cable or other channel 3631. Meanwhile, output 3616 may attempt to trigger a session or other partial implementation 3652, success in which may be indicated by receiving expression 3655 into a visual display or other medium 3650. Such a program or other implementation may be made complete, for example, once both of these attempts succeed.

In some embodiments, transducer(s) 3675 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals (or vice versa).

Figure 37:
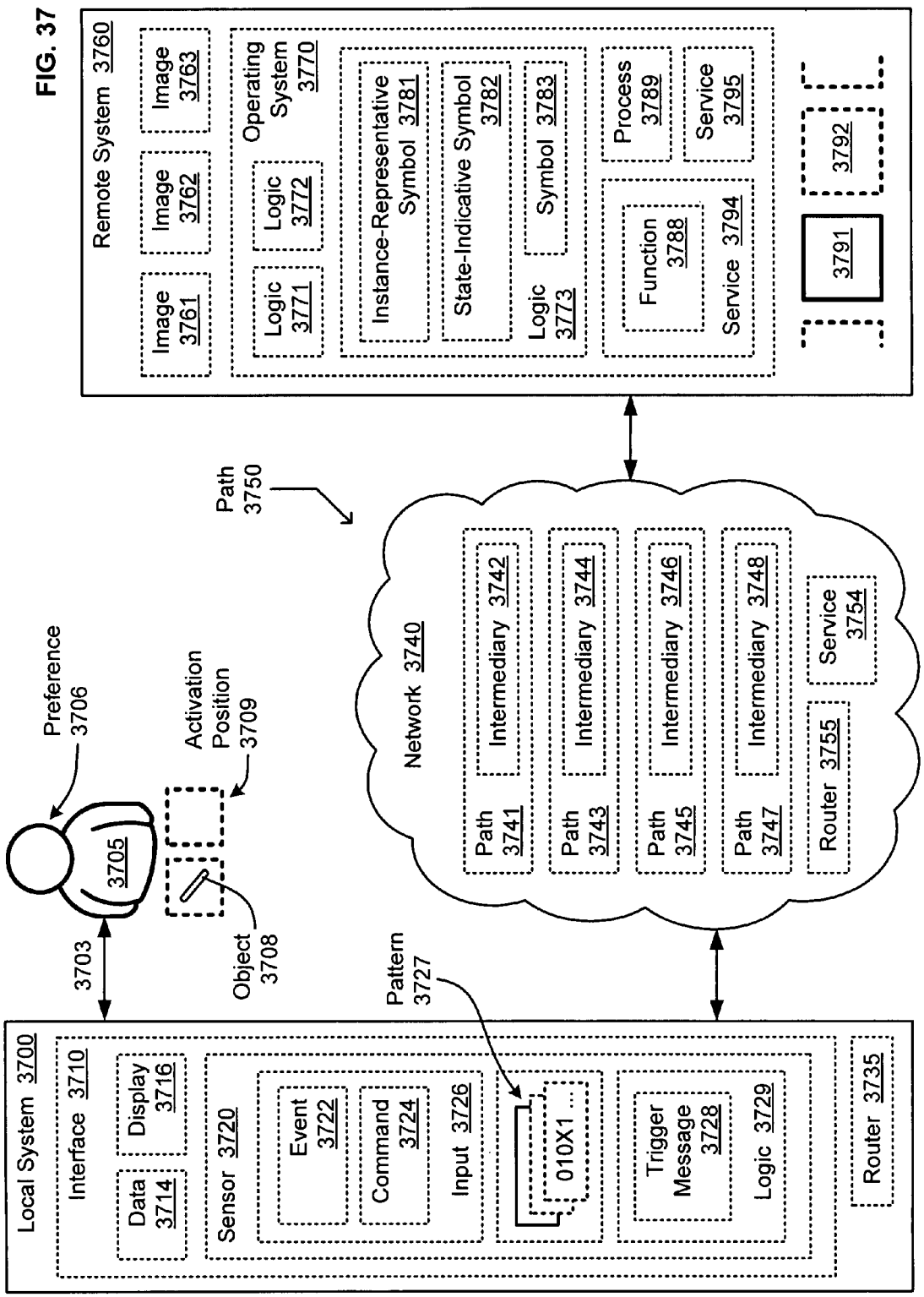

With reference now to FIG. 37, shown is an example of a system that may serve as a context for introducing one or more processes, systems or other articles described herein. As shown, local system 3700 may be at least partly within a detection proximity 3703 of user 3705 and/or operatively coupled with remote system 3760, for example, via network 3740. Such an arrangement may, of course, permit user 3705 to express one or more preferences 3706 such as by moving one or more objects 3708 into a respective activation position 3709. Local system 3700 may include one or more stationary or mobile components such as one or more instances of interface 3710 comprising one or more instances of data 3714, displays 3716, or sensors 3720 optionally configured to be worn or carried while in use. Each such sensor 3720 may detect one or more instances of events 3722, commands 3724, or other inputs 3726 (from one or more users 3705 or services 3754, 3794, 3795, for example) that may include one or more instances of patterns 3727. Sensor 3720 may likewise include one or more instances of logic 3729 operable to generate one or more trigger messages 3728 or the like at least partly in response to detecting each such pattern 3727. The trigger message(s) 3728 may be guided toward remote system 3760 through one or more paths 3750, for example, by one or more routers 3735, 3755. Each such path 3750 in either or both directions may include one or more of path 3741 (e.g., via intermediary 3742), path 3743 (e.g., via intermediary 3744), path 3745 (e.g., via intermediary 3746), or path 3747 (e.g., via intermediary 3748), for example. Many such routers are readily adapted for this application by those of ordinary skill in the art, in light of these teachings. Remote system 3760 may include one or more instances of operating systems 3770 or processors 3791-3792 operable for handling one or more images 3761, 3762, 3763 as described below. Each such operating system 3770 may include software or other logic 3771, 3772, 3773 or one or more other functions 3788, processes 3789, or other services 3794, 3795. Each instance of local system 3700, network 3740, or remote system 3760 may implement any of systems 3200, 3300, 3400, 3600 as described herein.

Figure 38:
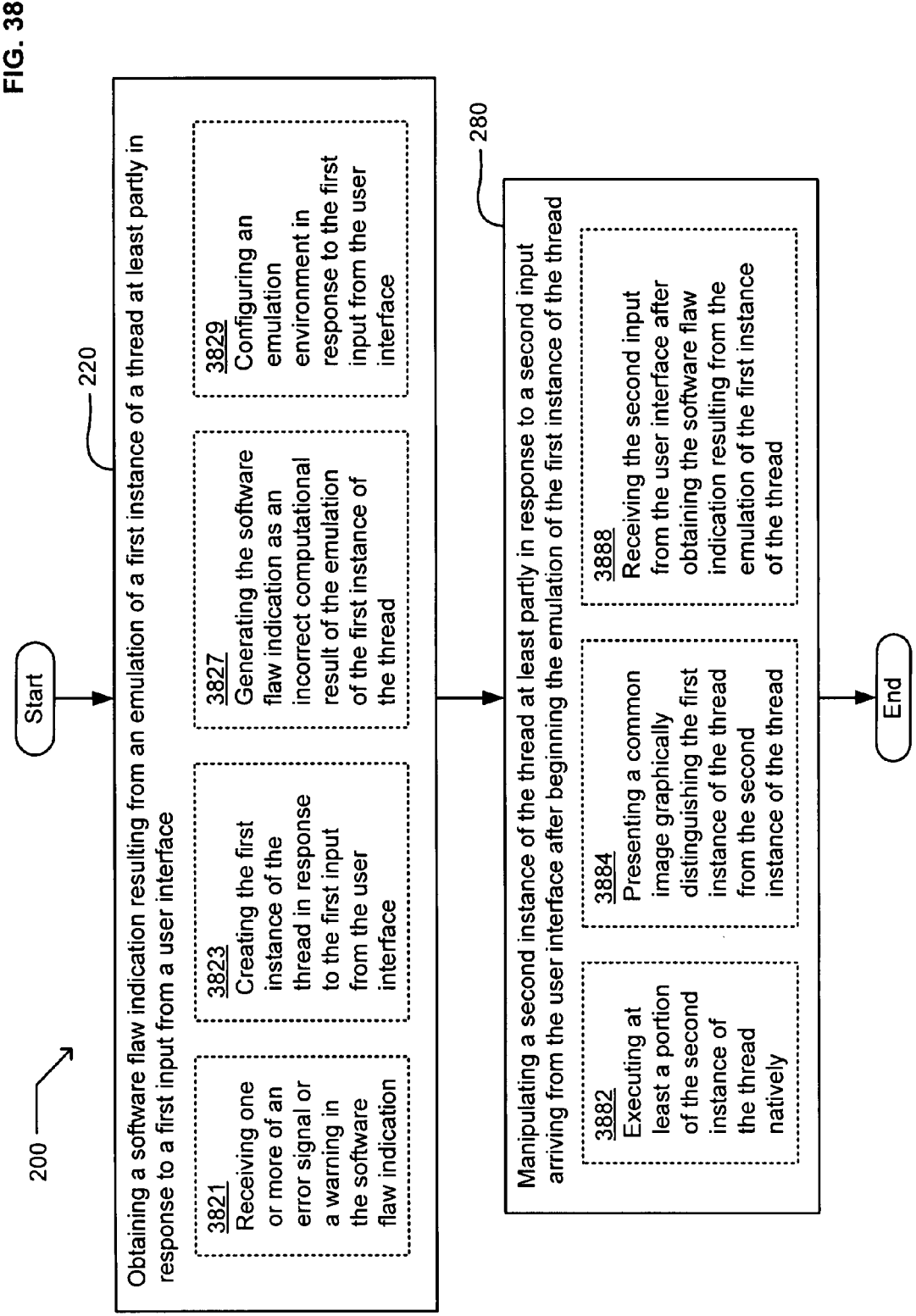
FIGS. 38-39 depict variants of the flow of FIG. 2.

With reference now to FIG. 38, there are shown several variants of the flow 200 of FIG. 2. Operation 220—obtaining a software flaw indication resulting from an emulation of a first instance of a thread at least partly in response to a first input from a user interface—may include one or more of the following operations: 3821, 3823, 3827, or 3829. The thread can, for example, arise by an execution of sequence 1725 or the like, in embodiments in which hub 1720 implements one or more instances of systems 1800, 1900, 2000 as described herein for acting on other sequences, which sequence 1725 can include. Operation 280—manipulating a second instance of the thread at least partly in response to a second input arriving from the user interface after beginning the emulation of the first instance of the thread—may include one or more of the following operations: 3882, 3884, or 3888.

Operation 3821 describes receiving one or more of an error signal or a warning in the software flaw indication (e.g. port 2056 receiving flaw indication 2080 containing at least one of error type 2081 or warning type 2082). This can occur, for example, in embodiments in which one or more instances of monitoring modules 1803, 2005 perform operation 220 and in which one or more instances of control modules 1804, 1904, 2004 or hosting modules 1906, 2006 perform operation 280. Error type 2081 can indicate a divide-by-zero, an illegal write or read, a timeout, or any other (actual or apparent) occurrence of an error. Warning type 2082 can indicate one or more of a failure prediction, a resource shortage record, a risk, a slower-than-nominal rate, or the like.

Operation 3823 describes creating the first instance of the thread in response to the first input from the user interface (e.g. emulator 1932 creating thread 1975 by executing instruction sequence 1952 according to selected parameters 1894 received from user interface 1899). This can occur, for example, in a variant of system 1800 that implements hosting module 1906 or other parts of system 1900, in which hosting module 1906 and monitoring module 1803 jointly perform operation 220, and in which at least control module 1904 performs operation 280. In some variants, such selections can specify one or more checkpoints 1896, environmental parameters 1893, module parameters 1894, timing 1892, expected intermediate or final results 1895, or the like.

Operation 3827 describes generating the software flaw indication as an incorrect computational result of the emulation of the first instance of the thread (e.g. at least emulator 2075 generating one or more of metadata 2046, module output 2047, register values 2048, or the like that differ from one or more corresponding expected results 2032). Alternatively or additionally, some variants can include a comparator 2010 that can detect that the result is incorrect, such as by comparing actual results 2016 (generated with known parameters 2036, e.g.) that can then be compared with corresponding theoretical results 2014.

Operation 3829 describes configuring an emulation environment in response to the first input from the user interface (e.g. configuration logic 1850 causing core 1910 to access server 1908, to implement fault detection logic 1837 or error recovery logic 1832, to adjust event simulation or other timing 1892, or the like according to information indicated in input 1890). This can occur, for example, in embodiments in which one or more instances of monitoring modules 1803, 2005 perform operation 220 and in which one or more instances of control modules 1804, 1904, 2004 or hosting modules 1806, 1906 perform operation 280. Alternatively or additionally, emulator 1912 can generate or adapt server 1908 virtually (as a database server, web server, or the like) in response to a suitable input 1981 from user interface 1980.

Operation 3882 describes executing at least a portion of the second instance of the thread natively (e.g. core 2040 executing at least instruction sequence 2065 of instance 2068 natively). This can occur, for example, in an embodiment in which another portion has an apparent flaw (e.g. sequence 2062 having apparent flaw 2063), in which emulator 2075 emulates the "first" instance 2069 of thread 2070 in response to "first" input 2051, and in which "second" instance 2068 is manipulated partly in response to "second" input 2052, in which control module 2004 and hosting module 2006 jointly perform operation 280, and in which at least monitoring module 2005 performs operation 220. In some variants, for example, monitoring module 2005 indicates one or more timing error indications 2061, random noise indications 2064, or some other apparent flaw 2067 as parameters 2026 of error record 2020.

Operation 3884 describes presenting a common image graphically distinguishing the first instance of the thread from the second instance of the thread (e.g. display 1987 showing common image 1988 containing icons 1989, windows, or the like respectively representing each of instances 1973, 1974). This can occur, for example, in embodiments in which system 1900 includes at least one of the monitoring modules 1803, 2005 configured to perform operation 220, and in which control module 1904 performs operation 280.

Operation 3888 describes receiving the second input from the user interface after obtaining the software flaw indication resulting from the emulation of the first instance of the thread (e.g. port 1996 or port 1997 receiving input 1982 from user interface 1980 after port 1997 or module 1955 receives or generates a warning or error message). Alternatively or additionally, in some embodiments, emulator 1932 or compiler 1995 can generate the software flaw indication in various modes as described herein, such as by emulating or otherwise processing sequence 1952.

Figure 39:
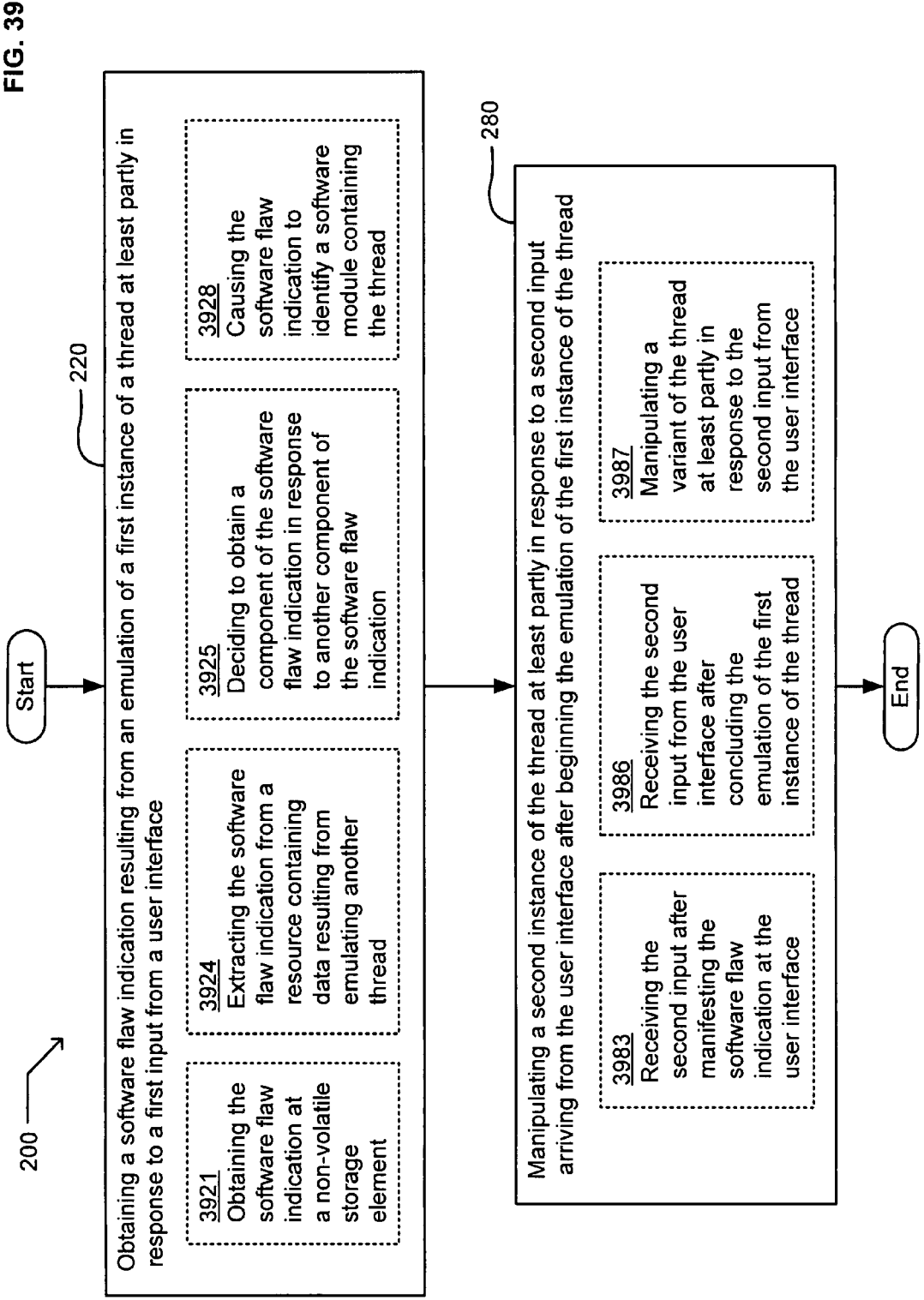

With reference now to FIG. 39, there are shown several variants of the flow 200 of FIG. 2 or 38. Operation 220—obtaining a software flaw indication resulting from an emulation of a first instance of a thread at least partly in response to a first input from a user interface—may include one or more of the following operations: 3921, 3924, 3925, or 3928. Operation 280—manipulating a second instance of the thread at least partly in response to a second input arriving from the user interface after beginning the emulation of the first instance of the thread—may include one or more of the following operations: 3983, 3986, or 3987.

Operation 3921 describes obtaining the software flaw indication at a non-volatile storage element (e.g. aggregation manager 1831 receiving at least flaw indication 1840 resulting from the emulation, such as for archiving on data storage disks 1882 or the like). This can occur, for example, in embodiments in which one or more instances of monitoring modules 1803, 2005 perform operation 220 individually or jointly, and optionally in combination with other structures as described herein.

Operation 3924 describes extracting the software flaw indication from a resource containing data resulting from emulating another thread (e.g. retrieval logic 2038 finding flaw indication 2080 and related parameters 2028 and other information 2029 about an outcome of emulating thread 2070). This can occur, for example, in embodiments in which the instance 2068 of thread 2070 executes in an environment in common with instance 2069 or object 1972 operating in a common environment with a variant 1962 of object 1972, or otherwise in which the "other" object is related to "the" object in some fashion. Alternatively or additionally, some or all of the extraction can be obtained by passing raw emulation data 2034 through data selection filter 2057.

Operation 3925 describes deciding to obtain a component of the software flaw indication in response to another component of the software flaw indication (e.g. event handler 1884 responding to flaw indication component 1846 by creating or otherwise obtaining component 1847). For example, event handler 1884 can respond to computation error indications 1849 by requesting one or more of call stack 1852, interaction history 1853, registry 1854, workspace contents 1855, or other state information 1859. Such a response can be helpful, for example, in a context in which different types of components are most useful for different types of flaw indications.

Operation 3928 describes causing the software flaw indication to identify a software module containing the thread (e.g. event handler 1963 generating an error record 2020 containing a name 2022 or location 2024 of application 1950 or module 1955 containing sequence 1951 being emulated when an apparent flaw 1954 appears). In some circumstances, an earlier-executed instruction sequence 1951 can be associated with the apparent flaw 1954 for example, through human or automatic analysis.

Operation 3983 describes receiving the second input after manifesting the software flaw indication at the user interface (e.g. input device 1985 receiving input 1982 after driver 1991 transmits a graphical, auditory, or other representation 1992 of flaw indication 1840 to output device 1986 or otherwise into a vicinity of input device 1985). For example, such manifestations can prompt a user to push back or otherwise diminish whichever instances are less problematic, or to initiate an evaluation or correction in response to the indication, or to terminate an unneeded instance, or otherwise to act on the second instance of the thread.

Operation 3986 describes receiving the second input from the user interface after concluding the emulation of the first instance of the thread (e.g. port 1996 receiving user action indications from user interface 1980 or other data 1998 after emulator 1922 aborts thread 1976 or otherwise finishes executing instance 1973). This can occur, for example, in embodiments in which hub 1720 includes one or more instances of monitoring modules 1803, 2005 configured to perform operation 220 and in which module 1702 includes one or more instances of control module 1904 (optionally with hosting module 1906) configured to perform operation 280.

Operation 3987 describes manipulating a variant of the thread at least partly in response to the second input from the user interface (e.g. code generator 1907 or editor 1994 adapting at least sequence 1951 of module 1955 in response to user commands or other input 1981). This can occur in an embodiment in which module 1702 includes an instance of system 1900 providing the first and second inputs, for example, from input device 1985. Alternatively or additionally, hub 1720 can include an instance of hosting module 1906 or other systems herein operable to host the emulation from which the software flaw indication results. Such cooperative or distributed systems can facilitate task specialization, load balancing, or other processing efficiencies in light of teachings herein.

Figure 40:
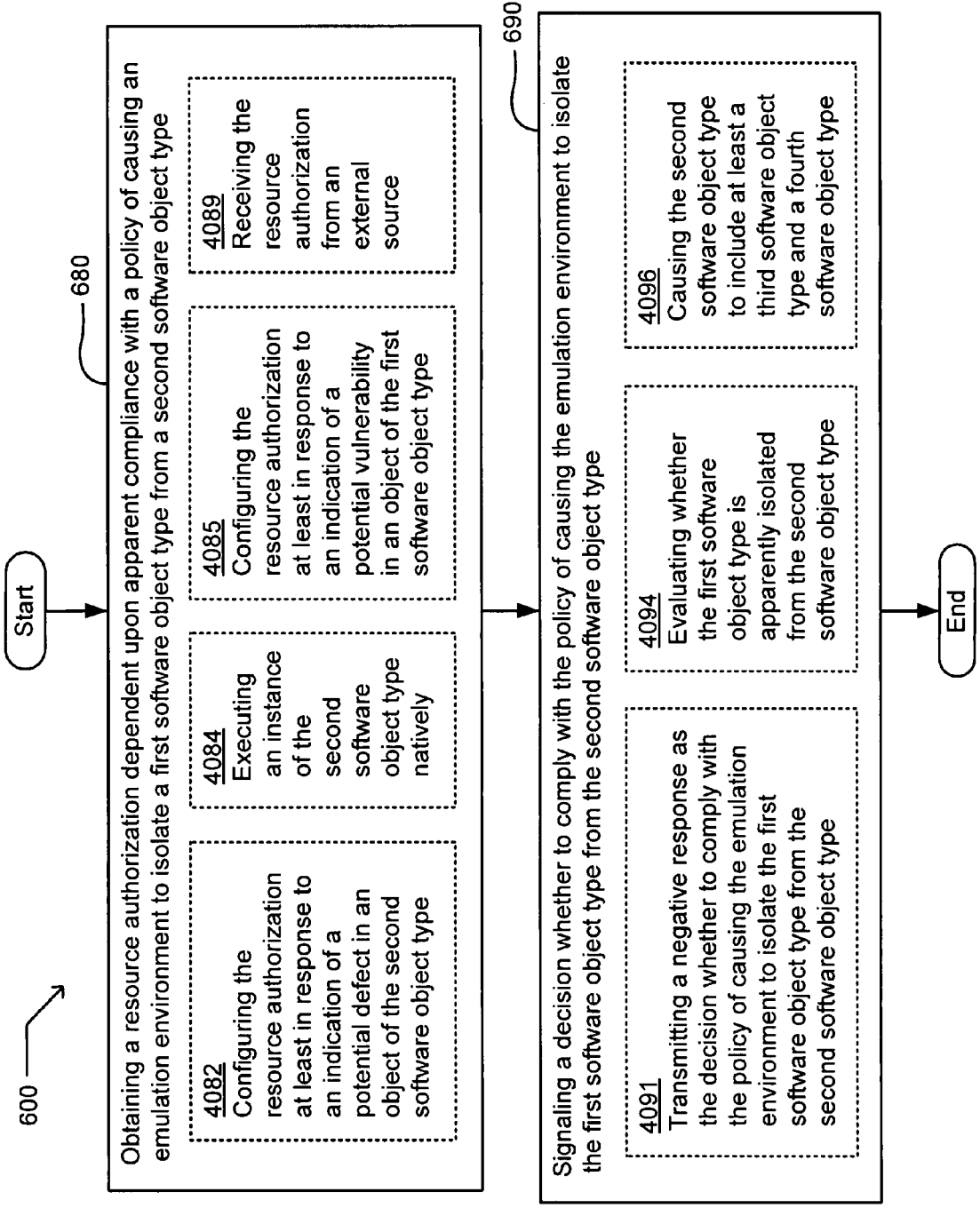
FIGS. 40-42 depict variants of the flow of FIG. 6.

With reference now to FIG. 40, there are shown several variants of the flow 600 of FIG. 6. Operation 680—obtaining a resource authorization dependent upon apparent compliance with a policy of causing an emulation environment to isolate a first software object type from a second software object type—may include one or more of the following operations: 4082, 4084, 4085, or 4089. Operation 690—signaling a decision whether to comply with the policy of causing the emulation environment to isolate the first software object type from the second software object type—may include one or more of the following operations: 4091, 4094, or 4096.

Operation 4082 describes configuring the resource authorization at least in response to an indication of a potential defect in an object of the second software object type (e.g. code generator 2180 creating or adapting resource authorization 2177 in response to object 2283 of "C" type software 2203 apparently having a resource allocation bug or other potential defect 2253). In an environment in which all "Brand X" software is considered prone to include memory leaks, resource authorization 2177 (for a network printer, e.g.) can be configured to depend upon such software being quarantined into a virtual machine or like environment. The "types" into which software is organized can likewise depend on a programmer, a revision number, a distribution mode, a command sequence, a data or file type, or the like.

In some variants, code generator 2180 can receive an indication 2182 of an actualized or other potential defect—a bug report, error log, speculative execution outcome, reputation data, or the like—in association with reference 2181 to the object(s) or type(s). Code generator 2180 can (optionally) respond by implementing a policy of isolating the object(s) or type(s), preferably according to the apparent nature of the potential defect: its severity, a target software type or other vulnerability to which it relates, whether it is apparently malicious, how burdensome emulation may be, or the like.

Operation 4084 describes executing an instance of the second software object type natively (e.g. processor 2142 executing one or more of objects 2281, 2282, 2283 directly and physically in environment 2162, without emulation). This can occur, for example, in embodiments in which the emulation environment comprises environment 2163 hosting object 2284, in which "D" type software 2204 is the "first" type, and in which the "second" type comprises one or more of "A" type software 2201 or "C" type software 2203.

Operation 4085 describes configuring the resource authorization at least in response to an indication of a potential vulnerability in an object of the first software object type (e.g. code generator 2185 creating or adapting resource authorization 2177 in response to object 2284 of "D" type software 2204 apparently having valuable data or other potential vulnerability 2244). In some variants, code generator 2185 receives an indication 2187 of such a potential vulnerability—a contact list or other trade secret, a susceptibility to denial-of-service attacks, a critical function or the like—in association with reference 2186 to the object(s) or type(s). In some variants, all messages from a specific individual, all source code, or all files in a specific location are deemed critical, potential targets of attack. In response, code generator 2185 can (optionally) implementing a policy of isolating the object(s) or type(s), preferably in a selective manner according to the apparent nature of the potential vulnerability.

Operation 4089 describes receiving the resource authorization from an external source (e.g. port 2178 receiving resource authorization 2177 from external system 550). This can occur, for example, in embodiments in which primary system 510 implements or otherwise can access one or more of signaling circuitry 2110, access controller 2170, or media 2200. In some variants, resource authorization 2177 can further comprise a noncontingent authorization to access resource 2175, for example, or a contingent authorization to access resources comprising external system 550.

Operation 4091 describes transmitting a negative response as the decision whether to comply with the policy of causing the emulation environment to isolate the first software object type from the second software object type (e.g. port 2168 transmitting decision 2148 indicating a past or potential noncompliance with the isolation policy in some fashion). Decision 2148 can be included in one or more messages, event reports, or other digital signals, for example.

Operation 4094 describes evaluating whether the first software object type is apparently isolated from the second software object type (e.g. system monitor 2167 determining whether environment 2165 or system 2100 contain any instances of "B" type software 2202 able to access any instances of "A" type software 2201). In some variants, system monitor 2167 can distinguish among various incidents or modes of access: how recent; whether interference is apparently possible; whether an actual interaction was proper; whether accessibility is mutual; which component types, sequences, environments, or systems are/were involved; which object instances were involved; what process outcomes resulted; related resources and authorizations; or the like. Alternatively or additionally, network manager 2166 can optionally aggregate or otherwise respond to data of this type from other (external) systems in a virtual private network.

Operation 4096 describes causing the second software object type to include at least a third software object type and a fourth software object type (e.g. type definition logic 2130 defining "B" type software 2202 to include all objects of "C" type software 2203 or "D" type software 2204). This can be implemented using a "OR" function or other syntactic joining expression 2133, for example. As shown, of course, "B" type software 2202 can likewise be defined to include one or more objects of neither "C" type nor "D" type.

Figure 41:
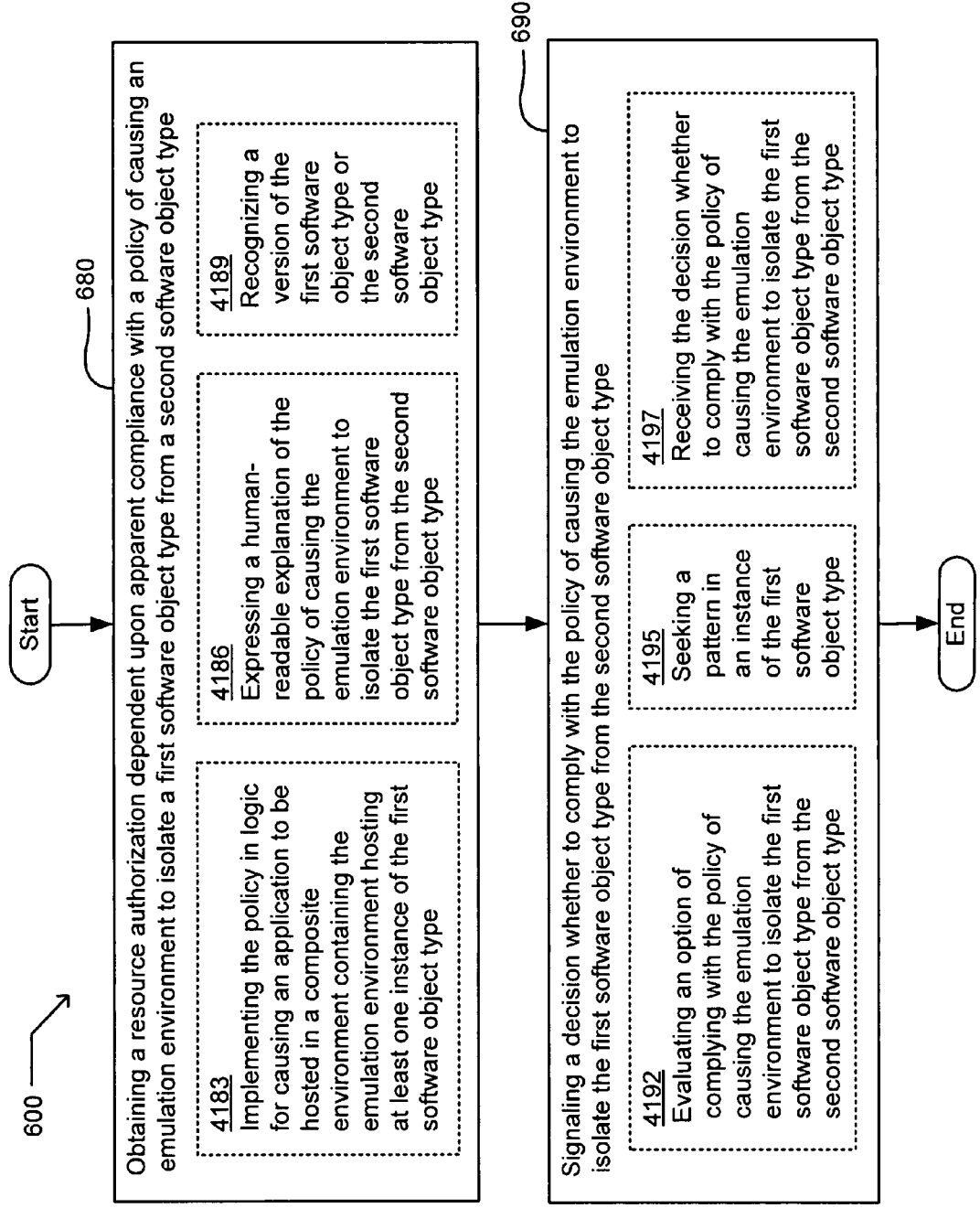

With reference now to FIG. 41, there are shown several variants of the flow 600 of FIG. 6 or 40. Operation 680—obtaining a resource authorization dependent upon apparent compliance with a policy of causing an emulation environment to isolate a first software object type from a second software object type—may include one or more of the following operations: 4183, 4186, or 4189. Operation 690—signaling a decision whether to comply with the policy of causing the emulation environment to isolate the first software object type from the second software object type—may include one or more of the following operations: 4192, 4195, or 4197.

Operation 4183 describes implementing the policy in logic for causing an application to be hosted in a composite environment containing the emulation environment hosting at least one instance of the first software object type (e.g. implementation logic 2190 implementing the isolation policy as policy definition 2191, causing application 2207 to be hosted in a composite environment). In a variant in which environment 2165 is a composite environment, for example, component environment 2162 can optionally host application object 2205 natively while component environment 2163 hosts application object 2206 by emulation.

Operation 4186 describes expressing a human-readable explanation of the policy of causing the emulation environment to isolate the first software object type from the second software object type (e.g. user interface 2195 displaying or playing explanation 2198 that resource authorization 2177 is contingent upon isolating "A" type software 2201). In some circumstances, user interface 2195 subsequently transmits a response 2199, either as received from a user or as a default, which resource authorization 2177 can then take as the apparent compliance or as a refusal to comply.

Operation 4189 describes recognizing a version of the first software object type or the second software object type (e.g. version recognition circuitry 2176 distinguishing among versions of "A" type software 2201 or "D" type software 2204 by version identifiers 2272, 2274). Alternatively or additionally, a version of "C" type software 2203 can be recognized in some variants by one or more of provider identifier 2263, date or other header information, behavior, configuration, or the like.

Operation 4192 describes evaluating an option of complying with the policy of causing the emulation environment to isolate the first software object type from the second software object type (e.g. cost evaluation logic 2147 estimating a monetary, temporal, or other potential resource dispensation, opportunity cost, or the like in association with complying with the policy). Such an evaluation can be obtained as an actual hourly or other flat fee for a peripheral or other resource access, a substitute cost or other comparable resource cost, a number of computations or minutes, an amount of space, a fractional loss in server or other hardware performance, a risk evaluation, or the like. Modeling logic 2157 for generating such valuations can provide one or more suitable determinants/components, which can then be compared or otherwise arithmetically or logically distilled by cost evaluation logic 2147. The distillation can help to explain one or more options to facilitate a user deciding, for example, or can be manifested as an automatic generation of a default response 2156 or of the decision 2148 of operation 690.

Operation 4195 describes seeking a pattern in an instance of the first software object type (e.g. pattern recognition circuitry 2128 seeking one or more instances of provider identifiers 2261, 2262, version identifiers 2272, 2274, or other search terms 2127 to identify or characterize a sequence of instructions as being of the "first" type). Such seeking can help locate the pattern(s), for example, in contexts in which one or more can occur in several locations within an application. This can provide a mode of identifying the "first" type, for example, as a complement to one or more of operations 4183, 4082, 4084, or 4085.

Operation 4197 describes receiving the decision whether to comply with the policy of causing the emulation environment to isolate the first software object type from the second software object type (e.g. port 2158 receiving a reply 2145 from a client or other external source manifesting an indication of non-compliance). In some embodiments, for example, such a reply may be received after query logic 2144 asks the client to indicate the decision in some fashion: by accepting code implementing a conditional resource authorization (in a device driver or driver update module, for example), by taking no action (in a "default=yes" or "default=no" context), by transmitting a device setting configuration indicating the policy compliance, or the like. This can occur, for example, in embodiments in which one or more of access controller 2170 or environment 2165 performs operation 680 and in which signaling circuitry 2110 performs operation 690.

Figure 42:
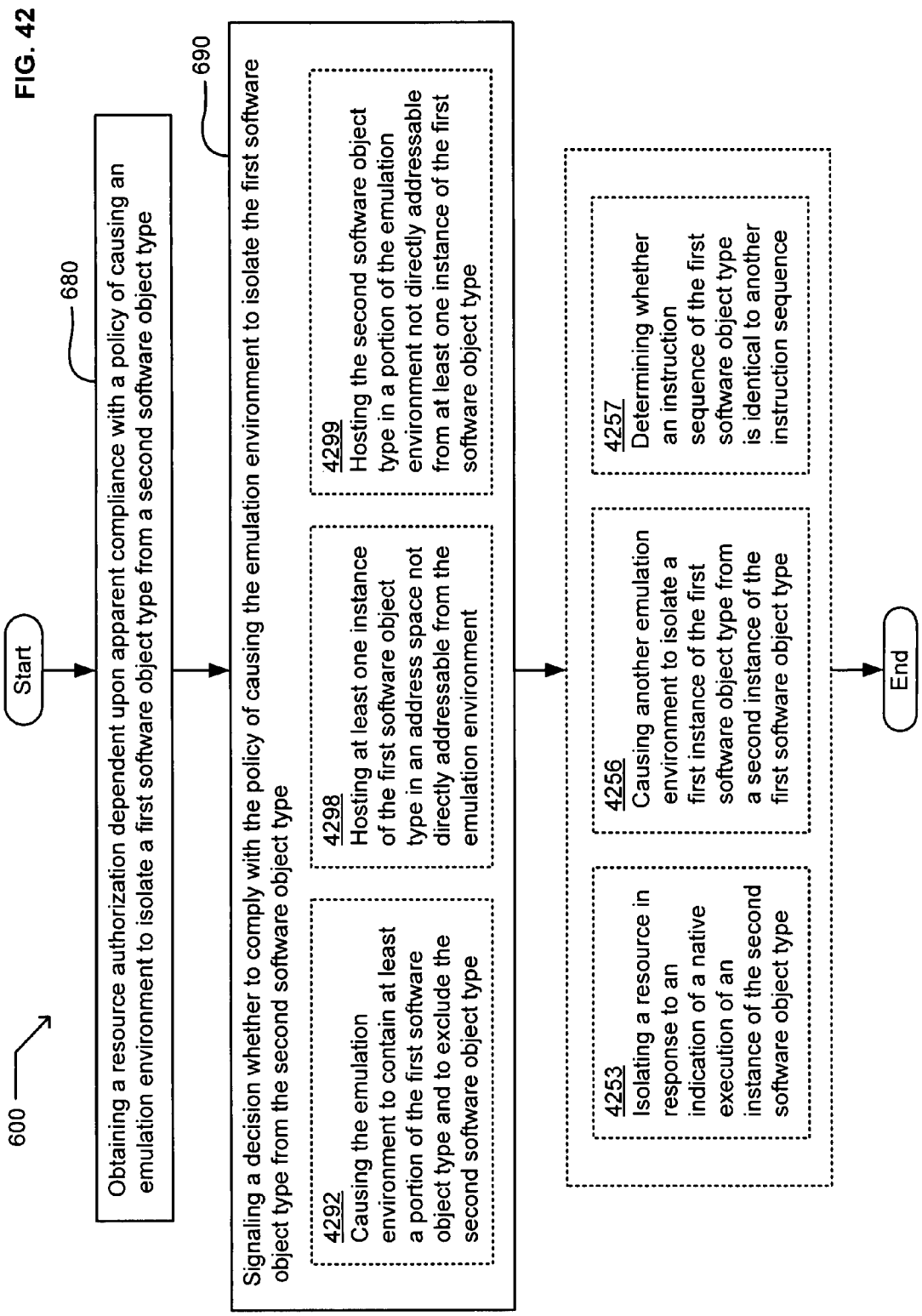

With reference now to FIG. 42, there are shown several variants of the flow 600 of FIG. 6, 40, or 41. Operation 690—signaling a decision whether to comply with the policy of causing the emulation environment to isolate the first software object type from the second software object type—may include one or more of the following operations: 4292, 4298, or 4299. Alternatively or additionally flow 600 may likewise include one or more of operations 4253, 4256, or 4257—each depicted after operation 690 but optionally performed concurrently with it, or in other orders.

Operation 4292 describes causing the emulation environment to contain at least a portion of the first software object type and to exclude the second software object type (e.g. emulator 2360 causing environment 2362 to contain at least object 2283 of "B" type and no "A" type software 2201).

Operation 4298 describes hosting at least one instance of the first software object type in an address space not directly addressable from the emulation environment (e.g. emulator 2370 hosting object 2281 of "A" type in address space 2374, which cannot be addressed by any object placed into any portion of emulation environment 2382). This can occur, for example, in embodiments in which compliance with the policy is signaled by emulator 2380 using environment 2382 to isolate "A" type software 2201 from some or all other software.

Operation 4299 describes hosting the second software object type in a portion of the emulation environment not directly addressable from at least one instance of the first software object type (e.g. emulator 2380 hosting one or more objects of "D" type software 2204 in address space 2387, which cannot be addressed by object 2376 hosted by emulator 2370). This can occur, for example, in a context in which object 2281 (of "A" type software 2201) contains or is contained within an instance of object 2376 in address space 2374. This can optionally work as detailed above with reference to operation 4298, for instance.

Operation 4253 describes isolating a resource in response to an indication of a native execution of an instance of the second software object type (e.g. resource authorization 2337 denying some or all of processing circuitry 2350 access to resource 2391 in response to any indication that environment 2362 permitted any instruction sequence of "B" type software 2202 to execute natively). Each such isolation can be permanent or temporary, complete or partial, and conditional or otherwise. For example, any instruction sequence of "C" type executing natively in address space 2364 (object 2365, e.g.) can optionally cause some environments of processing circuitry 2350 (all except environment 2362, e.g.) to be isolated from resource 2391 until resource authorization 2337 is reset. Alternatively or additionally, any instruction sequence of "D" type (e.g. object 2284) executing natively in address space 2367 can optionally force any objects in environment 2362 to use resource 2392 instead, permanently.

Operation 4256 describes causing another emulation environment to isolate a first instance of the first software object type from a second instance of the first software object type (e.g. routing controller 2320 implementing configuration 2321 so that emulation environment 2382 hosts an instance of object 2206 even while another instance of object 2206 or other "B" type software 2202 executes elsewhere in processing circuitry 2350). This can occur, for example, in variants in which environment 2382 is suitably isolated from one or more other virtual or physical environments of processing circuitry 2350.

Operation 4257 describes determining whether an instruction sequence of the first software object type is identical to another instruction sequence (e.g. sequence comparator 2396 comparing "A" type object 2282 with object 2366). In some embodiments, for example, such a determination may dictate that the "other" instruction sequence is "A" type (if identical) or is of an "unknown" type (if not identical).

Figure 43:
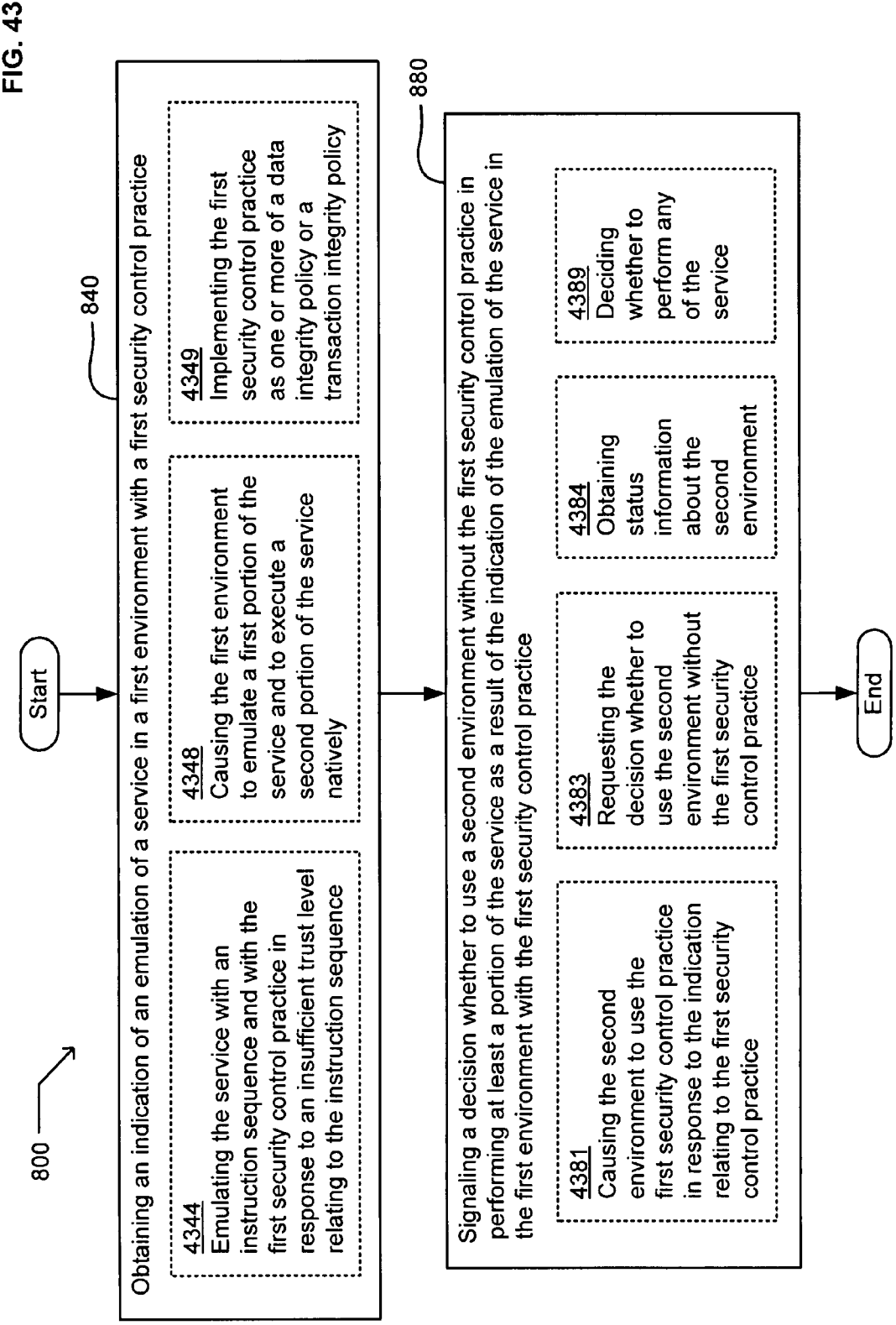
FIGS. 43-44 depict variants of the flow of FIG. 8.

With reference now to FIG. 43, there are shown several variants of the flow 800 of FIG. 8. Operation 840—obtaining an indication of an emulation of a service in a first environment with a first security control practice—may include one or more of the following operations: 4344, 4348, or 4349. Operation 880—signaling a decision whether to use a second environment without the first security control practice in performing at least a portion of the service as a result of the indication of the emulation of the service in the first environment with the first security control practice—may include one or more of the following operations: 4381, 4383, 4384, or 4389.

Operation 4344 describes emulating the service with an instruction sequence and with the first security control practice in response to an insufficient trust level relating to the instruction sequence (e.g. testing logic 2494 causing emulator 2450 to host instruction sequence 2443 in environment 2457 with policy logic 2452 in response to a risk evaluation above a maximum threshold). Testing logic 2494 can receive an indicator of the trust level (or its determinants) from outside system 2400, for example. Alternatively or additionally, testing logic 2494 can establish or refine a trust indicator in response to one or more earlier performances of instruction sequence 2443. In some variants, the trust indicator may be vector valued, comprising more than one of a logic error risk level, a malicious code trust level indicator, an authenticity confidence level, or the like.

Operation 4348 describes causing the first environment to emulate a first portion of the service and to execute a second portion of the service natively (e.g. configuration circuitry 2449 loading instruction sequence 2441 into an emulation portion of environment 2457, loading instruction sequence 2443 into a physical portion of environment 2457, and causing environment 2457 to execute software 2440 accordingly). Such a configuration may be advantageous for identifying defects in software 2440, for example, by permitting breakpoints or other extra tracking during the emulation of sequence 2441 without a loss of performance corresponding to a full emulation of software 2440.

Operation 4349 describes implementing the first security control practice as one or more of a data integrity policy or a transaction integrity policy (e.g. policy selection logic 2403 selecting a data integrity policy in policy logic 2452 for use in emulator 2450). Alternatively or additionally, policy selection logic 2403 can select a data integrity policy of practices 2406 for use in policy logic 2452. In some variants, the implementation can be performed by copying a reference to or code embodying software implementation of the practice, optionally with one or more other practices for use in emulator 2450.

Operation 4381 describes causing the second environment to use the first security control practice in response to the indication relating to the first security control practice (e.g. invocation logic 2415 triggering emulator 2480 to use at least a selected one of practices 2407 as policy logic 2482 for hosting environment 2487). In some embodiments, the selected practice can arise in response to one or more of an error or other anomaly, a configuration or static attribute of the first environment, an aspect of the first security control practice, or the like. Alternatively or additionally, the practice can be selected as a highest-ranked one of a list of practices (excluding "tried" practices such as the "first" security control practice).

Operation 4383 describes requesting the decision whether to use the second environment without the first security control practice (e.g. policy logic 2472 asking security module 2409 for instructions about whether any new practices 2408 should be applied in environment 2477). Alternatively or additionally, security module 2409 or policy logic 2472 can request an instruction sequence 2443 identifying or defining which practices should be applied.

Operation 4384 describes obtaining status information about the second environment (e.g. emulator 2460 monitoring one or more services and their results in environment 2467). The status information can include one or more of a loading level, a task list, a resource inventory, a registry state, a recent event record, or other information that is current when it is initially obtained. Alternatively or additionally, sensor 2492 can likewise obtain such information, in real time or at some later time, optionally providing it to an aggregator as described herein.

Operation 4389 describes deciding whether to perform any of the service (e.g. firewall 2448 deciding that system 2400 will not perform any of instruction sequence 2442, or will not perform it in emulator 2470, or will only perform it with policy logic 2462, at least initially, in response to information indicating that sequence 2442 apparently has no history, certification, or other credentials). For example, the information (or apparent lack thereof) can be received through firewall 2448 with sequence 2442. This can occur, for example, in embodiments in which aggregation module 2490 performs operation 840 and in which signaling logic 2418 and firewall 2448 jointly perform operation 880.

Figure 44:
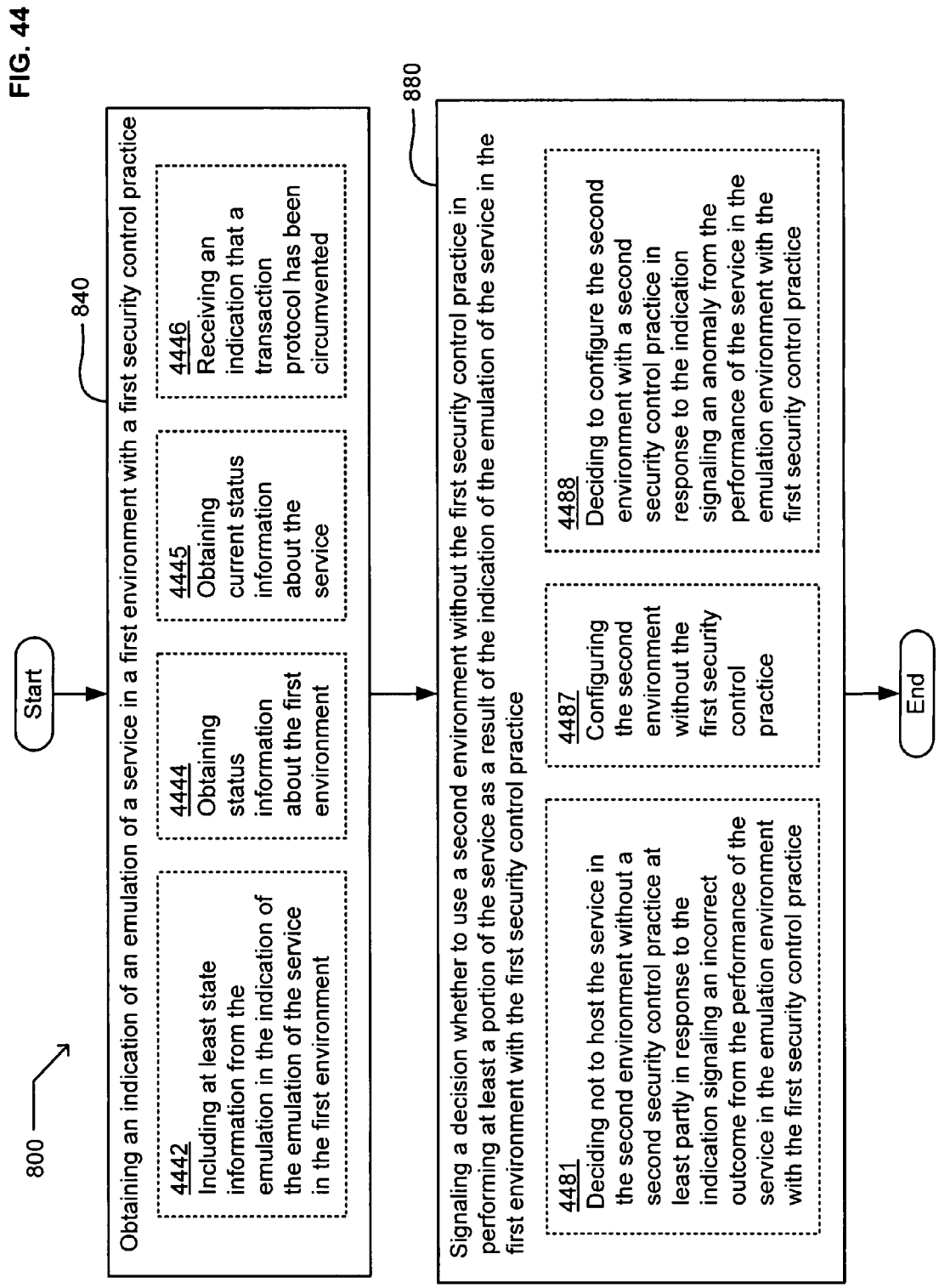

With reference now to FIG. 44, there are shown several variants of the flow 800 of FIG. 8 or 43. Operation 840—obtaining an indication of an emulation of a service in a first environment with a first security control practice—may include one or more of the following operations: 4442, 4444, 4445, or 4446. The service can, for example, comprise executing sequence 1725 or the like, optionally including one or more other sequences as described herein. Operation 880—signaling a decision whether to use a second environment without the first security control practice in performing at least a portion of the service as a result of the indication of the emulation of the service in the first environment with the first security control practice—may include one or more of the following operations: 4481, 4487, or 4488.

Operation 4442 describes including at least state information from the emulation in the indication of the emulation of the service in the first environment (e.g. emulation manager 2402 providing registry values 2496 or a call stack indicative of a state of a process hosted in environment 2477). Some or all of the process can be emulated, or can have been emulated, for example, in environment 2477. Such state information can be useful for characterizing an error (as repeatable or not, e.g.), for spawning variants of the emulation, for determining which software objects in an environment are associated with an anomalous event, for performing speculative executions, or the like.

Operation 4444 describes obtaining status information about the first environment (e.g. system manager 2401 receiving a loading indication, a service listing, a progress report, or the like from some or all of environment 2477). Alternatively or additionally, a network monitor can monitor or aggregate such information from one or more instances of system 300 in a common network.

Operation 4445 describes obtaining current status information about the service (e.g. server 2446 detecting that instruction sequence 2441 currently has a low trust level or has recently been correlated with a higher-than-nominal rate of anomalies in its physical environment, which uses the first security control practice). The practice can include one or more of a data redundancy scheme, an intrusion detection system, firewall 2448, or the like. In some variants, emulation manager 2402 can likewise perform operation 4445 (e.g. by obtaining the information from server 2446) and then complete operation 840 (e.g. by causing emulator 2470 to host sequence 2441 with an emulated practice like the first security control practice).

Operation 4446 describes receiving an indication that a transaction protocol has been circumvented (e.g. sensor 2491 detecting a transaction or other interaction record 2497 for which there is not a corresponding authorization or other support record 2498). Alternatively or additionally, sensor 2491 can be configured to detect any of several types of violations of protocols such as may be implemented in virtual private networks. See, e.g., U.S. Pat. Pub. No. 2006/0010492 ("Method and Apparatus for Monitoring Computer Network Security Enforcement") filed 10 Jun. 2002.

Operation 4481 describes deciding not to host the service in the second environment without a second security control practice at least partly in response to the indication signaling an incorrect outcome from the performance of the service in the emulation environment with the first security control practice (e.g. policy logic 2404 causing one or more new practices 2405 to be used in environment 2477 when emulating or otherwise executing sequence 2443 there, in response to a prior incorrect result from emulating sequence 2443 in environment 2487 without practices 2405). The new practices 2405 may optionally include confirming a correct output from sequence 2443 in a special case, or at least an absence of an error event, for example, before generating other output. (In some embodiments, an "outcome" of a process, input set, or other operational object can include a termination time, an error message, a functional result, or the like resulting from one or more instances of the object. A single outcome can likewise "result from" each of two or more such objects jointly causing the outcome as well.)

Operation 4487 describes configuring the second environment without the first security control practice (e.g. emulator 2480 configuring environment 2487 without one or more practices 2405 used in the first environment). Alternatively or additionally, signaling logic 2418 can likewise signal the decision before (or without) actually configuring the second environment.

Operation 4488 describes deciding to configure the second environment with a second security control practice in response to the indication signaling an anomaly from the performance of the service in the emulation environment with the first security control practice (e.g. emulator 2470 or some portion of security module 2409 deciding to use policy logic 2472 in configuring environment 2477 for sequence 2442, the decision being in response to an anomalous completion of sequence 2442 in environment 2467 with policy logic 2462). The anomalous completion may be marked by an abnormally slow or fast task completion, by a memory leakage event, by an error or incorrect result, or the like as described herein.

Figure 45:
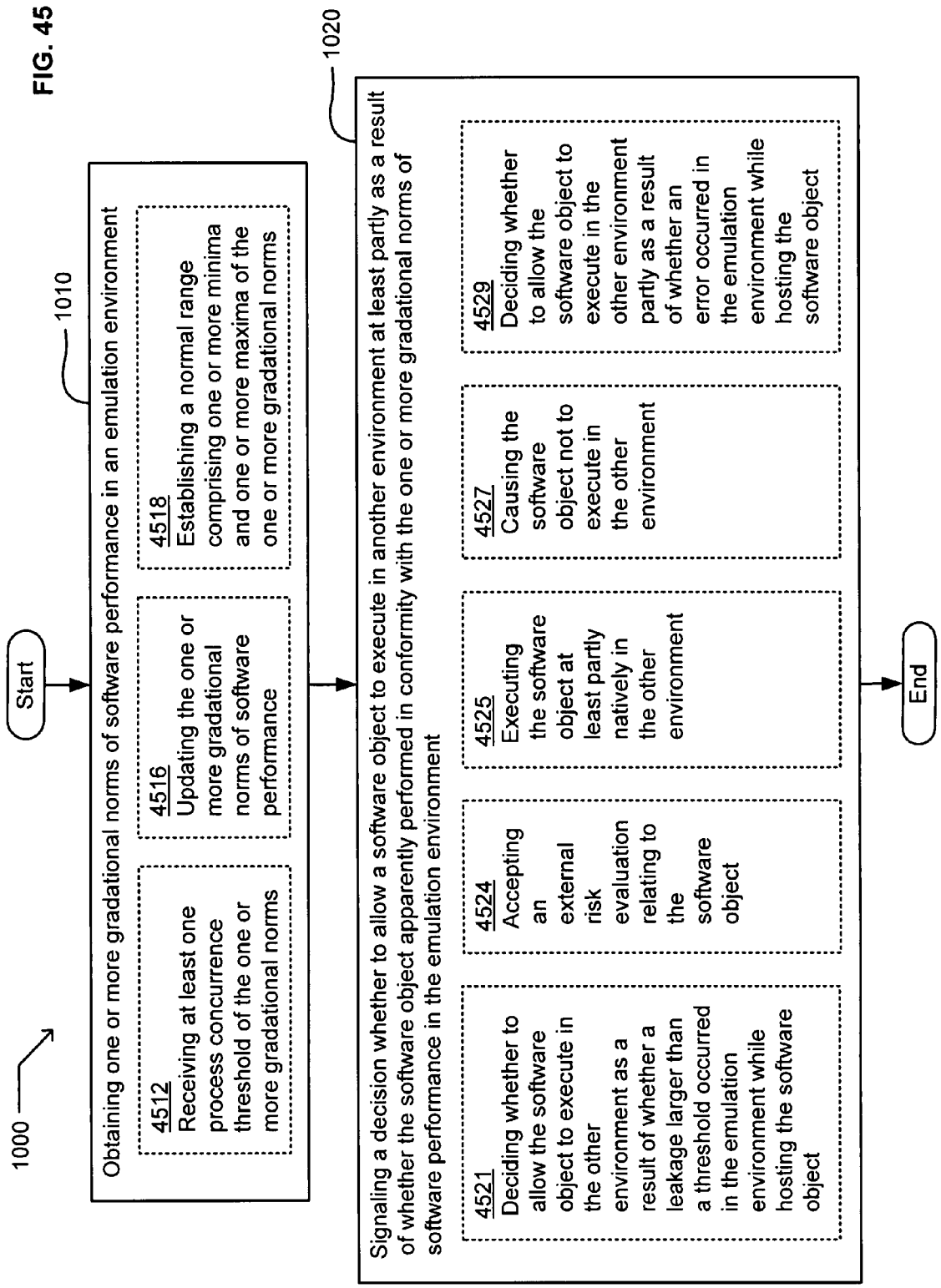
FIG. 45 depicts variants of the flow of FIG. 10.

With reference now to FIG. 45, there are shown several variants of the flow 1000 of FIG. 10. Operation 1010—obtaining one or more gradational norms of software performance in an emulation environment—may include one or more of the following operations: 4512, 4516, or 4518. Operation 1020—signaling a decision whether to allow a software object to execute in another environment at least partly as a result of whether the software object apparently performed in conformity with the one or more gradational norms of software performance in the emulation environment—may include one or more of the following operations: 4521, 4524, 4525, 4527, or 4529.

Operation 4512 describes receiving at least one process concurrence threshold of the one or more gradational norms (e.g. port 2834 receiving an artificial limit 2826 governing how many processes object 2805 may permissibly use without becoming a substantial burden). In some embodiments, for example, object 2805 will not be routed to environment 2877 (at operation 1020) if object 2805 ever employs more processes than limit 2826 in environment 2897.

Operation 4516 describes updating the one or more gradational norms of software performance (e.g. update logic 2832 providing incremental change(s) 2828 to one or more maxima 2824 to be applied by filter 2807, or a replacement module 2808 as an updated version of filter 2807). This can occur, for example, in embodiments in which filter 2807 initially contains or refers to the gradational norm(s) of software performance used in the emulation environment and in which aggregation module 2800 performs operation 1010 as described herein.

Operation 4518 describes establishing a normal range comprising one or more minima and one or more maxima of the one or more gradational norms (e.g. retrieval circuitry 2855 causing filter 2842 to implement a determination of whether a time or frequency of a detectable event falls between $X-R/2$ and $X+R/2$, where $X$ is a nominal or expected value and $R$ is a range defining an allowable deviation from $X$). For example, retrieval circuitry 2855 can provide specific values of $X$ and $R$ to filter 2842, optionally configured to determine whether the event or frequency of software performance falls within this range. In some variants, the gradational norms can include one or more additional minima 2823 relating to a resource consumed in the software performance.

Operation 4521 describes deciding whether to allow the software object to execute in the other environment as a result of whether a leakage larger than a threshold occurred in the emulation environment while hosting the software object (e.g. routing logic 2546 deciding whether to route object 2538 to environment 2581 at least partly based on whether resource monitor detected a memory leakage rate 2527 or other leakage indicator larger than threshold 2529 in the emulation environment). In some embodiments, for example, environment 2887 can implement the emulation environment. This can occur, for example, for example, in embodiments in which aggregation module 2800 (in one or more instances) performs operation 1010 and in which signaling module 2500 performs operation 1020.

Operation 4524 describes accepting an external risk evaluation relating to the software object (e.g. arbiter 2544 confirming that a trusted external system 9xx generated message 2523 or other information associating risk evaluation 2521 with identifier 2522 of software 2530 or software object 2534). Such an evaluation can, for example, arrive either a priori or after request logic 2545 transmits a request for such information to such an external system. Arbiter 2544 can, in some embodiments, indicate that the software object did not conform with the gradational norm(s) in response to a high risk evaluation. Alternatively or additionally, arbiter 2544 can be configured to respond to an external indication of moderate risk by cause the software to be tested by emulation within signaling module 2500.

Operation 4525 describes executing the software object at least partly natively in the other environment (e.g. processor 2572 executing one instruction sequence 2531 of object 2533 natively and another instruction sequence 2532 of object 2533 by emulation). This can occur, for example, in embodiments in which environment 2571 comprises the emulation environment and in which environment 2581 comprises the "other" (partially emulated) environment.

Operation 4527 describes causing the software object not to execute in the other environment (e.g. firewall 2549 preventing object 2537 from placement or execution in environment 2581). Alternatively or additionally, the prevention can be conditional or temporary, such as by causing the placement or execution of object 2537 not to occur anywhere in signaling module 2500 unless or until a suitably isolated environment is created. Such implementations can occur, for example, in embodiments in which signaling module 2500 performs operation 1020 or in which aggregation module 2800 performs operation 1010.

Operation 4529 describes deciding whether to allow the software object to execute in the other environment partly as a result of whether an error occurred in the emulation environment while hosting the software object (e.g. security logic 2548 deciding that environment 2581 will not host object 2538 if exception handler 2547 detects a fatal error 2525 from object 2538 or object 2535 in environment 2571). Alternatively or additionally, in some variants of security logic 2548, whether environment can host object 2538 can depend partly or entirely upon whether object 2539 exists in environment 2571 or environment 2581.

Figure 46:
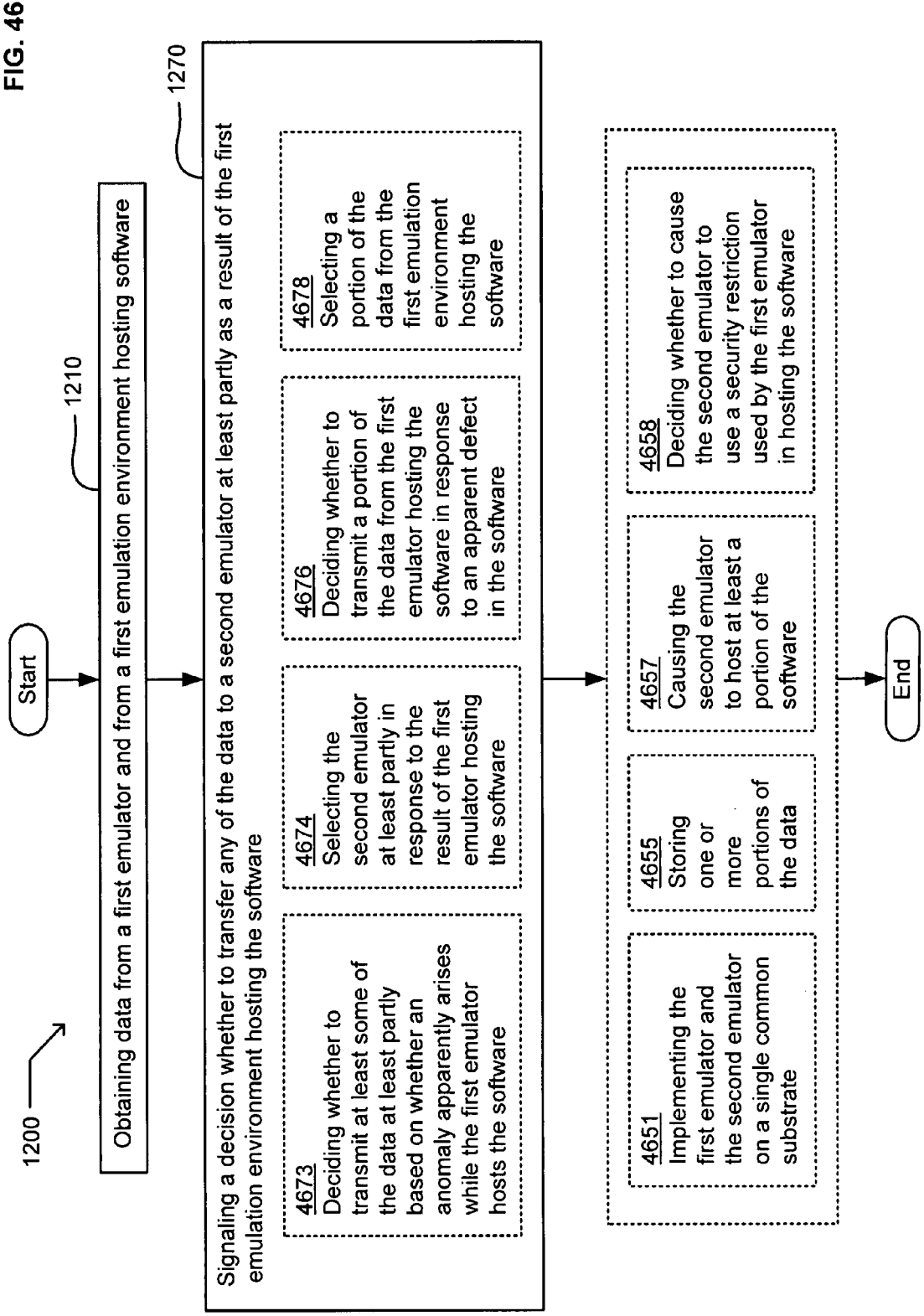

With reference now to FIG. 46, there are shown several variants of the flow 1200 of FIG. 12. Operation 1270—signaling a decision whether to transfer any of the data to a second emulator at least partly as a result of the first emulation environment hosting the software—may include one or more of the following operations: 4673, 4674, 4676, or 4678. Alternatively or additionally flow 1200 may likewise include one or more of operations 4651, 4655, 4657, or 4658—each depicted after operation 1270 but optionally performed concurrently with it, or in other orders.

Operation 4673 describes deciding whether to transmit at least some of the data at least partly based on whether an anomaly apparently arises while the first emulator hosts the software (e.g. security logic 2656 deciding whether to transfer address or state information from environment 2674 to environment 2684 based on the anomaly having arisen as environment 2674 hosts instruction sequence 2603 as process 2677). The decision may be based on prior knowledge that environment 2684 has one or more uncertified services or other risk-indicative objects that environment 2674 does not, for example, or some other indication that environment 2684 is not as safe as environment 2674 in some aspect. The decision may likewise depend on other factors: whether any other objects 2675 in environment 2674 include sensitive information, whether the anomaly is characteristic of malicious code, whether the destination environment is more suitable for hosting sequence 2603, or the like.

In some variants, the source or destination environments can be configured with a security restriction that relates to the anomaly. Watermark data may be provided in response to an indication of improper reading, for example, as described herein. Resource access may likewise be limited or denied in response to excessive loading. Conversely one or more such restrictions may be omitted in a destination environment in response to a sufficient interval of trustworthy behavior or an indication that other software apparently cause the anomaly.

Operation 4674 describes selecting the second emulator at least partly in response to the result of the first emulator hosting the software (e.g. router 2650 choosing among two or more emulators 2669, 2679 in response to result 2688 obtained from emulator 2689 hosting instruction sequence 2603). For example, router 2650 may generate selection 2652 identifying one or more target emulators in response to an event category or description arising in result 2688 (one emulator for malicious-code-indicative or memory-error-indicative results, another for an absence of such an indication, e.g.). In some variants, selection 2652 can specify emulator 2679, optionally with objects 2675 usable for error analysis, in response to router 2650 detecting error indication 2627 in result 2688. These configurations can occur, for example, in embodiments in which one or more instance of signaling module 2640 perform operation 1270.

Operation 4676 describes deciding whether to transmit a portion of the data from the first emulator hosting the software in response to an apparent defect in the software (e.g. filter 2654 transmitting some of result 2668 from emulator 2669 in response to defect-indicative event descriptors therein). Deterministic and non-progressive failures in emulator 2669 executing instruction sequence 2604, for example, can indicate one such type of apparent defect.

Operation 4678 describes selecting a portion of the data from the first emulation environment hosting the software (e.g. mode logic 2747 selecting portion 2708 of data 2709). In some embodiments, portion 2708 can include one or more data segments of raw data, for example, or one or more evaluations or other distillations of raw data. The portion can be a portion to be transferred or a portion used in deciding whether to transfer some of the data as described herein, for example. In another mode of performing operation 1270, of course, the decision signals whether to transfer the whole of the data 2709 and depends upon each portion of the obtained data.

Operation 4651 describes implementing the first emulator and the second emulator on a single common substrate (e.g. processor 2662 and processor 2672 respectively implementing emulator 2669 and emulator 2679 on a single chip). In some embodiments, system 2600 can be implemented on a single shared chip, for example.

Operation 4655 describes storing one or more portions of the data (e.g. storage module 2611 copying at least some of the data to non-volatile medium 2612). Alternatively or additionally, the decision or other information derived from the data can be stored in or on the medium. In some variants, such information can be used in or as an operational history. The history can be arranged and stored, for example, as a lookup table from which a retrieval function returns a historical performance indicator accessed according to an object type and an emulation configuration.

Operation 4657 describes causing the second emulator to host at least a portion of the software (e.g. allocation logic 2618 causing emulator 2669 to execute instruction sequence 2602). In some contexts, such executions can occur before, during, interleaved with, or depending upon the data transmission. Alternatively or additionally, the manner of execution can be affected by the content of data transmitted in some embodiments. In one instance, the data can affect a configuration of emulator 2669 such as by defining or refining one or more of the resources or checkpoints of emulation. Likewise, the data can optionally define events or other software objects 2665 speculatively relating to a result of instruction sequence 2601 executing in environment 2664. See, e.g., Michael E. Locasto et al. ("Speculative Execution as an Operating System Service") at http://mice.cs.columbia.edu/getTechreport.php?techreportID=407.

Operation 4658 describes deciding whether to cause the second emulator to use a security restriction used by the first emulator in hosting the software (e.g. invocation module 2615 instructing emulator 2689 to omit the security restriction in response to result 2678 indicating that software 2606 appeared to be trustworthy in environment 2674). This can occur, for example, in embodiments in which signaling module 2640 performs operation 1270, in which emulator 2679 implements the "first" emulator (operable with security restriction 2616), and in which emulator 2689 implements the "second" emulator (operable with or without security restriction 2616).

Figure 47:
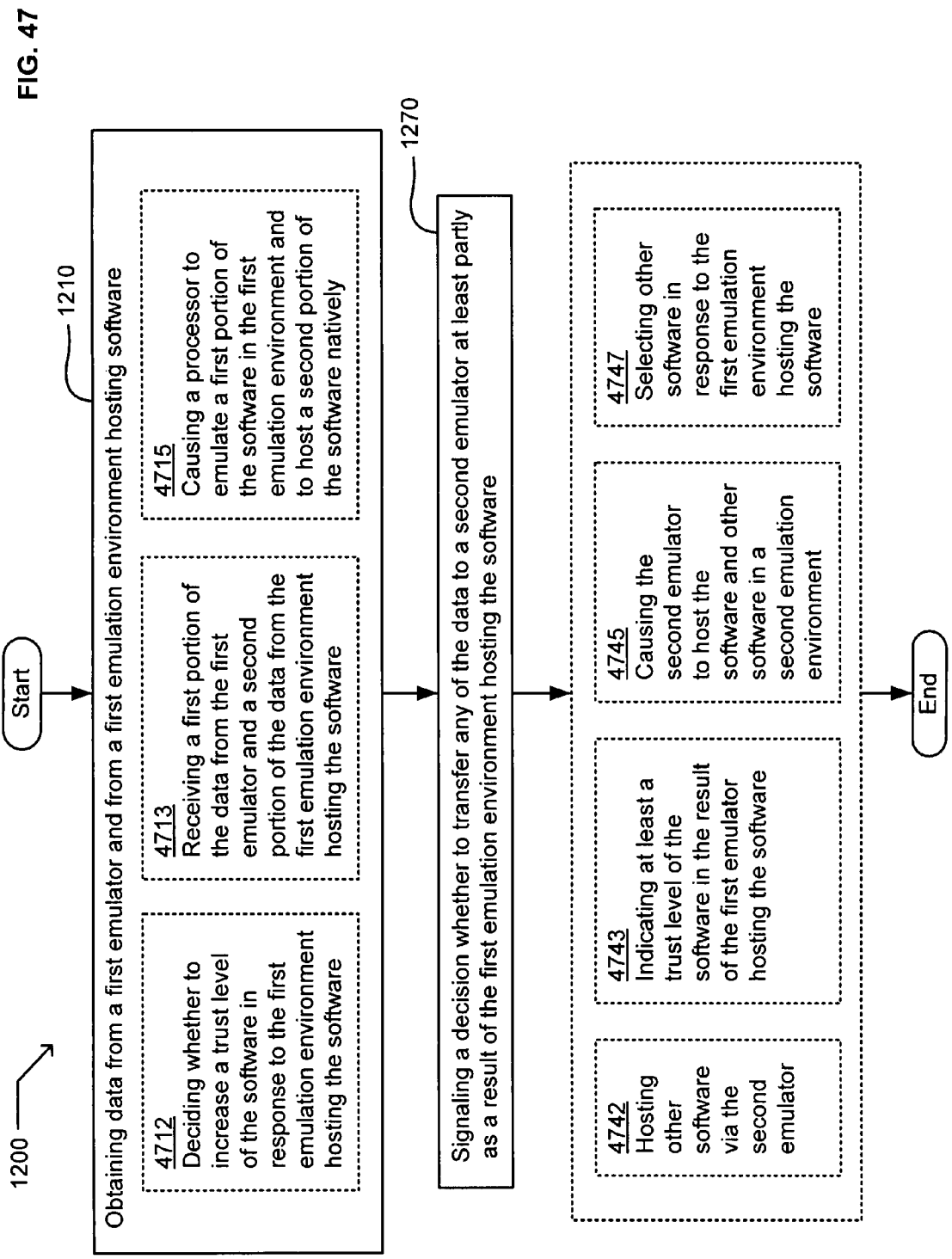

With reference now to FIG. 47, there are shown several variants of the flow 1200 of FIG. 12 or 46. Operation 1210—obtaining data from a first emulator and from a first emulation environment hosting software—may include one or more of the following operations: 4712, 4713, or 4715. Alternatively or additionally flow 1200 may likewise include one or more of operations 4742, 4743, 4745, or 4747—each depicted after operation 1270 but optionally performed concurrently with it, or in other orders.

Operation 4712 describes deciding whether to increase a trust level of the software in response to the first emulation environment hosting the software (e.g. evaluation module 2715 adjusting a default or other prior evaluation 2707 in data 2709 to indicate a higher trust level in association with sequence 2766). This can occur, for example, in response to one or more of sequence 2766, session 2767, user 2768, or other aspect of environment 2764 performing consistently with a respective behavior model, such as by manifesting an error rate below a nominal threshold, by completing tasks on time, by performing a required amount of work, or by meeting one or more other performance-indicative requirements 2716.

Operation 4713 describes receiving a first portion of the data from the first emulator and a second portion of the data from the first emulation environment hosting the software (e.g. port 2718 receiving segment C025 from emulator 2779 and segment C024 from sequence 2776 or otherwise from within environment 2774). This can occur, for example, in embodiments in which one or more portions of system 2700 perform operation 1210 and in which (one or more) signaling modules 2640, 2740 perform operation 1270. In some variants, the data can likewise include logical or arithmetic combinations or other hybrids of such portions: a Boolean indication of whether any of the portions indicated an error, a count of them, a textual summary, or the like.

Operation 4715 describes causing a processor to emulate a first portion of the software in the first emulation environment and to host a second portion of the software natively (e.g. task manager 2717 triggering processor 2792 to generate respective portions of data 2709 from software sequence 2792 in environment 2791 and from software sequence 2795 in environment 2794). This can occur, for example, in variants in which environment 2791 is emulated and in which environment 2794 is native, or vice versa. In some embodiments, a hosting mode for each of the sequences 2792, 2795 is selected at least partly based on an earlier iteration of operation 1210.

Operation 4742 describes hosting other software via the second emulator (e.g. processor 2782 causing emulator 2789 to host at least sequences 2786, 2787 in environment 2774). This can occur, for example, in embodiments in which emulators 2779, 2789 are the "first" and "second" emulators respectively, and in which sequence 2787 is not used in environment 2774. Operation 4742 can be diagnostically useful, for example, in a context in which either of sequences these sequences is suspected of affecting the other, in which either lacks a suitable certification, in which either is or resembles software of critical importance, or the like.

Operation 4743 describes indicating at least a trust level of the software in the result of the first emulator hosting the software (e.g. analyzer 2840 generating level 2819 of trust as an integer or other evaluation of the behavior of segment 2812 in environment 2674). See, e.g., U.S. Pat. Pub. No. 2005/0066195 ("Factor Analysis of Information Risk") filed 6 Aug. 2004. Alternatively or additionally, such an evaluation from analyzer 2840 can be used as a determinant in making the decision of operation 1270.

Operation 4745 describes causing the second emulator to host the software and other software in a second emulation environment (e.g. processor 2782 causing emulator 2789 to host sequence 2776 with sequence 2788). This can occur, for example, in embodiments in which operation 1210 includes environment 2774 hosting sequence 2776 but not sequence 2788, in which one or more portions of system 2700 perform operation 1210, and in which signaling modules 2640, 2740 perform operation 1270.

Operation 4747 describes selecting other software in response to the first emulation environment hosting the software (e.g. selection logic 2714 selecting sequence 2777 in response to environment 2794 hosting sequence 2795). The selection of sequence 2777 over sequence 2778 or other software for use in environment 2774 can be based on the actual or intended presence of sequence 2777 in another environment. The other environment may be a physical environment in which the software (of operation 1210, e.g.) may need to coexist with sequence 2777, for example, or may be an environment in which an anomaly as described herein has been detected in the presence of sequence 2777.

With reference now to FIG. 48, there are shown several variants of the flow 1200 of FIG. 12, 46, or 47. Operation 1210—obtaining data from a first emulator and from a first emulation environment hosting software—may include one or more of the following operations: 4811, 4815, 4816, or 4819. Operation 1270—signaling a decision whether to transfer any of the data to a second emulator at least partly as a result of the first emulation environment hosting the software—may include one or more of the following operations: 4872, 4873, 4874, 4878, or 4879.

Operation 4811 describes receiving one or more invocation parameters in the data (e.g. input 2850 receiving message 2852 indicating a function or procedure call with at least one numeric or other parameter 2802 as provided to invoke software 2809). In some embodiments, such parameters can likewise be received after such a call is performed, optionally as elements of state information as described herein.

Operation 4815 describes obtaining at least one successful result from the software in the data (e.g. sensor 2844 detecting a normal completion of a program call, a normal computation result, or other condition 2818 not indicative of an execution fault or process suspension). This can occur, for example, in embodiments in which (at least) aggregation module 2800 performs operation 1210.

Operation 4816 describes receiving a malicious code indication in the data (e.g. sensor 2845 detecting a pattern 2815 in data 2816 indicative of a known virus or worm). Other conditions can sometimes constitute a malicious code indication 2817, such as an aggressive behavior (making unauthorized contacts, prolific loading, self-modifying code, or the like) or a worsening and nondeterministic pattern of performance. In some embodiments, at least one sensor 2846 is configured to detect such behavioral indications.

Operation 4819 describes receiving a suboptimal completion indication in the data (e.g. analyzer 2840 detecting a data or timing pattern indicative of a sequence 2801 performing worse than a benchmark 2843 of performance for the sequence 2801 under like conditions). Analyzer 2840 can, for example, be configured to detect a completion time relative to a best completion time, a correct or normal completion percentage, or to some other suitable benchmark known in the art or suggested herein.

Operation 4872 describes transferring at least partial control of a medium containing at least some of the data to the second emulator (e.g. media manager 2644 mapping storage or memory region 2623 containing data segment 2622 into environment 2684 as a mode of transferring parameter value 2621 of segment 2622 from environment 2664). Optionally, environment 2664 can maintain full or partial access to region to facilitate other data transfer even after operation 4872.

Operation 4873 describes causing the second emulator to generate a second emulation environment using the data from the first emulator and from the first emulation environment hosting the software (e.g. control module 2642 triggering emulator 2689 to create environment 2684 as a variant of environment 2674 according to parameters received from emulator 2679). This can occur, for example, in embodiments in which signaling module 2640 includes an instance of control module 2642 and is operable to perform at least operation 1270. Such parameters or other data 2620 can optionally include one or more of emulation parameters of environment 2674, invocation modes or other inputs to the software, outcome information, or the like, as described herein. In some variants, a common portion of software 2606 is permitted to execute contemporaneously (overlapping or interleaving in time, e.g.) in two or more such environments 2674, 2684.

Operation 4874 describes transferring to the second emulator a portion of the data comprising at least state information relating to the software (e.g. stack manager 2643 and processor 2682 cooperatively transferring a call sequence or other state information from emulator 2689 from stack 2628 to another emulator). This can occur, for example, in embodiments in which aggregation logic 2619 and machine 2680 jointly perform operation 1210, and in which at least signaling module 2640 performs operation 1270.

Operation 4878 describes requesting to transfer information to the second emulator (e.g. request logic 2658 sending request 2659 to one or more of emulator 2669, emulator 2679, or server 2655). Such a request can be sent, in some embodiments, in preparation for signaling the decision. Alternatively or additionally, the request itself may affect or signal the decision to proceed with the transfer. In some variants, for example, the decision will depend upon request logic 2658 receiving suitable transfer authorization in a reply from server 2655 or emulator 2679. See, e.g., U.S. Pat. Pub. No. 2006/0259947 ("Method for enforcing a Java security policy in a multi virtual machine system") filed 11 May 2005.

Operation 4879 describes transferring information about a transfer-triggering event to the second emulator (e.g. event monitor 2648 sending emulator 2647 an event category or other indication 2646 of what event(s) triggered the decision to transfer the data). The transfer-triggering event can include an operational result, a data pattern match, a timeout, a fault or other interrupt, or the like, as described herein.

With reference now to FIG. 49, there are shown several variants of the flow 1400 of FIG. 14. Operation 1460—obtaining a decision whether to host an instruction sequence in an emulation environment at least in response to an evaluation of software containing the instruction sequence—may include one or more of the following operations: 4961, 4963, 4964, 4966, or 4967. Operation 1480—causing another environment to host the instruction sequence in response to the decision whether to host the instruction sequence in the emulation environment—may include one or more of the following operations: 4982, 4984, 4985, or 4989.

Operation 4961 describes compiling at least the instruction sequence (e.g. compiler 3092 generating error data 3093 while compiling instruction sequence 3003 from source code or into machine code). See, e.g., U.S. Pat. Pub. No. 2004/0103406 ("Method and Apparatus for Autonomic Compiling of a Program") filed 21 Nov. 2002; and U.S. Pat. Pub. No. 2002/0129335 ("Robust Logging System for Embedded Systems for Software Compilers") filed 18 Dec. 2000. Alternatively or additionally, execution-time data (e.g. errors, resource usages, program results, state data, or the like) can be reflected or used in decisions of where or how the instruction sequence will be hosted.

Operation 4963 describes receiving a message about the software containing the instruction sequence (e.g. port 3021 receiving warnings, recommendations, evaluations, or other input 3024 as described herein about software 3007). Such input can be received via interface 3020 in the embodiment of FIG. 30, as a computer-readable reputation-indicative record, a human-readable warning, sample output from the software, or the like. In some embodiments, a certificate or other trust level indicator relating to the source (device or other party) can likewise be received via interface 3020.

Operation 4964 describes evaluating the software containing the instruction sequence (e.g. rule checker 3096 counting errors in one or more categories arising while executing or otherwise analyzing the software). Alternatively or additionally, the evaluation can provide or automatically result from evaluation data or subjective input from others. See, e.g., U.S. Pat. Pub. No. 2003/0046665 ("Reusable Software Component for Textually Supplementing, Modifying, Evaluating and Processing Procedural Logic for a Compiled Host Program at Run-Time") filed 28 Feb. 2001; U.S. Pat. Pub. No. 2003/0056151 ("Software Evaluation System, Software Evaluation Apparatus, Software Evaluation Method, Recording Medium, and Computer Data Signal") filed 18 Sep. 2002; and U.S. Pat. Pub. No. 2006/0253824 ("Software Evaluation Method and Software Evaluation System") filed 5 Apr. 2006. Those skilled in the art will recognize a variety of techniques for combining such evaluation data, such as by logical or arithmetic combination, in light of these teachings.

Operation 4966 describes responding to a risk indicator relating at least to the software containing the instruction sequence (e.g. policy implementation circuitry 3098 using a default sandbox configuration for instruction sequence 3004 that is not used for other instruction sequences that are suitable for use with critical data). Alternatively or additionally, the implementation circuitry can include a component for migrating or reconfiguring instruction sequence 3004 automatically from one configuration to another at or after an appropriate interval: a minute, an hour, a day, a month, or a year, for example.

Operation 4967 describes hosting the software containing the instruction sequence in the emulation environment (e.g. processor 3072 controllably executing sequence 3003 and sequence 3076 in environment 3074). The manner of execution can be a part of the decision, in some embodiments, such as those in which sequence 3003 obtains access to a resource that sequence 3076 does not, in response to the evaluation. (As described herein, such conditionally-accessible resources can include storage media or other peripheral devices accessible through a network linkage, for example.)

Operation 4982 describes deciding to host the instruction sequence in the other environment without first completing the instruction sequence in the emulation environment (e.g. task manager 2958 spawning a process containing at least an instance of instruction sequence 2904 in each of environment 2994 and environment 2974 so that the two overlap in time).

Alternatively or additionally, process 2997 can begin execution of sequence 2904 after one or more successful iterations of sequence 2904 in process 2977. This can occur, for example, in variants in which machine 2990 is configured so that environment 2994 is partly or fully emulated by emulator 2999, as well as variant in which processor 2992 performs sequence 2904 without emulator 2999 (natively). This can occur, for example, in embodiments in which evaluation module 2950 can perform operation 1460 and in which at least the above-mentioned other portions of system 2900 perform operation 1480.

Operation 4984 describes causing the other environment to host the instruction sequence while the emulation environment hosts the instruction sequence (e.g. invocation logic 2951 causing processor 2992 to execute instruction sequence 2996 while processor 2972 executes instruction sequence 2976). This can occur, for example, in stand-alone embodiments of system 2900 as well as those in which primary system 1310 and external system 1340 each include a respective instance of system 2900 in mutual cooperation.

Operation 4985 describes deciding to host the software containing the instruction sequence in the other environment (e.g. host control circuitry 2956 deciding that primary system 1310 will host at least sequence 1301 in environment 1384 in lieu of or in concert with environment 1374 hosting an instance of sequence 1301). This can occur, for example, in embodiments in which at least one instance of evaluation module 1350 is configured to perform operation 1460 and in which an instance of system 2900 configured to perform operation 1480 is embodied in primary system 1310. In many variants described herein, such decisions can be temporary or otherwise provisional: depending on one or more of an apparent safety, timing, content, reputation, behavior, circumstances, analysis, or outcome of instruction sequence 1301 or its execution. In variants in which the software evaluation is also obtained, for example, it can be used to decide how the other environment hosts the instruction sequence (e.g. by executing software in a batch mode in response to an evaluation is "slow" or otherwise runs longer than a threshold duration). The software evaluation can also affect other decisions, such as which environment is used to host the instruction sequence (e.g. by routing one or more sequences having a risk-indicative evaluation to the "other" environment and one or more sequences having a non-risk-indicative evaluation to a third environment).

Operation 4989 describes selecting the other environment at least partly based on the software containing the instruction sequence (e.g. service router 2952 selecting environment 2994 over other environments for use with instruction sequence 2901 in response to one or more environmental attributes identified for use with software 2906). The attributes can include memory or other resource availability, diagnostic utility, load level or content, or the like. In some embodiments, two or more environments are selected from a field of several candidate environments for hosting sequence of a given class (e.g. at-risk software, software with no local history, or the like as described herein).

With reference now to FIG. 50, there are shown several variants of the flow 1400 of FIG. 14 or 49. Operation 1460—obtaining a decision whether to host an instruction sequence in an emulation environment at least in response to an evaluation of software containing the instruction sequence—may include one or more of the following operations: 5062, 5063, 5066, 5067, or 5069. The instruction sequence can, for example, comprise sequence 1725 or the like, optionally including one or more other sequences as described herein. Operation 1480—causing another environment to host the instruction sequence in response to the decision whether to host the instruction sequence in the emulation environment—may include one or more of the following operations: 5081, 5083, 5087, or 5088.

Operation 5062 describes deciding to host the instruction sequence in the emulation environment at least partly in response to the software apparently causing an error (e.g. security logic 3097 quarantining instruction sequence 3001 in environment 3074 in response to detecting an illegal operation or other fault event therein). In various embodiments, the hosted instruction sequence can include one or more of such illegal operations, entire software modules, newly-received sequences, all write instructions, periodically sampled portions of software 3001, or the like.

Operation 5063 describes determining whether a fault from the software containing the instruction sequence apparently repeats (e.g. testing logic 3095 evaluating instruction sequence 3003 by re-executing sequence 3003 in a state as it was before generating error data 3094, and comparing the re-execution result set with error data 3094 or other reference data). Alternatively or additionally, comparative parameters can be obtained with execution parameters incrementally or otherwise systematically varied. See, e.g., Feng Qin et al. ("Rx: Treating Bugs as Allergies—A Safe Method to Survive Software Failures") in Proceedings of the Symposium on Systems and Operating Systems Principles (2005). Evaluations that include "repeatable," "memory fault," or other fault categories or attributes can be used in deciding whether or how to select, characterize, analyze or quarantine instruction sequences in light of these teachings.

Operation 5066 describes executing the instruction sequence with watermark data in the emulation environment (e.g. emulator 3078 executing instruction sequence 3001 in environment 3074 that simultaneously contains watermark data 3029). The use of such data can facilitate detection of malicious code that copies or alters watermark data 3029 within environment 3074. In some embodiments, watermark data 3029 can be formatted to resemble a table, list, or executable code. Alternatively or additionally, one or more copies of distinctive naturally-occurring data (in one or more software objects 3006, e.g.) are effectively preserved for later use so that the naturally-occurring data effectively becomes watermark data.

Operation 5067 describes executing a portion of the software natively in a physical environment (e.g. core 3089 natively executing one or more instances of instruction sequence 3002 of software 3007). By hosting only a portion natively, the use or evaluation of software 3007 can optionally be streamlined relative to fully emulated configurations. Alternatively or additionally, in some contexts, some species of malicious behaviors or other defects may be manifested and detected in partly-native configurations that can otherwise remain undetectable.

Operation 5069 describes implementing a virtual processor in the emulation environment (e.g. emulator 3079 supporting one or more virtual instances of processor 2962 in environment 3074, each performing respective processes 3077). In some embodiments, the decision can cause two or more virtual processors each executing a respective instance of instruction sequence 3076, optionally in respective environments.

Operation 5081 describes deciding not to host the instruction sequence in the other environment at least partly in response to the software containing the instruction sequence causing an error (e.g. intrusion protection logic 2957 preventing or terminating a reception or execution of sequence 2901 in environment 1384 in response to detecting an illegal read or write operation or other error while sequence 2901 executes in environment 1374). In some embodiments, the decision "not to host" can be reversed in response to determining that other code (other than sequence 2901, e.g.) apparently caused the error(s) or otherwise determining that software 2906 to which the decision pertains is apparently not at fault.

Operation 5083 describes executing the instruction sequence natively in the other environment (e.g. machine 2980 natively executing instruction sequence 2902 in lieu of processor 2972 executing instruction sequence 2903 in a virtual machine). In some other embodiments, machine 2980 can be configured to host instruction sequence 2901 natively whenever instruction sequence 2901 is deemed suitable for execution machine 2970, and machine 2970 can analyze instruction sequence 2901 and perhaps detect bugs or malicious code in a manner that is invisible to the user.

Operation 5087 describes implementing checkpointing in the other environment (e.g. emulator 2989 permitting or defining one or more checkpoints 2909 within or between executions of instruction sequence 2986 in environment 2984). The checkpointing may be derived from user inputs, instances of a module or instruction class, shortly before or after an error location in a prior execution of the sequence, at random intervals, or the like.

Operation 5088 describes performing one or more iterative operations before causing the other environment to host the instruction sequence (e.g. detection logic 2954 deciding whether to perform an iteration of instruction sequence 2976 in environment 2974 based on an outcome of a loop's conditional statement). The conditional statement can depend on one or more of an iteration count or other timing logic 2907, error pattern 2908 or lack thereof, user input validating the software's behavior in the emulation environment, or the like.

With reference now to FIG. 51, there are shown several variants of the flow 1600 of FIG. 16. Operation 1640—obtaining a decision whether to host an instruction sequence natively in a physical environment in response to an operational history of software apparently containing the instruction sequence—may include one or more of the following operations: 5144, 5145, 5147, or 5148. Operation 1650—signaling a decision whether to cause an emulation environment to host the instruction sequence in response to the decision whether to host the instruction sequence natively in the physical environment—may include one or more of the following operations: 5152, 5154, 5156, or 5158.

Operation 5144 describes aggregating the operational history of the software according to one or more software object identifiers of the software (e.g. aggregator 3191 receiving and storing software object identifiers, version numbers, functional descriptions, code sources or the like in association with operational data such execution outcomes, platform information, information source identifiers, execution times, resource availabilities, or the like as event data 3192). In some embodiments, a resulting operational history 3155 can likewise include one or more risk evaluations, certifications, or other message(s) 3128 in association with various software 3107 or environment(s) as described herein.

Operation 5145 describes deciding whether to host the instruction sequence natively in the physical environment by applying one or more risk evaluation criteria to the operational history of the software apparently containing the instruction sequence (e.g. risk evaluation logic 3199 allowing processor 3182 to host sequence 3102 natively only after determining that prior usage of sequence 3102 or other software 3107 has apparently not generated excessive or severe errors locally). Alternatively or additionally, some or all of software 3107 can be evaluated directly, optionally in an emulation environment as described herein.

Operation 5147 describes obtaining the instruction sequence (e.g. port 3122 receiving source code 3104 or machine code 3105 operable for execution or other evaluation for facilitating the decision). Alternatively or additionally, decision module 1530 can use input 3124 received via interface 3120 or the like in deciding whether to host the instruction sequence natively. This can occur, for example, in embodiments in which decision module 3130 performs operation 1640 and in which signaling module 3150 performs operation 1650. In other instances, the decision is received externally—as decision 1525 via interface 1520, e.g. This can occur, for example, in embodiments in which interface 1520 performs operation 1640 and in which processor 1572 performs operation 1650.

Operation 5148 describes receiving a signal containing the decision whether to host the instruction sequence natively in the physical environment in response to the operational history of the software apparently containing the instruction sequence (e.g. network linkage 3121 receiving machine code 3105 implementing or otherwise conveying decision 3135 from an external source). Decision 3135 can likewise be received, in some embodiments, as a user input, for example via a local or remote interface 3120 as described herein.

Operation 5152 describes implementing at least a virtual memory in the emulation environment (e.g. memory manager 3154 creating at least one contiguous virtual memory 3176 in environment 3174 from two or more real memory or storage spaces). Alternatively or additionally, the emulation environment 3174 can include virtual processor 3177.

Operation 5154 describes deciding to cause the emulation environment to host the instruction sequence without first hosting the instruction sequence natively in the physical environment (e.g. intake circuitry 3151 routing at least instruction sequence 3101 to environment 3174 in response to an indication that instruction sequence 3101 is new). Alternatively or additionally, an emulation of instruction sequence 3101 can occur (in environment 3164, e.g.) before or during a native execution (in environment 3184, e.g.) as a security precaution, optionally in response receiving one or more risk indicators as described herein. (In some embodiments, an "indication of" an event or circumstance can include one or more of a categorization, identification, evaluation, notification, prediction, outcome, distillation, or the like relating to any potential or actual instance(s) of the event or circumstance.)

Operation 5156 describes providing data to the operational history at least partly based on the emulation environment hosting the software apparently containing the instruction sequence (e.g. emulator 3179 routing output 3178 from emulation environment 3174 so that operational history 3155 can record at least the hosting decision). In some embodiments, output 3178 can likewise signal circumstances or results of the hosting as described herein.

Operation 5158 describes displaying an indication of the decision whether to cause the emulation environment to host the instruction sequence (e.g. user interface 3120 notifying a user that some or all of software is being screened or otherwise analyzed). In a network context, for example, such analysis can also include distributing an inquiry about risk indicators such as whether software has been hosted in systems that have since experienced errors.

With reference now to FIG. 52, there are shown several variants of the flow 400 of FIG. 4. Operation 430—indicating a virtually-instantiable service via a data flow between a user interface and an operating system, the virtually-instantiable service including at least a first instance—may include one or more of the following operations: 5232, 5234, 5236, or 5238. In some embodiments, variants of operation 430 may be performed by one or more instances of cores 3215 (of FIG. 32), feedback modules 3270, logic 3391-3393 (of FIG. 33), logic 3425-3428 or interface 3470 (of FIG. 34), or other components as specified herein. Such components may be implemented in primary system 330 or external system 360 (of FIG. 3), for example, or in other overlapping configurations as described herein. For example, such components may be implemented within one or more sensors 3720 (of FIG. 37), logic 3773, or other components of subsystem 3561 (of FIG. 35) as described herein.

Operation 440—accessing a second instance of the virtually-instantiable service at least partly in response to the user interface after indicating the virtually-instantiable service via the data flow between the user interface and the operating system—may include one or more of the following operations: 5243, 5245, 5247, or 5249. In some embodiments, variants of operation 440 may be performed by one or more instances of access module 3290 (of FIG. 32), logic 3393-3396 (of FIG. 33), logic 3404 or response module 3460 (of FIG. 34), components of subsystem 3562 (of FIG. 35), or other components as specified herein. Such components may be implemented in primary system 330 or external system 360 (of FIG. 3), for example, or in other overlapping configurations as described herein. For example, such components may be implemented within one or more routers 3735, 3755 (of FIG. 37), processors 3791-3792, or other components of subsystem 3562 (of FIG. 35) as described herein.

Operation 5232 describes indicating a progress level relating to the virtually-instantiable service to the user interface (e.g. evaluation circuitry 3271 indicating a quantity or other expression 3274 of an amount of a task done or yet to do). This can occur, for example, in embodiments in which feedback module 3270 performs operation 430 and in which access module 3290 performs operation 440.

Operation 5234 describes transmitting a command relating to the virtually-instantiable service to the operating system (e.g. user interface 3280 indicating a delete, undelete, pause, resume, fetch, terminate, create, undo, reconfigure, or other command relating to an instance 3242 or other aspect of service 3240 to operating system 3220). This can occur, for example, in embodiments in which feedback module 3270 and user interface 3280 jointly perform operation 430.

Operation 5236 describes executing a native portion of a module that includes the virtually-instantiable service (e.g. one or more cores 3215 natively executing at least instruction sequence 3255 while emulator 3211 executes at least instance 3243 of sequence 3241). This can occur, for example, in embodiments in which service 3240 comprises a code module comprising two or more instruction sequences 3241, 3255. Alternatively or additionally, the native portion can be executed before, after, or interleaved with an emulation of the service.

Operation 5238 describes the data flow between the user interface and the operating system at least partly in response to the first instance (e.g. socket 3221 transmitting output 3244 or some other indication of service 3240 to user interface 3280 responsive to detecting or being notified that instance 3257 has been created or has generated output 3244).

Operation 5243 describes terminating the second instance of the virtually-instantiable service in response to the user interface after indicating the virtually-instantiable service via the data flow between the user interface and the operating system (e.g. driver 3222 deleting or otherwise stopping instance 3258 of service 3240 in response to input 3285 after feedback module 3270 performs operation 430).

Operation 5245 describes obtaining an undo command relating to the virtually-instantiable service (e.g. port 3294 receiving undo command as input 3285 from user interface 3280 or in error response sequence 3293, either of which can relate to an instance or other aspect of service 3240). Input 3285 can indicate a command to undo a "start task" or "delete object" command, for example. Alternatively or additionally, error response sequence 3293 can contain or refer to such an undo operation in response to an error message. In some variants, an "undone" task can be queued to be performed later, for example, under safer circumstances.

Operation 5247 describes receiving an authorization relating to the second instance of the virtually-instantiable service (e.g. port 3296 receiving input 3284 comprising some form of authorization 3297 via interface 3280 or instance 3258 of service 3240). In some variants, such authorization can be a requirement for accessing the "other" instance (as instance 3256, for example) or for accessing some other object(s) within core(s) 3215.

Operation 5249 describes receiving a scalar value of at least a potential allocation relating to the other instance of the virtually-instantiable service (e.g. port 3292 receiving an actual or forecast allocation 3291 in terms of cost, time, or other resources in relation to instance 3256). This can occur, for example, in embodiments in which access module 3290 performs operation 440, in which "the" virtual instance includes at least a portion of instance 3258, and in which feedback module 3270 performs operation 430 (optionally in concert with or in addition to user interface 3280 or hosting module 3210).

With reference now to FIG. 53, there are shown several variants of the flow 400 of FIG. 4 or 52. Operation 430—indicating a virtually-instantiable service via a data flow between a user interface and an operating system, the virtually-instantiable service including at least a first instance—may include one or more of the following operations: 5333, 5334, or 5339. Operation 440—accessing a second instance of the virtually-instantiable service at least partly in response to the user interface after indicating the virtually-instantiable service via the data flow between the user interface and the operating system—may include one or more of the following operations: 5241, 5242, 5245, or 5248.

Operation 5333 describes transmitting at least some data acquired from the operating system to the user interface (e.g. logic 3428 outputting one or more instance-indicative symbols 3483, 3484 to speaker 3494, display 3495, or some other output device 3496). This can occur, for example, in embodiments in which one or more instances of logic 3426-3428 perform operation 430. Alternatively or additionally, logic 3429 may perform operation 5333 by providing one or more instances of invocation parameters 3471, progress indicators 3472, service instance designators 3474, error type indicators 3476, configuration data 3479, event records 3481, or other data item suitable for use by interface 3470 in relation to service 3450.

Operation 5334 describes establishing the first instance of the virtually-instantiable service in an emulation environment (e.g. logic 3401 spawning one or more instances 3442-3444 of service 3450 in one or more emulation environments 3421-3422). This can occur, for example, in embodiments in which logic 3401 includes one or more instances of emulators 3402 or other circuitry. Alternatively or additionally, other instances or services may be established in the same environment, for example, so as to simulate a physical environment in which an anomaly occurred.

Operation 5339 describes manifesting the data flow between the user interface and the operating system in response to a user action (e.g. one or more instances of sensors 3720 responding to a key press or similar actuation event 3722, an audible or visible command 3724, or some other input 3726 by transmitting service-indicative data 3714 to one or more operating systems 3420, 3770). This can occur, for example, in embodiments in which one or more services 3450, 3795 are virtually instantiated, in which some or all of system 3400 is implemented in local system 3700 or network 3740, and in which sensor 3720 receives input 3726 referring to, representing, triggering, or otherwise indicative of such service(s). Alternatively or additionally, sensor 3720 may be implemented to include logic 3426 for transmitting one or more instances of command or other trigger messages 3728 to the operating system(s) in response to detecting one or more patterns 3727 in sensor input 3726.

Operation 5341 describes establishing a third instance of the virtually-instantiable service by emulating a first portion of a module (e.g. logic 3394 configuring environment 3370 with instance 3323 of process 3314 to include at least portion 3331 being emulated). This can occur, for example, in embodiments in which instance 3321 is the "first" instance of module 3330, hosted in environments 3370 as shown. Alternatively or additionally, other environments may exist within environment 3370 as shown, with one or more features as described herein.

Operation 5342 describes establishing the second instance of the virtually-instantiable service by emulating a second portion of the module and by executing the first portion of the module natively (e.g. logic 3395 configuring environment 3380 with instance 3322 of one or more processes 3314 to include at least portion 3331 executing natively and some other portion 3335 executing by emulation). This can occur, for example, in embodiments in which such portions are executed in alternation or otherwise overlapping in time. Alternatively or additionally, portions 3331, 3335 may (optionally) comprise complementary or overlapping code portions.

Operation 5345 describes establishing the second instance of the virtually-instantiable service as a virtual instantiation (e.g. logic 3396 configuring environment 3376 with emulator 3398 to execute at least portion 3333 of module 3330 by emulation). This can occur in embodiments in which one or more instances of other portions of module 3330 are executed in other portions of environment 3370, for example, or in which the "first" instance is configured to run in environment 3380.

Operation 5348 describes adding a data path between the user interface and the operating system to the data flow between the user interface and the operating system (e.g. one or more routers 3735, 3755 designating data path 3743 for addition in parallel to one or more of inbound data path 3741, outbound data path 3745, or bidirectional path 3747). This can occur, for example, in embodiments in which "inbound" data path 3741 (from interface 3710 to operating system 3770, for example) is currently active, for example. Those skilled in the art will appreciate that data path 3743 may be used for other inbound flow in some embodiments, such as for multiplexing, redundancy, or as a substitute data path. Alternatively or additionally, data path 3743 may likewise be used for outbound data flow such as for presentation or acknowledgment. Alternatively or additionally, one or more intermediaries 3742, 3744, 3746, 3748 may perform operation 5348 by receiving and relaying data relating to one or more services 3310, 3450, 3754, 3794 as described herein.

With reference now to FIG. 53, there are shown several variants of the flow 400 of FIG. 4, 52, or 53. Operation 430—indicating a virtually-instantiable service via a data flow between a user interface and an operating system, the virtually-instantiable service including at least a first instance—may include one or more of the following operations: 5432, 5436, or 5437. Operation 440—accessing a second instance of the virtually-instantiable service at least partly in response to the user interface after indicating the virtually-instantiable service via the data flow between the user interface and the operating system—may include one or more of the following operations: 5441, 5443, 5445, 5448, or 5449.

Operation 5432 describes recognizing one or more user-preference-indicative patterns from the user interface in the data flow (e.g. pattern recognition logic 3392 or sensor 3308 scanning or otherwise filtering input 3350 for one or more words or other values 3351, 3352 indicative of one or more user preferences 3706). This can occur, for example, in embodiments in which user 3705 signifies an active choice by moving a pointing device, button, or other manipulable object 3708 into activation position 3709, physically or virtually, such that one or more sensors 3720 can detect this transition. Alternatively or additionally, one or more instances of objects 3708 or activation positions 3709 can be implemented within local system 3700. Examples of such values 3351 include choices, updates, commands, or other items potentially triggering changes in one or more processes 3312, 3314 or other services 3794, 3795.

Operation 5436 describes creating a process using the first instance of the virtually-instantiable service (e.g. logic 3391 for creating one or more instances 3323, 3324 of processes 3312, 3314 by executing a corresponding one or more modules 3330, 3338 of code for each in storage module 3340). This can occur, for example, in embodiments in which system 3300 is implemented as a stand-alone system. Alternatively or additionally, system 3300 may implement one or more instances of system 3400, optionally within implementation 3570 or network 3580 as described above.

Operation 5437 describes causing the user interface to present one or more representations of the virtually-instantiable service (e.g. one or more instances of logic 3773 generating and transmitting one or more images 3761, 3762 relating to service 3794 to display 3716). This can occur, for example, in embodiments in which image 3762 contains one or more of instance-representative symbols 3781, state-indicative symbols 3782, or other attribute-indicative symbols 3783 describing one or more functions 3788 or other aspects of service 3794. Alternatively or additionally, such symbols can be transmitted through a translation module or into a speaker, storage module, or other device of local system 3700.

Operation 5441 describes creating the second instance of the virtually-instantiable service before creating the first instance of the virtually-instantiable service (e.g. task manager 3411 spawning instance 3446 of service 3450 in environment 3422 before spawning instance 3445 of service 3450 in environment 3421). This can occur, for example, in embodiments in which each such instance of the spawned service includes at least one instance of process 3441 and in which operation 440 is performed by one or more instances of logic 3404, selection modules 3406, or response module 3460. Alternatively or additionally, several instances 3321-3324 of the service may be created in succession. Those skilled in the art will recognize that such sequences can be used in a variety of ways as described herein for diagnosis and recovery, for example.

Operation 5443 describes updating the second instance of the virtually-instantiable service at least partly in response to the user interface (e.g. emulator 3416 providing one or more instances of commands or other input 3350 or operating parameters or other changes 3436 to instance 3443 of service 3450 in emulation 3403). This can occur, for example, in embodiments in which primary system 330 or local system 3700 include one or more instances of emulators 3415-3417, as services 3450, interfaces 3470, operating systems 3360, or other components described herein with reference to FIGS. 33-34.

Operation 5445 describes receiving a reference to the second instance of the virtually-instantiable service via the data flow (e.g. one or more intermediaries 3742, 3744, 3746, 3748 receiving one or more addresses or other respective identifiers 3448, 3449 of instances 3444, 3445 of service 3450). This can occur, for example, in embodiments in which the "first" instance operates slightly before or after the "second" instance (e.g. by several seconds or less), optionally in a succession of several instances 3442-3446. Such configurations can be useful, for example, for helping to narrow the timing, location, and other cause-related attributes of an anomalous outcome in a long-running program. Alternatively or additionally, one or more instances of output devices 3496, 3497 or operating systems 3420 may likewise perform operation 5445.

Operation 5448 describes causing the user interface to transmit one or more indications of the second instance of the virtually-instantiable service (e.g. response module 3460 responding to fault indication 3462 arising from instance 3446 by sending output device 3497 one or more symbols 3465 to indicate the potential or actual occurrence of instance 3442 becoming active). This can occur, for example, in a circumstance in which the fault indication(s) 3462 are generated by instance 3446 directly or indirectly (e.g. via emulator 3417). Alternatively or additionally, response module 3460 may respond to such a fault by initiating or otherwise activating instance 3442, or by indicating such an action via one or more output devices 3496, 3497. In some variants, for example, such communication offers one or more users a reasonable opportunity to perceive such action (at least for about a second) and optionally to approve or acknowledge it as described herein.

Operation 5449 describes causing an emulation of a portion of the second instance selected at least partly in response to the user interface (e.g. selection module 3406 causing emulator 3415 to execute portion 3431 but not portion 3434 in response to at least some input data 3488 from a user). This can occur, for example, in circumstances in which such input data or output data 3487 designates one or more such portions (via identifiers 3489, for example), and in which selection module 3406 indicates emulation for portion 3431 or native execution for portion 3434. A treatment for one or more other portions 3432 may be designated (e.g. for emulation or not) by default, in such circumstances.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

All of the above-mentioned U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Although users 133, 333, 2768, 3705 are shown/described herein each as a single illustrated figure, those skilled in the art will appreciate that such users may be representative of a human user, a robotic user (e.g., computational entity), and/or substantially any combination thereof (e.g., a user may be assisted by one or more robotic agents). In addition, each such user, as set forth herein, although shown as a single entity may in fact be composed of two or more entities. Those skilled in the art will appreciate that, in general, the same may be said of "sender" and/or other entity-oriented terms as such terms are used herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
one or more non-transitory computer-readable storage media containing executable code to implement a method including at least:
creating multiple emulation environments including at least a virtual environment and a physical emulation environment;
selecting an emulation environment from the multiple emulation environments in response to an identified event category;
obtaining a resource authorization dependent upon at least a monitoring system output, a user input, or a system-wide policy signifying an apparent compliance with a policy of causing the selected emulation environment to isolate a first software object type from a second software object type, wherein the isolate the first software object type is at least one of a temporary isolation; and
signaling a decision whether to comply with the policy of causing the selected emulation environment to isolate the first software object type from the second software object type, wherein the policy is selectively, associated with one or more resources or resource types; and
implemented according to an apparent nature of a potential vulnerability.

2. The apparatus of claim 1 in which the one or more non-transitory computer-readable storage media comprise:
an antenna-containing semiconductor chip.

3. The apparatus of claim 1 in which a portion of the one or more non-transitory computer-readable storage media comprises:
one or more of an image projection module or a touch screen.

4. The apparatus of claim 1 further comprising at least one of a satellite dish or other signal-reflective element, a transducer, an antenna, or a receiver operated to receive the device-detectable implementation.

5. An apparatus comprising:
one or more emulation environments including at least a virtual environment and a physical emulation environment;
an emulation environment selected from the multiple emulation environments in response to the specific event category identified;
one or more non-transitory computer-readable storage media storing a device-detectable output indicating an occurrence of obtaining a resource authorization dependent upon at least a monitoring system output, a user input, or a system-wide policy signifying an apparent compliance with a policy of causing the selected emulation environment to isolate a first software object type from a second software object type, wherein the isolate the first software object type is at least one of a temporary isolation; and circuitry for signaling a decision whether to comply with the policy of causing the selected emulation environment to isolate the first software object type from the second software object type, wherein the policy is selectively associated with one or more resources or resource types, associated with one or more resources or resource types; and implemented according to an apparent nature of a potential vulnerability.

6. The apparatus of claim 5 in which the one or more non-transitory computer-readable storage media comprise:
an antenna-containing semiconductor chip.

7. The apparatus of claim 5 in which at least one of the one or more non-transitory computer-readable storage media comprises:
one or more signal-bearing media transmitting a portion of the device-detectable output at least partly responsive to obtaining a resource authorization dependent upon at least the monitoring system output, the user input, or the system-wide policy signifying an apparent compliance with a policy of causing the selected emulation environment to isolate a first software object type from a second software object type.

8. The apparatus of claim 5 in which the one or more non-transitory computer-readable storage media comprise:
a portable module including at least an auditory interface configured to be operated while the portable module is held or worn.

9. The apparatus of claim 5 in which a portion of the one or more non-transitory computer-readable storage media comprises:
one or more of an image projection module or a touch screen.

10. The apparatus of claim 5 in which the one or more non-transitory computer-readable storage media include at least one of a repeater, a communication satellite, or another active module configured to accept first and second portions of the device-detectable output at first and second respective times, the device-detectable output comprising at least one or more displayable images and one or more data files.

11. The apparatus of claim 5 in which a portion of the one or more non-transitory computer-readable storage media comprises:
one or more processors configured to perform one or more of optical image scanning or auditory pattern scanning upon the device-detectable output, wherein the device-detectable output comprises at least one of a decision, a statistical correlation, and/or an encoded expression.

12. The apparatus of claim 5 in which a portion of the one or more non-transitory computer-readable storage media comprises:
one or more processors configured to perform linguistic pattern scanning upon the device-detectable output.

13. The apparatus of claim 5 in which a portion of the one or more non-transitory computer-readable storage media comprises:
circuitry for using an encryption constraint in at least some of the device-detectable output.

14. The apparatus of claim 5 in which at least one of the one or more non-transitory computer-readable storage media comprises:
one or more signal-bearing media storing at least one of a special-purpose instruction sequence or an information-bearing static attribute as a portion of the device-detectable output.

15. The apparatus of claim 5 in which at least one of the one or more non-transitory computer-readable storage media comprises:
one or more signal-bearing media storing at least one signal from an implementation having at least circuitry for obtaining a resource authorization dependent upon at least the monitoring system output, the user input, or the system-wide policy signifying an apparent compliance with a policy of causing the selected emulation environment to isolate a first software object type from a second software object type; and circuitry for signaling a decision whether to comply with the policy of causing the selected emulation environment to isolate the first software object type from the second software object type.

16. The apparatus of claim 5 in which a first portion of the one or more non-transitory computer-readable storage media transmits a portion of the device-detectable output before a remainder of the one or more non-transitory media transmits a remainder of the device-detectable output.

17. The apparatus of claim 5 in which the one or more non-transitory computer-readable storage media include at least one of an integrated circuit, a data-holding element, a lens or other light-transmissive medium, a signal-bearing conduit currently bearing at least a portion of the device-detectable output, or a bus or other configuration of two or more transmission media in mutual isolation.

18. The apparatus of claim 5 in which a portion of the one or more non-transitory computer-readable storage media comprises:
a power line operated for transmitting content of the device-detectable output between at least two terminals.

19. The apparatus of claim 5 in which a first medium of the one or more non-transitory computer-readable storage media stores a first portion of the device-detectable output while a second medium of the one or more non-transitory media stores a second portion of the device-detectable output.

20. The apparatus of claim 5 in which the one or more non-transitory computer-readable storage media are configured at least (a) by causing a communication channel in the one or more non-transitory media to store a first portion of the device-detectable output; and (b) by causing another channel of the one or more non-transitory media to store a second portion of the device-detectable output.

21. The apparatus of claim 5 in which the one or more non-transitory computer-readable storage media have borne the device-detectable output.

22. The apparatus of claim 5 in which a portion of the one or more non-transitory computer-readable storage media comprises:
one or more static markings indicative of the device-detectable output.

23. The apparatus of claim 5 in which a portion of the one or more non-transitory computer-readable storage media comprises:
a magnetoresistive random access memory configured to receive the device-detectable output.

24. The apparatus of claim 5 further comprising at least one of a satellite dish or other signal-reflective element, a transducer, an antenna, or a receiver operated to receive the device-detectable output.

25. A device implemented method comprising:
performing, on the device, a reception of or a transmission of one or more instructions in relation to a second method that includes at least:
creating one or more emulation environments including at least a virtual environment and a physical emulation environment;
selecting an emulation environment from the multiple emulation environments in response to the specific event category identified;
obtaining a resource authorization dependent upon at least a monitoring system output, a user input, or system-wide policy signifying an apparent compliance with a policy of causing the selected emulation environment to isolate a first software object type from a second software object type, wherein the isolate the first software object type is at least one of a temporary isolation; and
signaling a decision whether to comply with the policy of causing the selected emulation environment to isolate the first software object type from the second software object type, wherein the policy is selectively associated with one or more resources or resource types,
associated with one or more resources or resource types; and
implemented according to an apparent nature of a potential vulnerability.

26. The device implemented method of claim 25 further comprising limiting access to part or all of a local resource with a similar apparent compliance dependent resource authorization, wherein the apparent compliance dependent resource authorization is implemented as a device-executable code or other instruction sequence.

* * * * *